United States Patent
Wu et al.

(10) Patent No.: US 12,256,261 B2
(45) Date of Patent: Mar. 18, 2025

(54) AMBR CONTROL METHOD, DEVICE, AND SYSTEM

(71) Applicant: Huawei Technologies Co., Ltd., Shenzhen (CN)

(72) Inventors: Yizhuang Wu, Beijing (CN); Haiyang Sun, Beijing (CN); Fangyuan Zhu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 411 days.

(21) Appl. No.: 17/695,556

(22) Filed: Mar. 15, 2022

(65) Prior Publication Data

US 2022/0210687 A1  Jun. 30, 2022

Related U.S. Application Data

(63) Continuation of application No. PCT/CN2019/108764, filed on Sep. 27, 2019.

(51) Int. Cl.
*H04W 28/02* (2009.01)

(52) U.S. Cl.
CPC ... *H04W 28/0257* (2013.01); *H04W 28/0268* (2013.01)

(58) Field of Classification Search
CPC ......... H04W 28/0257; H04W 28/0268; H04W 28/22; H04W 60/00
See application file for complete search history.

(56) References Cited

U.S. PATENT DOCUMENTS

2019/0297121 A1  9/2019  Qiao et al.

FOREIGN PATENT DOCUMENTS

| CN | 109548137 A | 3/2019 |
|---|---|---|
| CN | 110049519 A | 7/2019 |

(Continued)

OTHER PUBLICATIONS

LG Electronics Inc., "UE-AMBR derivation in NG procedures," 3GPP TSG-RAN WG3 #99, Athens, Greece, R3-181065, total 18 pages, 3rd Generation Partnership Project, Valbonne, France (Feb. 26-Mar. 2, 2018).

(Continued)

*Primary Examiner* — Jamal Javaid
(74) *Attorney, Agent, or Firm* — Leydig, Voit & Mayer, Ltd.

(57) ABSTRACT

Disclosed is an AMBR control method, device, and system, so that a quality of service (QoS) control mechanism can be used to control use of resources in a network slice by a terminal device. The method includes: a mobility management network element obtaining M pieces of single network slice selection assistance information (S-NSSAI) corresponding to a terminal device and a first slice-AMBR corresponding to each piece of S-NSSAI in the M pieces of S-NSSAI; and sending the M pieces of S-NSSAI and the first slice-AMBR corresponding to each piece of S-NSSAI to an access network device, where the first slice-AMBR corresponding to each piece of S-NSSAI is used to determine a second slice-AMBR corresponding to the S-NSSAI, and the second slice-AMBR corresponding to each piece of S-NSSAI is used to control an aggregate bit rate of non-guaranteed bit rate non-GBR QoS flows in a network slice indicated by the S-NSSAI.

16 Claims, 13 Drawing Sheets

(56) References Cited

FOREIGN PATENT DOCUMENTS

| | | | |
|---|---|---|---|
| CN | 110149657 A | 8/2019 | |
| CN | 114531958 A | 5/2022 | |
| EP | 3442280 A1 | 2/2019 | |
| EP | 3582543 A1 | 12/2019 | |
| EP | 3989637 A1 * | 4/2022 | ............ H04L 67/14 |
| WO | 2018170687 A1 | 9/2018 | |
| WO | 2019074433 A1 | 4/2019 | |

OTHER PUBLICATIONS

Vivo, "Schedule-based resource sharing for network slicing," 3GPP TSG RAN WG2 Meeting#97, Athens, Greece, R2-1701483, total 4 pages, 3rd Generation Partnership Project, Valbonne, France (Feb. 13-17, 2017).

"3rd Generation Partnership Project; Technical Specification Group Services and System Aspects;System Architecture for the 5G System (5GS); Stage 2 (Release 16)," 3GPP TS 23.501 V16.2.0, total 391 pages, 3rd Generation Partnership Project, Valbonne, France (Sep. 2019).

LG Electronics Inc., "UE-AMBR in NG procedures," 3GPP TSG-RAN WG3 #99bis, Sanya, China, R3-182400, Total 19 pages, 3rd Generation Partnership Project, Valbonne, France (Apr. 16-20, 2018).

"3rd Generation Partnership Project; Technical Specification Group Services and System Aspects; System Architecture for the 5G System (5GS); Stage 2 (Release 15)," 3GPP TS 23.501 V15.7.0, pp. 1-243, 3rd Generation Partnership Project, Valbonne, France (Sep. 2019).

"Serving PLMN UE AMBR control," 3GPP TSG-CT WG3 Meeting #105, Wroclaw, Poland, C3-193189, Total 20 pages, 3rd Generation Partnership Project, Valbonne, France (Aug. 26-30, 2019).

* cited by examiner

AMBR CONTROL METHOD, DEVICE, AND SYSTEM

CROSS-REFERENCE TO RELATED APPLICATIONS

This application is a continuation of International Application No. PCT/CN2019/108764, filed on Sep. 27, 2019, the disclosure of which is hereby incorporated by reference in its entirety.

TECHNICAL FIELD

This application relates to the field of communication technologies, and in particular, to an aggregate maximum bit rate (aggregate maximum bit rate, session-AMBR) control method, a device, and a system.

BACKGROUND

A network slice is a logically isolated network used to support a specific network capability and network characteristic, and may include an entire network from end to end (E2E), or a plurality of network slices may share some network functions. The network slice is a key technology that meets a network differentiation requirement of a 5th generation (5G) mobile communication technology proposed by the 3rd generation partnership project (3GPP). Generally, network features of different network slices are different, and network slices need to be isolated from each other, so that they do not affect each other. For example, a network slice of an augmented reality (AR) service or a virtual reality (VR) service requires a large bandwidth and a low latency. A network slice of an internet of things (IoT) service needs to support access of a large quantity of terminals, but requires a small bandwidth, and has no requirement on a latency.

In an existing quality of service (QoS) control mechanism, a user equipment (user UE)-aggregate maximum bit rate (session-AMBR) and a session-AMBR are defined. The UE-AMBR is used to control an aggregate bit rate of all non-guaranteed bit rate (non-GBR) QoS flows of a terminal device, and a radio access network (RAN) device performs the control. The session-AMBR is used to control an aggregate maximum bit rate of all non-GBR QoS flows in one packet data unit (PDU) session of a terminal device, and the terminal device and a user plane function (UPF) network element perform the control. However, the existing QoS control mechanism is not used to control use of resources in a network slice by a terminal device.

SUMMARY

Embodiments of this application provide an AMBR control method, a device, and a system, so that a QoS control mechanism can be used to control use of resources in a network slice by a terminal device.

According to a first aspect, an aggregate maximum bit rate AMBR control method is provided, where the method includes: A mobility management network element obtains M pieces of single network slice selection assistance information S-NSSAI corresponding to a terminal device and a first slice-AMBR corresponding to each piece of S-NSSAI in the M pieces of S-NSSAI, where M is a positive integer; and the mobility management network element sends the M pieces of S-NSSAI and the first slice-AMBR corresponding to each piece of S-NSSAI to an access network device, where the first slice-AMBR corresponding to each piece of S-NSSAI is used to determine a second slice-AMBR corresponding to the S-NSSAI, and the second slice-AMBR corresponding to each piece of S-NSSAI is used to control an aggregate bit rate of non-guaranteed bit rate non-GBR quality of service QoS flows in a network slice indicated by the S-NSSAI. Based on this solution, a maximum data rate of data of the terminal device in a network slice can be controlled, to control use of resources in the network slice by the terminal device.

In a possible design, the first slice-AMBR corresponding to each piece of S-NSSAI is a subscribed first slice-AMBR corresponding to the S-NSSAI.

In a possible design, each piece of S-NSSAI in the M pieces of S-NSSAI corresponding to the terminal device is S-NSSAI in a home network of the terminal device; and that a mobility management network element obtains M pieces of S-NSSAI corresponding to a terminal device and a first slice-AMBR corresponding to each piece of S-NSSAI in the M pieces of S-NSSAI includes: The mobility management network element receives, the M pieces of S-NSSAI corresponding to the terminal device and the first slice-AMBR corresponding to each piece of S-NSSAI in the M pieces of S-NSSAI from a unified data management network element. Based on this solution, the mobility management network element may obtain the M pieces of S-NSSAI corresponding to the terminal device and the first slice-AMBR corresponding to each piece of S-NSSAI in the M pieces of S-NSSAI.

In a possible design, each piece of S-NSSAI in the M pieces of S-NSSAI corresponding to the terminal device is S-NSSAI in a home network of the terminal device; and that a mobility management network element obtains M pieces of S-NSSAI corresponding to a terminal device and a first slice-AMBR corresponding to each piece of S-NSSAI in the M pieces of S-NSSAI includes: The mobility management network element receives N pieces of S-NSSAI corresponding to the terminal device and a first slice-AMBR corresponding to each piece of S-NSSAI in the N pieces of S-NSSAI from a unified data management network element, where each piece of S-NSSAI in the N pieces of S-NSSAI is S-NSSAI in the home network of the terminal device; and the mobility management network element determines, based on default NSSAI of the terminal device or allowed NSSAI of the terminal device and the first slice-AMBR corresponding to each piece of S-NSSAI in the N pieces of S-NSSAI, the M pieces of S-NSSAI corresponding to the terminal device and the first slice-AMBR corresponding to each piece of S-NSSAI in the M pieces of S-NSSAI, where the default NSSAI of the terminal device or the allowed NSSAI of the terminal device includes the M pieces of S-NSSAI corresponding to the terminal device, each piece of S-NSSAI in the M pieces of S-NSSAI corresponding to the terminal device is S-NSSAI in the N pieces of S-NSSAI corresponding to the terminal device, and N is a positive integer greater than or equal to M. Based on this solution, the mobility management network element may obtain the M pieces of S-NSSAI corresponding to the terminal device and the first slice-AMBR corresponding to each piece of S-NSSAI in the M pieces of S-NSSAI.

In a possible design, the method further includes: The mobility management network element sends, to the access network device, S-NSSAI that is in a visited network of the terminal device and that corresponds to each piece of S-NSSAI in the M pieces of S-NSSAI corresponding to the terminal device. Based on this solution, the access network device can learn of a first slice-AMBR corresponding to the S-NSSAI in the visited network.

In a possible design, the method further includes: The mobility management network element sends a mapping relationship between third S-NSSAI and first S-NSSAI to the access network device, where the mapping relationship is used to determine a first slice-AMBR corresponding to the first S-NSSAI, the third S-NSSAI is S-NSSAI associated with a first session of the terminal device in the home network of the terminal device, the first S-NSSAI is S-NSSAI associated with the first session in a visited network of the terminal device, and the third S-NSSAI is S-NSSAI in the M pieces of S-NSSAI corresponding to the terminal device.

In a possible design, each piece of S-NSSAI in the M pieces of S-NSSAI corresponding to the terminal device is S-NSSAI in a visited network of the terminal device; and that a mobility management network element obtains M pieces of S-NSSAI corresponding to a terminal device and a first slice-AMBR corresponding to each piece of S-NSSAI in the M pieces of S-NSSAI includes: The mobility management network element receives K pieces of S-NSSAI corresponding to the terminal device and a first slice-AMBR corresponding to each piece of S-NSSAI in the K pieces of S-NSSAI from a unified data management network element, where each piece of S-NSSAI in the K pieces of S-NSSAI is S-NSSAI in a home network of the terminal device; and the mobility management network element determines, based on the first slice-AMBR corresponding to each piece of S-NSSAI in the K pieces of S-NSSAI and S-NSSAI that is in the visited network and that corresponds to each piece of S-NSSAI in the K pieces of S-NSSAI, the M pieces of S-NSSAI corresponding to the terminal device and the first slice-AMBR corresponding to each piece of S-NSSAI in the M pieces of S-NSSAI, where K is a positive integer greater than or equal to M. Based on this solution, the mobility management network element may obtain the M pieces of S-NSSAI corresponding to the terminal device and the first slice-AMBR corresponding to each piece of S-NSSAI in the M pieces of S-NSSAI.

In a possible design, each piece of S-NSSAI in the M pieces of S-NSSAI corresponding to the terminal device is S-NSSAI in a visited network of the terminal device; and that a mobility management network element obtains M pieces of S-NSSAI corresponding to a terminal device and a first slice-AMBR corresponding to each piece of S-NSSAI in the M pieces of S-NSSAI includes: The mobility management network element receives N pieces of S-NSSAI corresponding to the terminal device and a first slice-AMBR corresponding to each piece of S-NSSAI in the N pieces of S-NSSAI from a unified data management network element, where each piece of S-NSSAI in the N pieces of S-NSSAI is S-NSSAI in the home network of the terminal device; and the mobility management network element determines, based on the first slice-AMBR corresponding to each piece of S-NSSAI in the N pieces of S-NSSAI, S-NSSAI that is in the visited network and that corresponds to each piece of S-NSSAI in the N pieces of S-NSSAI, and allowed NSSAI of the terminal device or default NSSAI of the terminal device, the M pieces of S-NSSAI corresponding to the terminal device and the first slice-AMBR corresponding to each piece of S-NSSAI in the M pieces of S-NSSAI, where the allowed NSSAI of the terminal device includes the M pieces of S-NSSAI corresponding to the terminal device, the default NSSAI of the terminal device includes X pieces of S-NSSAI, each piece of S-NSSAI in the X pieces of S-NSSAI is S-NSSAI in the home network of the terminal device, the M pieces of S-NSSAI corresponding to the terminal device are obtained by mapping based on the X pieces of S-NSSAI, X is a positive integer, and N is a positive integer greater than or equal to M. Based on this solution, the mobility management network element may obtain the M pieces of S-NSSAI corresponding to the terminal device and the first slice-AMBR corresponding to each piece of S-NSSAI in the M pieces of S-NSSAI.

In a possible design, the first slice-AMBR corresponding to each piece of S-NSSAI is from a policy control network element. That is, the first slice-AMBR corresponding to each piece of S-NSSAI is a first slice-AMBR authorized by the policy control network element.

In a possible design, each piece of S-NSSAI in the M pieces of S-NSSAI corresponding to the terminal device is S-NSSAI in a home network of the terminal device; and that a mobility management network element obtains M pieces of S-NSSAI corresponding to a terminal device and a first slice-AMBR corresponding to each piece of S-NSSAI in the M pieces of S-NSSAI includes: The mobility management network element receives, the M pieces of S-NSSAI corresponding to the terminal device and the first slice-AMBR corresponding to each piece of S-NSSAI in the M pieces of S-NSSAI from the policy control network element. Based on this solution, the mobility management network element may obtain the M pieces of S-NSSAI corresponding to the terminal device and the first slice-AMBR corresponding to each piece of S-NSSAI in the M pieces of S-NSSAI.

In a possible design, the method further includes: The mobility management network element receives, the M pieces of S-NSSAI corresponding to the terminal device and a subscribed slice-AMBR corresponding to each piece of S-NSSAI in the M pieces of S-NSSAI from a unified data management network element; and the mobility management network element sends a first message to the policy control network element, where the first message carries the M pieces of S-NSSAI corresponding to the terminal device and the subscribed slice-AMBR corresponding to each piece of S-NSSAI in the M pieces of S-NSSAI.

In a possible design, the method further includes: The mobility management network element receives N pieces of S-NSSAI corresponding to the terminal device and a subscribed slice-AMBR corresponding to each piece of S-NSSAI in the N pieces of S-NSSAI from a unified data management network element, where each piece of S-NSSAI in the N pieces of S-NSSAI is S-NSSAI in the home network of the terminal device; the mobility management network element determines, based on allowed NSSAI of the terminal device or default NSSAI of the terminal device and the subscribed slice-AMBR corresponding to each piece of S-NSSAI in the N pieces of S-NSSAI, the M pieces of S-NSSAI corresponding to the terminal device and a subscribed slice-AMBR corresponding to each piece of S-NSSAI in the M pieces of S-NSSAI, where the default NSSAI of the terminal device or the allowed NSSAI of the terminal device includes the M pieces of S-NSSAI corresponding to the terminal device, each piece of S-NSSAI in the M pieces of S-NSSAI corresponding to the terminal device is S-NSSAI in the N pieces of S-NSSAI corresponding to the terminal device, and N is a positive integer greater than or equal to M; and the mobility management network element sends a first message to the policy control network element, where the first message carries the M pieces of S-NSSAI corresponding to the terminal device and the subscribed slice-AMBR corresponding to each piece of S-NSSAI in the M pieces of S-NSSAI.

In a possible design, each piece of S-NSSAI in the M pieces of S-NSSAI corresponding to the terminal device is S-NSSAI in a home network of the terminal device; and that a mobility management network element obtains M pieces of S-NSSAI corresponding to a terminal device and a first slice-AMBR corresponding to each piece of S-NSSAI in the M pieces of S-NSSAI includes: The mobility management network element receives N pieces of S-NSSAI corresponding to the terminal device and a first slice-AMBR corresponding to each piece of S-NSSAI in the N pieces of S-NSSAI from the policy control network element, where each piece of S-NSSAI in the N pieces of S-NSSAI is S-NSSAI in the home network of the terminal device; and the mobility management network element determines, based on allowed NSSAI of the terminal device or default NSSAI of the terminal device and the first slice-AMBR corresponding to each piece of S-NSSAI in the N pieces of S-NSSAI, the M pieces of S-NSSAI corresponding to the terminal device and the first slice-AMBR corresponding to each piece of S-NSSAI in the M pieces of S-NSSAI, where the allowed NSSAI of the terminal device or the default NSSAI of the terminal device includes the M pieces of S-NSSAI corresponding to the terminal device, each piece of S-NSSAI in the M pieces of S-NSSAI corresponding to the terminal device is S-NSSAI in the N pieces of S-NSSAI corresponding to the terminal device, and N is a positive integer greater than or equal to M. Based on this solution, the mobility management network element may obtain the M pieces of S-NSSAI corresponding to the terminal device and the first slice-AMBR corresponding to each piece of S-NSSAI in the M pieces of S-NSSAI.

In a possible design, each piece of S-NSSAI in the M pieces of S-NSSAI corresponding to the terminal device is S-NSSAI in a visited network of the terminal device; and that a mobility management network element obtains M pieces of S-NSSAI corresponding to a terminal device and a first slice-AMBR corresponding to each piece of S-NSSAI in the M pieces of S-NSSAI includes: The mobility management network element sends a third message to the policy control network element, where the third message carries the M pieces of S-NSSAI corresponding to the terminal device, and the M pieces of S-NSSAI corresponding to the terminal device include M pieces of S-NSSAI that are in the visited network of the terminal device and that are obtained by mapping allowed S-NSSAI of the terminal device or default NSSAI of the terminal device; and the mobility management network element receives the M pieces of S-NSSAI corresponding to the terminal device and the first slice-AMBR corresponding to each piece of S-NSSAI in the M pieces of S-NSSAI from the policy control network element. Based on this solution, the mobility management network element may obtain the M pieces of S-NSSAI corresponding to the terminal device and the first slice-AMBR corresponding to each piece of S-NSSAI in the M pieces of S-NSSAI.

In a possible design, each piece of S-NSSAI in the M pieces of S-NSSAI corresponding to the terminal device is S-NSSAI in a visited network of the terminal device; and that a mobility management network element obtains M pieces of S-NSSAI corresponding to a terminal device and a first slice-AMBR corresponding to each piece of S-NSSAI in the M pieces of S-NSSAI includes: The mobility management network element receives N pieces of S-NSSAI corresponding to the terminal device and a first slice-AMBR corresponding to each piece of S-NSSAI in the N pieces of S-NSSAI from the policy control network element; and the mobility management network element determines, based on allowed NSSAI of the terminal device or default NSSAI of the terminal device and the first slice-AMBR corresponding to each piece of S-NSSAI in the N pieces of S-NSSAI, the M pieces of S-NSSAI corresponding to the terminal device and the first slice-AMBR corresponding to each piece of S-NSSAI in the M pieces of S-NSSAI, where each piece of S-NSSAI in the M pieces of S-NSSAI corresponding to the terminal device is S-NSSAI in the N pieces of S-NSSAI corresponding to the terminal device, the allowed NSSAI of the terminal device includes the M pieces of S-NSSAI corresponding to the terminal device, the default NSSAI of the terminal device includes X pieces of S-NSSAI, each piece of S-NSSAI in the X pieces of S-NSSAI is S-NSSAI in a home network of the terminal device, the M pieces of S-NSSAI corresponding to the terminal device are obtained by mapping based on the X pieces of S-NSSAI, and N is a positive integer greater than or equal to M. Based on this solution, the mobility management network element may obtain the M pieces of S-NSSAI corresponding to the terminal device and the first slice-AMBR corresponding to each piece of S-NSSAI in the M pieces of S-NSSAI.

In a possible design, the first slice-AMBR corresponding to each piece of S-NSSAI is a slice-AMBR corresponding to a first access network type, and the access network device is an access network device of the first access network type.

In a possible design, the method further includes: The mobility management network element sends a first session-AMBR corresponding to the first access network type to the access network device, where the first session-AMBR is used to determine the second slice-AMBR, and the access network device is an access network device of the first access network type.

Optionally, in this embodiment of this application, the mobility management network element may interact with a session management network element in a serving network of the terminal device, to obtain the first session-AMBR corresponding to the first access network type. For an HR session in a roaming scenario, the session management network element in the serving network may further obtain, from a session management network element in the home network of the terminal device, the first session-AMBR corresponding to the first access network type. This is not specifically limited in this embodiment of this application.

In a possible implementation, for a session in a non-roaming scenario and an LBO session in the roaming scenario, the session management network element in the serving network of the terminal device may obtain a session-AMBR of the first session from the unified data management network element. When the first session includes a plurality of access types (multi-access), the session management network element determines first session-AMBRs corresponding to a plurality of access network types of the first session, based on the session-AMBR of the first session and with reference to at least one of a local policy, information about (for example, a quantity of) non-GBR QoS flows established based on each access type, and service attributes (which may be provided by a big data analytics network element) of services transmitted on the non-GBR QoS flows established based on each access type, where the first session-AMBRs corresponding to the plurality of access network types include the first session-AMBR corresponding to the first access network type. For example, assuming that the session-AMBR of the first session is 100 M, and the first session includes an access network type 1 and an access network type 2, when the first session includes both of the two access network types, the session management network element in the serving network of the terminal device may determine, according to the local policy (for example, an allocation ratio of access corresponding to the access network type 1 to access corresponding to the access network type 2 is 2:3), that a first session-AMBR corresponding to the access network type 1 of the first session is 40 M, and that a first session-AMBR corresponding to the access network type 2 of the first session is 60 M. For the HR session in the roaming scenario, the foregoing behavior of the session management network element in the serving network of the terminal device is performed by the session management network element in the home network of the terminal device. Details are not described herein again.

In another possible implementation, for a session in a non-roaming scenario and an LBO session in the roaming scenario, the session management network element in the serving network of the terminal device may obtain a session-AMBR of the first session from the unified data management network element, and then send the session-AMBR of the first session to the policy control network element in the serving network of the terminal device. When the first session includes a plurality of access types, the policy control network element determines first session-AMBRs corresponding to a plurality of access network types of the first session, based on the session-AMBR of the first session and with reference to at least one of a local policy, information about (for example, a quantity of) non-GBR QoS flows established based on each access type, and service attributes (which may be provided by a big data analytics network element) of services transmitted on the non-GBR QoS flows established based on each access type, and then sends the first session-AMBRs corresponding to the plurality of access network types of the first session to the session management network element in the serving network of the terminal device. The first session-AMBRs corresponding to the plurality of access network types include the first session-AMBR corresponding to the first access network type. For an example in which the policy control network element in the serving network of the terminal device determines, based on the session-AMBR of the first session, the first session-AMBRs corresponding to the plurality of access network types of the first session, refer to the foregoing example in which the session management network element in the serving network of the terminal device determines, based on the session-AMBR of the first session, the first session-AMBRs corresponding to the plurality of access network types of the first session. Details are not described herein again. For the HR session in the roaming scenario, the foregoing behavior of the session management network element in the serving network of the terminal device is performed by the session management network element in the home network of the terminal device. Details are not described herein again.

In still another possible implementation, for a session in a non-roaming scenario and an LBO session in the roaming scenario, the session management network element in the serving network of the terminal device may obtain, from the unified data management network element, session-AMBRs corresponding to a plurality of access network types of the first session. When the first session includes one access type, the session management network element determines a session-AMBR corresponding to the first access network type of the first session as the first session-AMBR corresponding to the first access network type of the first session. When the first session includes a plurality of access types, the session management network element determines, based on the session-AMBRs corresponding to the plurality of access network types of the first session, the first session-AMBRs corresponding to the plurality of access network types of the first session. For example, the session-AMBRs that correspond to the plurality of access network types of the first session and that may be obtained by the session management network element in the serving network of the terminal device from the unified data management network element include a session-AMBR of 100 M corresponding to an access network type 1 and a session-AMBR of 80 M corresponding to an access network type 2. When the first session includes both of the two access network types, the session management network element may determine that a first session-AMBR corresponding to the access network type 1 of the first session is (100+80)/2*100/(100+80)=50, and that a first session-AMBR corresponding to the access network type 2 of the first session is (100+80)/2*80/(100+80)=40. For the HR session in the roaming scenario, the foregoing behavior of the session management network element in the serving network of the terminal device is performed by the session management network element in the home network of the terminal device. Details are not described herein again.

In yet another possible implementation, for a session in a non-roaming scenario and an LBO session in the roaming scenario, the session management network element in the serving network of the terminal device may obtain session-AMBRs corresponding to a plurality of access network types of the first session from the unified data management network element, and then send the session-AMBRs corresponding to the plurality of access network types of the first session to a policy control network element in the serving network of the terminal device. When the first session includes one access type, the policy control network element determines, based on a session-AMBR corresponding to the first access network type of the first session, the first session-AMBR corresponding to the first access network type of the first session, and then sends the first session-AMBR corresponding to the first access network type of the first session to the session management network element in the serving network of the terminal device. When the first session includes a plurality of access types, the policy control network element determines, based on session-AMBRs corresponding to a plurality of access network types of the first session, first session-AMBRs corresponding to the plurality of access network types of the first session, and then sends the first session-AMBRs corresponding to the plurality of access network types of the first session to the session management network element in the serving network of the terminal device. The first session-AMBRs corresponding to the plurality of access network types include the first session-AMBR corresponding to the first access network type. For an example in which the policy control network element determines, based on the session-AMBRs corresponding to the plurality of access network types of the first session, the first session-AMBRs corresponding to the plurality of access network types of the first session, refer to the foregoing example in which the session management network element in the serving network of the terminal device determines, based on the session-AMBRs corresponding to the plurality of access network types of the first session, the first session-AMBRs corresponding to the plurality of access network types of the first session. Details are not described herein again. For the HR session in the roaming scenario, the foregoing behavior of the session management network element in the serving network of the terminal device is performed by the session management network element in the home network of the terminal device. Details are not described herein again.

It should be noted that, in this embodiment of this application, a manner in which the session management network element in the serving network of the terminal device determines the first session-AMBR of the first session is not only applicable to this embodiment of this application but also applicable to other scenarios in which the first session-AMBR of the first session corresponds to an access network type. Unified descriptions are provided herein, and details are not specifically limited in this embodiment of this application.

According to a second aspect, an aggregate maximum bit rate AMBR control method is provided, where the method includes: A mobility management network element determines, a first slice-AMBR corresponding to first single network slice selection assistance information S-NSSAI of a first session of a terminal device; and the mobility management network element sends the first slice-AMBR corresponding to the first S-NSSAI to an access network device, where the first slice-AMBR is used to determine a second slice-AMBR corresponding to the first S-NSSAI, and the second slice-AMBR is used to control an aggregate bit rate of non-guaranteed bit rate non-GBR quality of service QoS flows in a network slice indicated by the first S-NSSAI. Based on this solution, a maximum data rate of data of the terminal device in a network slice can be controlled, to control use of resources in the network slice by the terminal device.

In a possible design, the first slice-AMBR is a subscribed first slice-AMBR.

In a possible design, the first S-NSSAI is S-NSSAI associated with the first session in a home network of the terminal device; and that a mobility management network element determines, a first slice-AMBR corresponding to first S-NSSAI of a first session of a terminal device includes: The mobility management network element receives M pieces of S-NSSAI corresponding to the terminal device and a first slice-AMBR corresponding to each piece of S-NSSAI in the M pieces of S-NSSAI from a unified data management network element, where each piece of S-NSSAI in the M pieces of S-NSSAI is S-NSSAI in the home network of the terminal device, the M pieces of S-NSSAI include the first S-NSSAI, and M is a positive integer. Based on this solution, the mobility management network element may determine the first slice-AMBR corresponding to the first S-NSSAI of the first session of the terminal device.

In a possible design, the method further includes: The mobility management network element sends a mapping relationship between third S-NSSAI and the first S-NSSAI to the access network device, where the mapping relationship is used to determine a first slice-AMBR corresponding to the third S-NSSAI, and the third S-NSSAI is S-NSSAI associated with the first session in a visited network of the terminal device.

In a possible design, the first S-NSSAI is S-NSSAI associated with the first session in a visited network of the terminal device; and that a mobility management network element determines, a first slice-AMBR corresponding to first S-NSSAI of a first session of a terminal device includes: The mobility management network element receives M pieces of S-NSSAI corresponding to the terminal device and a first slice-AMBR corresponding to each piece of S-NSSAI in the M pieces of S-NSSAI from a unified data management network element, where each piece of S-NSSAI in the M pieces of S-NSSAI is S-NSSAI in a home network of the terminal device, the M pieces of S-NSSAI include third S-NSSAI, the third S-NSSAI is S-NSSAI associated with the first session in the home network of the terminal device, and M is a positive integer; and the mobility management network element determines, based on a mapping relationship between the first S-NSSAI and the third S-NSSAI, a first slice-AMBR corresponding to the third S-NSSAI as the first slice-AMBR corresponding to the first S-NSSAI. Based on this solution, the mobility management network element may determine the first slice-AMBR corresponding to the first S-NSSAI of the first session of the terminal device.

In a possible design, the first slice-AMBR is from a policy control network element.

In a possible design, the first S-NSSAI is S-NSSAI associated with the first session in a home network of the terminal device; and that a mobility management network element determines, a first slice-AMBR corresponding to first S-NSSAI of a first session of a terminal device includes: The mobility management network element receives M pieces of S-NSSAI corresponding to the terminal device and a first slice-AMBR corresponding to each piece of S-NSSAI in the M pieces of S-NSSAI from the policy control network element, where each piece of S-NSSAI in the M pieces of S-NSSAI is S-NSSAI in the home network of the terminal device, the M pieces of S-NSSAI include the first S-NSSAI, and M is a positive integer. Based on this solution, the mobility management network element may determine the first slice-AMBR corresponding to the first S-NSSAI of the first session of the terminal device.

In a possible design, the method further includes: The mobility management network element receives, the M pieces of S-NSSAI corresponding to the terminal device and a subscribed slice-AMBR corresponding to each piece of S-NSSAI in the M pieces of S-NSSAI from a unified data management network element; and the mobility management network element sends a first message to the policy control network element, where the first message includes the M pieces of S-NSSAI corresponding to the terminal device and the subscribed slice-AMBR corresponding to each piece of S-NSSAI in the M pieces of S-NSSAI. In other words, in this embodiment of this application, the subscribed slice-AMBR corresponding to each piece of S-NSSAI may be used to determine the first slice-AMBR corresponding to the S-NSSAI.

In a possible design, the method further includes: The mobility management network element receives N pieces of S-NSSAI corresponding to the terminal device and a subscribed slice-AMBR corresponding to each piece of S-NSSAI in the N pieces of S-NSSAI from a unified data management network element, where each piece of S-NSSAI in the N pieces of S-NSSAI is S-NSSAI in the home network of the terminal device; the mobility management network element determines, based on allowed NSSAI of the terminal device or default NSSAI of the terminal device and the subscribed slice-AMBR corresponding to each piece of S-NSSAI in the N pieces of S-NSSAI, the M pieces of S-NSSAI corresponding to the terminal device and a subscribed slice-AMBR corresponding to each piece of S-NSSAI in the M pieces of S-NSSAI, where the default NSSAI of the terminal device or the allowed NSSAI of the terminal device includes the M pieces of S-NSSAI corresponding to the terminal device, each piece of S-NSSAI in the M pieces of S-NSSAI corresponding to the terminal device is S-NSSAI in the N pieces of S-NSSAI corresponding to the terminal device, and N is a positive integer greater than or equal to M; and the mobility management network element sends a first message to the policy control network element, where the first message carrying the first message corresponding to the terminal device includes the M pieces of S-NSSAI corresponding to the terminal device and the subscribed slice-AMBR corresponding to each piece of S-NSSAI in the N pieces of S-NSSAI. In other words, in this embodiment of this application, the subscribed slice-AMBR corresponding to each piece of S-NSSAI may be used to determine the first slice-AMBR corresponding to the S-NSSAI.

In a possible design, the first S-NSSAI is S-NSSAI associated with the first session in a home network of the terminal device; and that a mobility management network element determines, a first slice-AMBR corresponding to first S-NSSAI of a first session of a terminal device includes: The mobility management network element receives N pieces of S-NSSAI corresponding to the terminal device and a first slice-AMBR corresponding to each piece of S-NSSAI in the N pieces of S-NSSAI from the policy control network element, where each piece of S-NSSAI in the N pieces of S-NSSAI is S-NSSAI in the home network of the terminal device; and the mobility management network element determines, based on allowed NSSAI of the terminal device or default NSSAI of the terminal device and the first slice-AMBR corresponding to each piece of S-NSSAI in the N pieces of S-NSSAI, M pieces of S-NSSAI corresponding to the terminal device and a first slice-AMBR corresponding to each piece of S-NSSAI in the M pieces of S-NSSAI, where the allowed NSSAI of the terminal device or the default NSSAI of the terminal device includes the M pieces of S-NSSAI corresponding to the terminal device, each piece of S-NSSAI in the M pieces of S-NSSAI corresponding to the terminal device is S-NSSAI in the N pieces of S-NSSAI corresponding to the terminal device, the M pieces of S-NSSAI include the first S-NSSAI, M is a positive integer, and N is a positive integer greater than or equal to M. Based on this solution, the mobility management network element may determine the first slice-AMBR corresponding to the first S-NSSAI of the first session of the terminal device.

In a possible design, the first S-NSSAI is S-NSSAI associated with the first session in a visited network of the terminal device; and that a mobility management network element determines, a first slice-AMBR corresponding to first S-NSSAI of a first session of a terminal device includes: The mobility management network element sends a third message to the policy control network element, where the third message carries M pieces of S-NSSAI corresponding to the terminal device, the M pieces of S-NSSAI corresponding to the terminal device include M pieces of S-NSSAI that are in the visited network of the terminal device and that are obtained by mapping allowed S-NSSAI of the terminal device or default NSSAI of the terminal device, and M is a positive integer; and the mobility management network element receives the M pieces of S-NSSAI corresponding to the terminal device and a first slice-AMBR corresponding to each piece of S-NSSAI in the M pieces of S-NSSAI from the policy control network element, where the M pieces of S-NSSAI include the first S-NSSAI. Based on this solution, the mobility management network element may determine the first slice-AMBR corresponding to the first S-NSSAI of the first session of the terminal device.

In a possible design, the first S-NSSAI is S-NSSAI associated with the first session in a visited network of the terminal device; and that a mobility management network element determines, a first slice-AMBR corresponding to first S-NSSAI of a first session of a terminal device includes: The mobility management network element receives N pieces of S-NSSAI corresponding to the terminal device and a first slice-AMBR corresponding to each piece of S-NSSAI in the N pieces of S-NSSAI from the policy control network element, where each piece of S-NSSAI in the N pieces of S-NSSAI corresponding to the terminal device is S-NSSAI in the visited network of the terminal device; and the mobility management network element determines, based on allowed NSSAI of the terminal device or default NSSAI of the terminal device and the first slice-AMBR corresponding to each piece of S-NSSAI in the N pieces of S-NSSAI, M pieces of S-NSSAI corresponding to the terminal device and a first slice-AMBR corresponding to each piece of S-NSSAI in the M pieces of S-NSSAI, where each piece of S-NSSAI in the M pieces of S-NSSAI corresponding to the terminal device is S-NSSAI in the visited network of the terminal device, each piece of S-NSSAI in the M pieces of S-NSSAI corresponding to the terminal device is S-NSSAI in the N pieces of S-NSSAI corresponding to the terminal device, the allowed NSSAI of the terminal device includes the M pieces of S-NSSAI corresponding to the terminal device, the default NSSAI of the terminal device includes X pieces of S-NSSAI, each piece of S-NSSAI in the X pieces of S-NSSAI is S-NSSAI in a home network of the terminal device, the M pieces of S-NSSAI corresponding to the terminal device are obtained by mapping based on the X pieces of S-NSSAI, the M pieces of S-NSSAI include the first S-NSSAI, X is a positive integer, M is a positive integer, and N is a positive integer greater than or equal to M. Based on this solution, the mobility management network element may determine the first slice-AMBR corresponding to the first S-NSSAI of the first session of the terminal device.

In a possible design, the first S-NSSAI is the S-NSSAI associated with the first session in the home network of the terminal device; and the method further includes: The mobility management network element sends the first S-NSSAI to the access network device.

In a possible design, the first S-NSSAI is S-NSSAI associated with the first session in a visited network of the terminal device; and the method further includes: The mobility management network element determines that there is second S-NSSAI having a mapping relationship with the third S-NSSAI in the visited network of the terminal device, where the third S-NSSAI is S-NSSAI that is of a network slice and that is associated with the first session in the home network of the terminal device; and the mobility management network element sends indication information to the access network device, where the indication information indicates that the aggregate bit rate of the non-GBR QoS flows in the network slice indicated by the first S-NSSAI and an aggregate bit rate of non-GBR QoS flows in a network slice indicated by the second S-NSSAI are both controlled by the first slice-AMBR.

In a possible design, the first S-NSSAI is S-NSSAI associated with the first session in a visited network of the terminal device; and the method further includes: The mobility management network element sends the third S-NSSAI corresponding to the first slice-AMBR to the access network device, where the third S-NSSAI is the S-NSSAI that is of the network slice and that is associated with the first session in the home network of the terminal device.

In a possible design, the first slice-AMBR is a slice-AMBR corresponding to a first access network type, and the access network device is an access network device of the first access network type.

In a possible design, the method further includes: The mobility management network element sends a first session-AMBR corresponding to the first access network type to the access network device, where the first session-AMBR is used to determine the second slice-AMBR, and the access network device is an access network device of the first access network type.

According to a third aspect, an aggregate maximum bit rate AMBR control method is provided, where the method includes: An access network device determines a first slice-AMBR corresponding to first single network slice selection assistance information S-NSSAI, where the first S-NSSAI is S-NSSAI associated with a first session of a terminal device in a serving network of the terminal device; and the access network device determines, based on the first slice-AMBR corresponding to the first S-NSSAI, a second slice-AMBR corresponding to the first S-NSSAI, where the second slice-AMBR is used to control an aggregate bit rate of non-guaranteed bit rate non-GBR quality of service QoS flows in a network slice indicated by the first S-NSSAI. Based on this solution, a maximum data rate of data of the terminal device in a network slice can be controlled, to control use of resources in the network slice by the terminal device.

In a possible design, that an access network device determines a first slice-AMBR corresponding to first S-NSSAI includes: The access network device receives M pieces of S-NSSAI corresponding to the terminal device and a first slice-AMBR corresponding to each piece of S-NSSAI in the M pieces of S-NSSAI from a mobility management network element, where the M pieces of S-NSSAI include the first S-NSSAI. Based on this solution, the access network device may determine the first slice-AMBR corresponding to the first S-NSSAI.

In a possible design, the serving network is a visited network of the terminal device; and that an access network device determines a first slice-AMBR corresponding to first S-NSSAI includes: The access network device receives M pieces of S-NSSAI corresponding to the terminal device and a first slice-AMBR corresponding to each piece of S-NSSAI in the M pieces of S-NSSAI from a mobility management network element, where each piece of S-NSSAI in the M pieces of S-NSSAI corresponding to the terminal device is S-NSSAI in a home network of the terminal device, and M is a positive integer; and the access network device determines, based on the first slice-AMBR corresponding to each piece of S-NSSAI in the M pieces of S-NSSAI, a first slice-AMBR corresponding to third S-NSSAI corresponding to the first S-NSSAI as the first slice-AMBR corresponding to the first S-NSSAI, where the third S-NSSAI is S-NSSAI that is of a network slice and that is associated with the first session in the home network of the terminal device, and the third S-NSSAI is S-NSSAI in the M pieces of S-NSSAI. Based on this solution, the access network device may determine the first slice-AMBR corresponding to the first S-NSSAI.

In a possible design, the method further includes: The access network device receives, from the mobility management network element, S-NSSAI that is in the visited network of the terminal device and that corresponds to each piece of S-NSSAI in the M pieces of S-NSSAI; and the access network device determines, based on the S-NSSAI that is in the visited network of the terminal device and that corresponds to each piece of S-NSSAI in the M pieces of S-NSSAI, the third S-NSSAI corresponding to the first S-NSSAI. Based on this solution, the access network device may determine the third S-NSSAI corresponding to the first S-NSSAI.

In a possible design, the method further includes: The access network device receives a mapping relationship between the first S-NSSAI and the third S-NSSAI from the mobility management network element. Based on this solution, the access network device may determine the third S-NSSAI corresponding to the first S-NSSAI.

In a possible design, that an access network device determines a first slice-AMBR corresponding to first S-NSSAI includes: The access network device receives the first slice-AMBR corresponding to the first S-NSSAI from a mobility management network element. Based on this solution, the access network device may determine the first slice-AMBR corresponding to the first S-NSSAI.

In a possible design, the serving network is a visited network of the terminal device; and that an access network device determines a first slice-AMBR corresponding to first S-NSSAI includes: The access network device receives a first slice-AMBR corresponding to third S-NSSAI and a mapping relationship between the third S-NSSAI and the first S-NSSAI from a mobility management network element, where the third S-NSSAI is S-NSSAI that is of a network slice and that is associated with the first session in a home network of the terminal device; and the access network device determines, based on the mapping relationship between the third S-NSSAI and the first S-NSSAI, the first slice-AMBR corresponding to the third S-NSSAI as the first slice-AMBR corresponding to the first S-NSSAI. Based on this solution, the access network device may determine the first slice-AMBR corresponding to the first S-NSSAI.

In a possible design, the second slice-AMBR is a smaller one of the first slice-AMBR and a sum of first session-AMBRs of all active sessions in the network slice indicated by the first S-NSSAI.

In a possible design, the first session-AMBR is a session-AMBR corresponding to a first access network type, and the access network device is an access network device of the first access network type.

In a possible design, the first slice-AMBR is a slice-AMBR corresponding to a first access network type, and the access network device is an access network device of the first access network type.

In a possible design, the first slice-AMBR is a subscribed first slice-AMBR; or the first slice-AMBR is from a policy control network element.

In a possible design, the method further includes: The access network device receives a first user equipment aggregate maximum bit rate UE-AMBR from the mobility management network element; and the access network device determines a second UE-AMBR based on the first UE-AMBR and the second slice-AMBR, where the second UE-AMBR is used to control an aggregate bit rate of non-GBR QoS flows of the terminal device.

In a possible design, the first UE-AMBR is a UE-AMBR corresponding to a first access network type, and the access network device is an access network device of the first access network type.

According to a fourth aspect, an aggregate maximum bit rate AMBR control method is provided, where the method includes: A mobility management network element obtains a first user equipment aggregate maximum bit rate UE-AMBR corresponding to a first access network type of a terminal device; and the mobility management network element sends the first UE-AMBR corresponding to the first access network type to an access network device, where the first UE-AMBR is used to determine a second UE-AMBR, the second UE-AMBR is used to control an aggregate bit rate of non-guaranteed bit rate non-GBR quality of service QoS flows of the terminal device, and the access network device is an access network device of the first access network type. Based on this solution, if a session of the terminal device may be served by different access network devices, because the second UE-AMBR used by the access network device of the first access network type to control the aggregate bit rate of the non-GBR QoS flows of the terminal device is determined by the first UE-AMBR corresponding to the first access network type, flexibility of UE-AMBR-based control increases.

In a possible design, the first UE-AMBR is a UE-AMBR corresponding to a first access network type and subscribed to by the terminal device.

In a possible design, the first UE-AMBR is from a policy control network element.

In a possible design, the method further includes: The mobility management network element sends a first session-AMBR corresponding to the first access network type to the access network device, where the first session-AMBR is used to determine the second UE-AMBR.

According to a fifth aspect, an aggregate maximum bit rate AMBR control method is provided, where the method includes: An access network device receives a first user equipment aggregate maximum bit rate UE-AMBR corresponding to a first access network type of a terminal device from a mobility management network element, where the access network device is an access network device of the first access network type; and the access network device determines a second UE-AMBR based on the first UE-AMBR, where the second UE-AMBR is used to control an aggregate bit rate of non-guaranteed bit rate non-GBR quality of service QoS flows of the terminal device. Based on this solution, if a session of the terminal device may be served by different access network devices, because the second UE-AMBR used by the access network device of the first access network type to control the aggregate bit rate of the non-GBR QoS flows of the terminal device is determined by the first UE-AMBR corresponding to the first access network type, flexibility of UE-AMBR-based control increases.

In a possible design, the first UE-AMBR is a UE-AMBR corresponding to a first access network type and subscribed to by the terminal device.

In a possible design, the first UE-AMBR is from a policy control network element.

In a possible design, the method further includes: The access network device receives a first session-AMBR corresponding to the first access network type and sent by a mobility management network element, where the first session-AMBR is used to determine the second UE-AMBR.

According to a sixth aspect, a communication apparatus is provided, to implement the foregoing methods. The communication apparatus may be the mobility management network element in the first aspect, the second aspect, or the fourth aspect, or an apparatus including the mobility management network element. Alternatively, the communication apparatus may be the access network device in the third aspect or the fifth aspect, or an apparatus including the access network device. The communication apparatus includes a corresponding module, unit, or means for implementing the foregoing method. The module, unit, or means may be implemented by using hardware or software, or implemented by hardware executing corresponding software. The hardware or the software includes one or more modules or units corresponding to the foregoing functions.

According to a seventh aspect, a communication apparatus is provided. The apparatus includes: a processor and a memory. The memory is configured to store computer instructions; and when the processor executes the instructions, the communication apparatus performs the method according to any one of the foregoing aspects. The communication apparatus may be the mobility management network element in the first aspect, the second aspect, or the fourth aspect, or an apparatus including the mobility management network element. Alternatively, the communication apparatus may be the access network device in the third aspect or the fifth aspect, or an apparatus including the access network device.

According to an eighth aspect, a communication apparatus is provided. The communication apparatus includes a processor. The processor is coupled to a memory; and is configured to: after reading instructions in the memory, perform the method in any one of the foregoing aspects according to the instructions. The communication apparatus may be the mobility management network element in the first aspect, the second aspect, or the fourth aspect, or an apparatus including the mobility management network element. Alternatively, the communication apparatus may be the access network device in the third aspect or the fifth aspect, or an apparatus including the access network device.

According to a ninth aspect, a computer-readable storage medium is provided. The computer-readable storage medium stores instructions; and when the instructions are run on a computer, the computer is enabled to perform the method in any one of the foregoing aspects.

According to a tenth aspect, a computer program product including instructions is provided. When the computer program product runs on a computer, the computer is enabled to perform the method in any one of the foregoing aspects.

According to an eleventh aspect, a communication apparatus (where for example, the communication apparatus may be a chip or a chip system) is provided. The communication apparatus includes a processor, configured to implement a function in any one of the foregoing aspects. In a possible design, the communication apparatus further includes a memory. The memory is configured to store necessary program instructions and necessary data. When the communication apparatus is a chip system, the communication apparatus may include a chip, or may include a chip and another discrete component.

For technical effects brought by any design in the sixth aspect to the eleventh aspect, refer to the technical effects brought by any design in the first aspect to the fifth aspect. Details are not described herein again.

According to a twelfth aspect, a communication method is provided. The method includes: A mobility management network element obtains M pieces of single network slice selection assistance information S-NSSAI corresponding to a terminal device and a first slice-AMBR corresponding to each piece of S-NSSAI in the M pieces of S-NSSAI, where M is a positive integer; the mobility management network element sends the M pieces of S-NSSAI and the first slice-AMBR corresponding to each piece of S-NSSAI to an access network device; the access network device receives the M pieces of S-NSSAI and the first slice-AMBR corresponding to each piece of S-NSSAI from the mobility management network element, where the M pieces of S-NSSAI include first S-NSSAI; and the access network device determines, based on the first slice-AMBR corresponding to the first S-NSSAI, a second slice-AMBR corresponding to the first S-NSSAI, where the second slice-AMBR is used to control an aggregate bit rate of non-GBR QoS flows in a network slice indicated by the first S-NSSAI. For technical effects of the twelfth aspect, refer to technical effects of the first aspect or the third aspect. Details are not described herein again.

According to a thirteenth aspect, a communication method is provided. The method includes: A mobility management network element determines a first slice-AMBR corresponding to first S-NSSAI of a first session of a terminal device, and sends the first slice-AMBR corresponding to the first S-NSSAI to an access network device; and the access network device receives the first slice-AMBR corresponding to the first S-NSSAI from the mobility management network element, and determines, based on the first slice-AMBR corresponding to the first S-NSSAI, a second slice-AMBR corresponding to the first S-NSSAI, where the second slice-AMBR is used to control an aggregate bit rate of non-GBR QoS flows in a network slice indicated by the first S-NSSAI. For technical effects of the thirteenth aspect, refer to technical effects of the second aspect or the third aspect. Details are not described herein again.

According to a fourteenth aspect, a communication method is provided. The method includes: A mobility management network element obtains a first UE-AMBR corresponding to a first access network type of a terminal device, and sends the first UE-AMBR to an access network device; and the access network device receives the first UE-AMBR corresponding to the first access network type of the terminal device from the mobility management network element, and determines a second UE-AMBR based on the first UE-AMBR, where the second UE-AMBR is used to control an aggregate bit rate of non-GBR QoS flows of the terminal device. For technical effects of the fourteenth aspect, refer to technical effects of the fourth aspect or the fifth aspect. Details are not described herein again.

According to a fifteenth aspect, a communication system is provided, where the communication system includes a mobility management network element and an access network device.

The mobility management network element is configured to obtain M pieces of single network slice selection assistance information S-NSSAI corresponding to a terminal device and a first slice-AMBR corresponding to each piece of S-NSSAI in the M pieces of S-NSSAI, where M is a positive integer. The mobility management network element is further configured to send the M pieces of S-NSSAI and the first slice-AMBR corresponding to each piece of S-NSSAI to an access network device. The access network device is configured to receive the M pieces of S-NSSAI and the first slice-AMBR corresponding to each piece of S-NSSAI from the mobility management network element, where the M pieces of S-NSSAI include first S-NSSAI. The access network device is further configured to determine, based on the first slice-AMBR corresponding to the first S-NSSAI, a second slice-AMBR corresponding to the first S-NSSAI, where the second slice-AMBR is used to control an aggregate bit rate of non-GBR QoS flows in a network slice indicated by the first S-NSSAI. For technical effects of the fifteenth aspect, refer to technical effects of the first aspect or the third aspect. Details are not described herein again.

According to a sixteenth aspect, a communication system is provided, where the communication system includes a mobility management network element and an access network device. The mobility management network element is configured to determine a first slice-AMBR corresponding to first S-NSSAI of a first session of a terminal device, and send the first slice-AMBR corresponding to the first S-NSSAI to the access network device. The access network device is configured to receive the first slice-AMBR corresponding to the first S-NSSAI from the mobility management network element, and determine, based on the first slice-AMBR corresponding to the first S-NSSAI, a second slice-AMBR corresponding to the first S-NSSAI, where the second slice-AMBR is used to control an aggregate bit rate of non-GBR QoS flows in a network slice indicated by the first S-NSSAI. For technical effects of the sixteenth aspect, refer to technical effects of the second aspect or the third aspect. Details are not described herein again.

According to a seventeenth aspect, a communication system is provided, where the communication system includes a mobility management network element and an access network device. The mobility management network element is configured to obtain a first UE-AMBR corresponding to a first access network type of a terminal device, and send the first UE-AMBR to the access network device. The access network device is configured to receive the first UE-AMBR corresponding to the first access network type of the terminal device from the mobility management network element, and determine a second UE-AMBR based on the first UE-AMBR, where the second UE-AMBR is used to control an aggregate bit rate of non-GBR QoS flows of the terminal device. For technical effects of the seventeenth aspect, refer to technical effects of the fourth aspect or the fifth aspect. Details are not described herein again.

DESCRIPTION OF EMBODIMENTS

The following describes the technical solutions in embodiments of this application with reference to the accompanying drawings in the embodiments of this application. In descriptions of this application, unless otherwise specified, "/" represents an "or" relationship between associated objects. For example, A/B may represent A or B. In this application, "and/or" describes only an association relationship for describing associated objects and represents that three relationships may exist. For example, A and/or B may represent the following three cases: Only A exists, both A and B exist, and only B exists, where A or B may be singular or plural. In addition, in the descriptions of this application, "a plurality of" means two or more than two unless otherwise specified. "At least one of the following" or a similar expression thereof indicates any combination of these items, including a single item or any combination of plural items. For example, at least one of a, b, or c may indicate: a, b, c, a and b, a and c, b and c, or a, b, and c, where a, b, and c may be singular or plural. In addition, to clearly describe the technical solutions in the embodiments of this application, terms such as "first" and "second" are used in the embodiments of this application to distinguish between same items or similar items that have basically same functions and purposes. A person skilled in the art may understand that the terms such as "first" and "second" do not limit a quantity or an execution sequence, and that the terms such as "first" and "second" do not indicate a definite difference. In addition, in the embodiments of this application, the word such as "example" or "for example" is used to represent giving an example, an illustration, or a description. Any embodiment or design scheme described as "example" or with "for example" in the embodiments of this application should not be explained as being more preferred or having more advantages than another embodiment or design scheme. Exactly, use of the word "example", "for example", or the like is intended to present a relative concept in a specific manner for ease of understanding.

In addition, the network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

Figure 1:
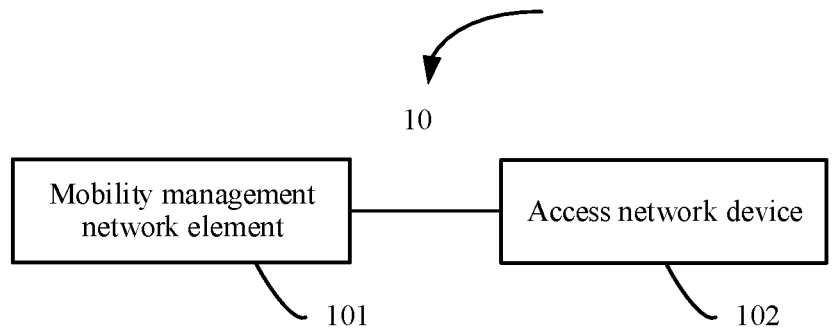
FIG. 1 is a schematic diagram of a structure of a communication system according to an embodiment of this application.

FIG. 1 shows a communication system 10 according to an embodiment of this application. The communication system 10 includes a mobility management network element 101 and an access network device 102. The mobility management network element 101 and the access network element 102 may directly communicate with each other, or may communicate with each other through forwarding by another device. This is not specifically limited in this embodiment of this application.

In a possible implementation, the mobility management network element 101 is configured to obtain M pieces of single network slice selection assistance information (S-NSSAI) corresponding to a terminal device and a first slice-AMBR corresponding to each piece of S-NSSAI in the M pieces of S-NSSAI, where M is a positive integer. The mobility management network element 101 is further configured to send the M pieces of S-NSSAI and the first slice-AMBR corresponding to each piece of S-NSSAI to the access network device 102. The access network device 102 is configured to receive the M pieces of S-NSSAI and the first slice-AMBR corresponding to each piece of S-NSSAI from the mobility management network element 101, where the M pieces of S-NSSAI include first S-NSSAI. The access network device 102 is further configured to determine, based on the first slice-AMBR corresponding to the first S-NSSAI, a second slice-AMBR corresponding to the first S-NSSAI, where the second slice-AMBR is used to control an aggregate bit rate of non-GBR QoS flows in a network slice indicated by the first S-NSSAI. A specific implementation of the foregoing solution is described in detail in subsequent method embodiments. Details are not described herein. Based on the communication system provided in this embodiment of this application, a maximum data rate of data of the terminal device in a network slice may be controlled, to control use of resources in the network slice by the terminal device.

In another possible implementation, the mobility management network element 101 is configured to determine a first slice-AMBR corresponding to first S-NSSAI of a first session of a terminal device. The mobility management network element 101 is further configured to send the first slice-AMBR corresponding to the first S-NSSAI to the access network device 102. The access network device 102 is configured to receive the first slice-AMBR corresponding to the first S-NSSAI from the mobility management network element 101, and determine, based on the first slice-AMBR corresponding to the first S-NSSAI, a second slice-AMBR corresponding to the first S-NSSAI, where the second slice-AMBR is used to control an aggregate bit rate of non-GBR QoS flows in a network slice indicated by the first S-NSSAI. A specific implementation of the foregoing solution is described in detail in subsequent method embodiments. Details are not described herein. Based on the communication system provided in this embodiment of this application, a maximum data rate of data of the terminal device in a network slice may be controlled, to control use of resources in the network slice by the terminal device.

In still another possible implementation, the mobility management network element 101 is configured to obtain a first UE-AMBR corresponding to a first access network type of a terminal device, and send the first UE-AMBR to the access network device 102. The access network device 102 is configured to receive the first UE-AMBR corresponding to the first access network type of the terminal device from the mobility management network element 101, and determine a second UE-AMBR based on the first UE-AMBR, where the second UE-AMBR is used to control an aggregate bit rate of non-GBR QoS flows of the terminal device. A specific implementation of the foregoing solution is described in detail in subsequent method embodiments. Details are not described herein. Based on the communication system provided in this embodiment of this application, if a session of the terminal device may be served by different access network devices, because the second UE-AMBR used by the access network device of the first access network type to control the aggregate bit rate of the non-GBR QoS flows of the terminal device is determined by the first UE-AMBR corresponding to the first access network type, flexibility of UE-AMBR-based control increases.

Optionally, the communication system 10 shown in FIG. 1 may be applied to a 5G network currently discussed or other future networks. This is not specifically limited in this embodiment of this application.

Figure 2:
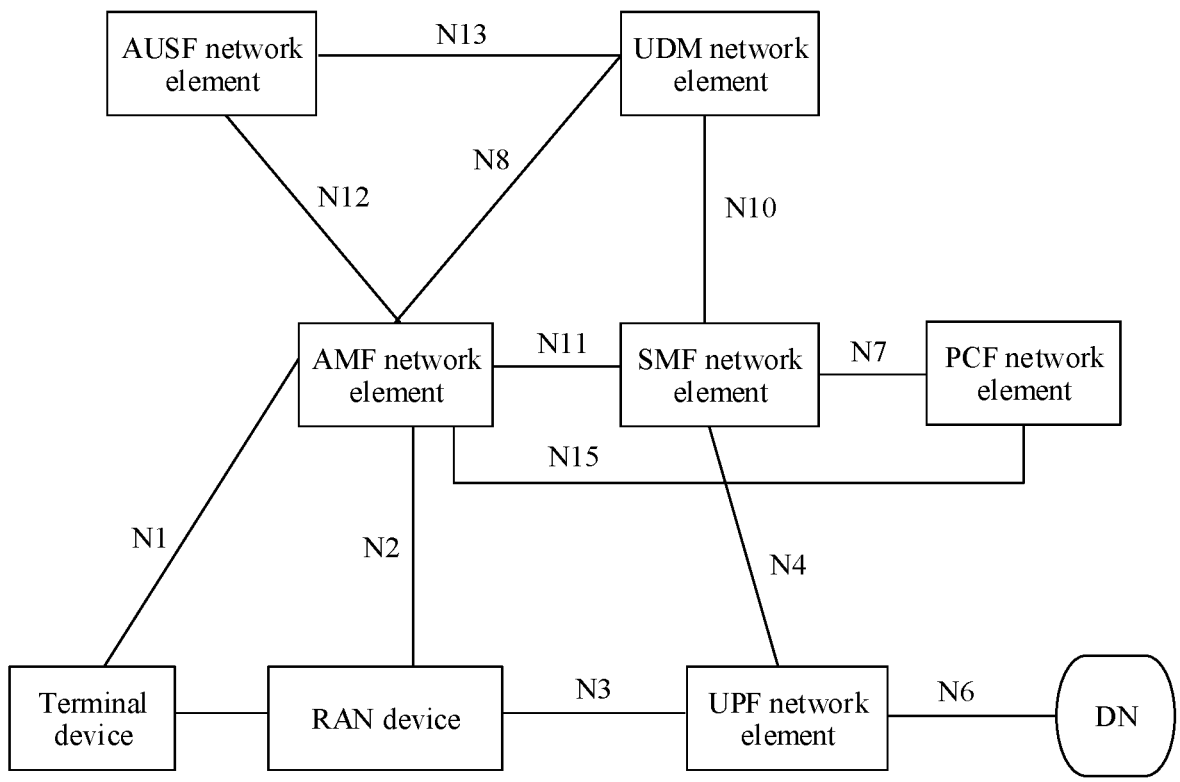
FIG. 2 shows a 5G network architecture 1 in a non-roaming scenario according to an embodiment of this application.

For example, assuming that the communication system 10 shown in FIG. 1 is applied to a 5G network architecture in a non-roaming scenario, as shown in FIG. 2, a network element or an entity corresponding to the foregoing mobility management network element may be an access and mobility management function (AMF) network element in the non-roaming 5G network architecture, and a network element or an entity corresponding to the foregoing access network device may be a RAN device in the non-roaming 5G network architecture.

In addition, as shown in FIG. 2, the non-roaming 5G network architecture may further include a session management function (SMF) network element, a UPF network element, a policy control function (PCF) network element, a unified data management (UDM) network element, an authentication server function (AUSF) network element, or the like. This is not specifically limited in this embodiment of this application.

The terminal device communicates with the AMF network element through a next generation (next generation, N) 1 interface ("N1" for short). The RAN device communicates with the AMF network element through an N2 interface ("N2" for short), and the RAN device communicates with the UPF network element through an N3 interface ("N3" for short). The UPF network element communicates with a DN through an N6 interface ("N6" for short). The AMF network element communicates with the SMF network element through an N11 interface ("N11" for short), the AMF network element communicates with the UDM network element through an N8 interface ("N8" for short), the AMF network element communicates with the AUSF network element through an N12 interface ("N12" for short), and the AMF network element communicates with the PCF network element through an N15 interface ("N15" for short). The SMF network element communicates with the PCF network element through an N7 interface ("N7" for short), the SMF network element communicates with the UPF network element through an N4 interface ("N4" for short), and the SMF network element communicates with the UDM network element through an N10 interface ("N10" for short). The UDM network element communicates with the AUSF network element through an N13 interface ("N13" for short).

Figure 3:
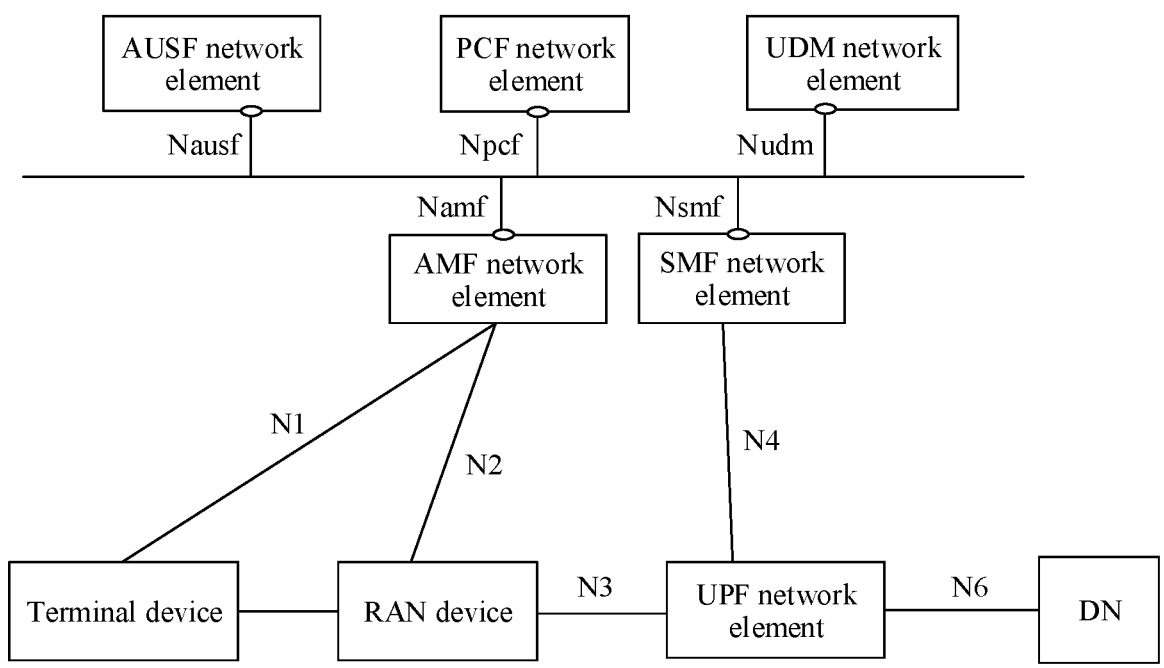
FIG. 3 shows a 5G network architecture 2 in a non-roaming scenario according to an embodiment of this application.

In addition, it should be noted that control plane network elements such as the AMF network element, the SMF network element, the UDM network element, the AUSF network element, or the PCF network element in the non-roaming 5G network architecture shown in FIG. 2 may alternatively interact with each other through a service-oriented interface. For example, as shown in FIG. 3, a service-oriented interface externally provided by the AMF network element may be Namf, a service-oriented interface externally provided by the SMF network element may be Nsmf, a service-oriented interface externally provided by the UDM network element may be Nudm, a service-oriented interface externally provided by the PCF network element may be Npcf, and a service-oriented interface externally provided by the AUSF network element may be Nausf. For related descriptions, refer to a 5G system architecture in the standard 23.501. Details are not described herein.

Figure 4:
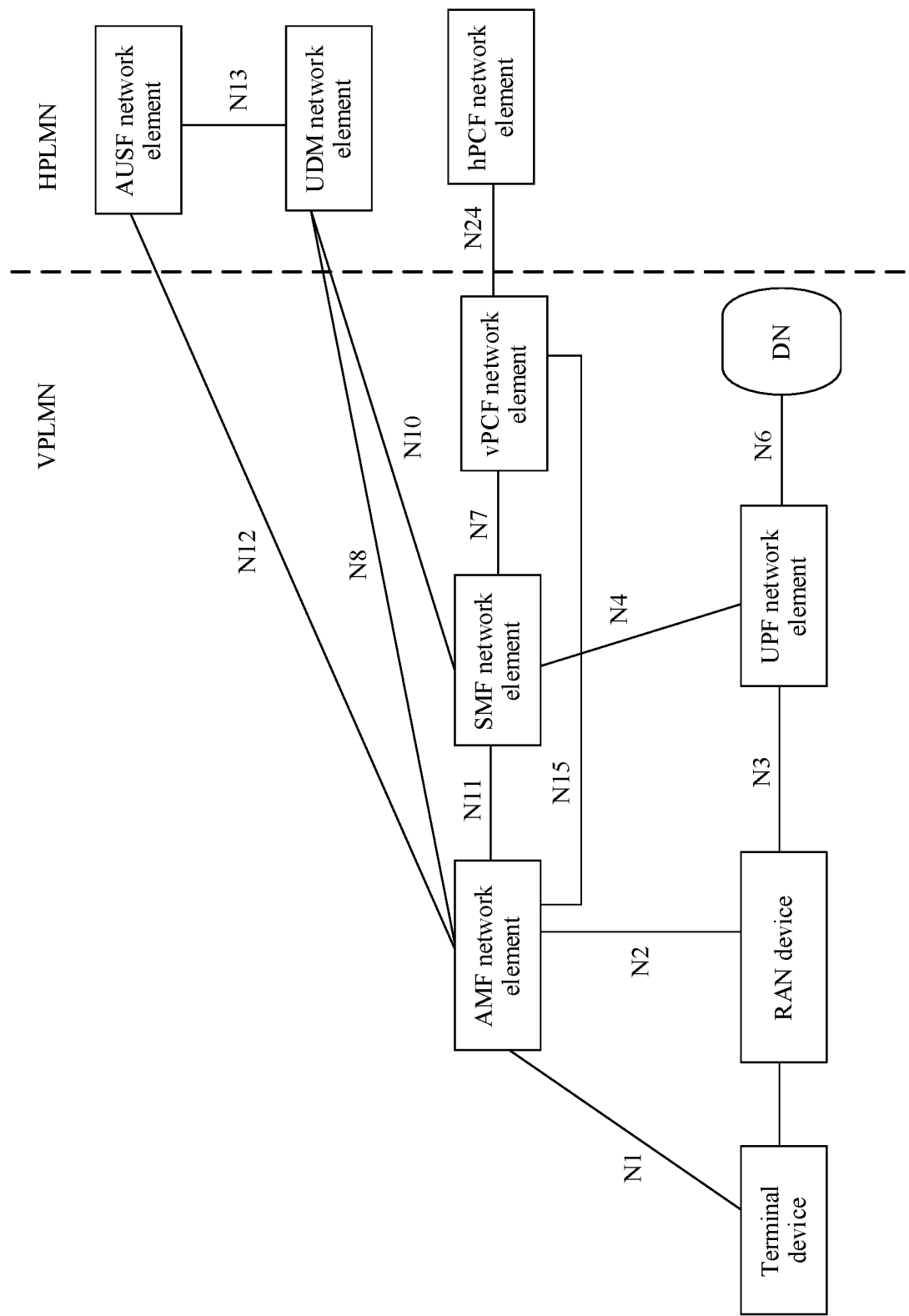
FIG. 4 shows a 5G network architecture 1 in a local breakout roaming scenario according to an embodiment of this application.

Alternatively, for example, assuming that the communication system 10 shown in FIG. 1 is applied to a 5G network architecture in a local breakout (LBO) roaming scenario, as shown in FIG. 4, the network element or the entity corresponding to the mobility management network element may be an AMF network element in the non-roaming 5G network architecture, and the network element or the entity corresponding to the access network device may be a RAN device in the non-roaming 5G network architecture.

In addition, as shown in FIG. 4, the local breakout roaming 5G network architecture may further include an SMF network element, a UPF network element, a visited PCF (vPCF) network element, a UDM network element, an AUSF network element, or a home PCF (hPCF) network element. The UDM network element, the AUSF network element, and the hPCF network element belong to a home public land mobile network (HPLMN). The RAN device, the AMF network element, the SMF network element, the UPF network element, or the vPCF network element belongs to a visited public land mobile network (VPLMN).

The terminal device communicates with the AMF network element through an N1 interface ("N1" for short). The RAN device communicates with the AMF network element through an N2 interface ("N2" for short), and the RAN device communicates with the UPF network element through an N3 interface ("N3" for short). The UPF network element communicates with a DN through an N6 interface ("N6" for short). The AMF network element communicates with the SMF network element through an N11 interface ("N11" for short), the AMF network element communicates with the UDM network element through an N8 interface ("N8" for short), the AMF network element communicates with the AUSF network element through an N12 interface ("N12" for short), and the AMF network element communicates with the vPCF network element through an N15 interface ("N15" for short). The SMF network element communicates with the vPCF network element through an N7 interface ("N7" for short). The vPCF network element communicates with the hPCF network element through an N24 interface ("N24" for short). The SMF network element communicates with the UPF network element through an N4 interface ("N4" for short), and the SMF network element communicates with the UDM network element through an N10 interface ("N10" for short). The UDM network element communicates with the AUSF network element through an N13 interface ("N13" for short).

Figure 5:
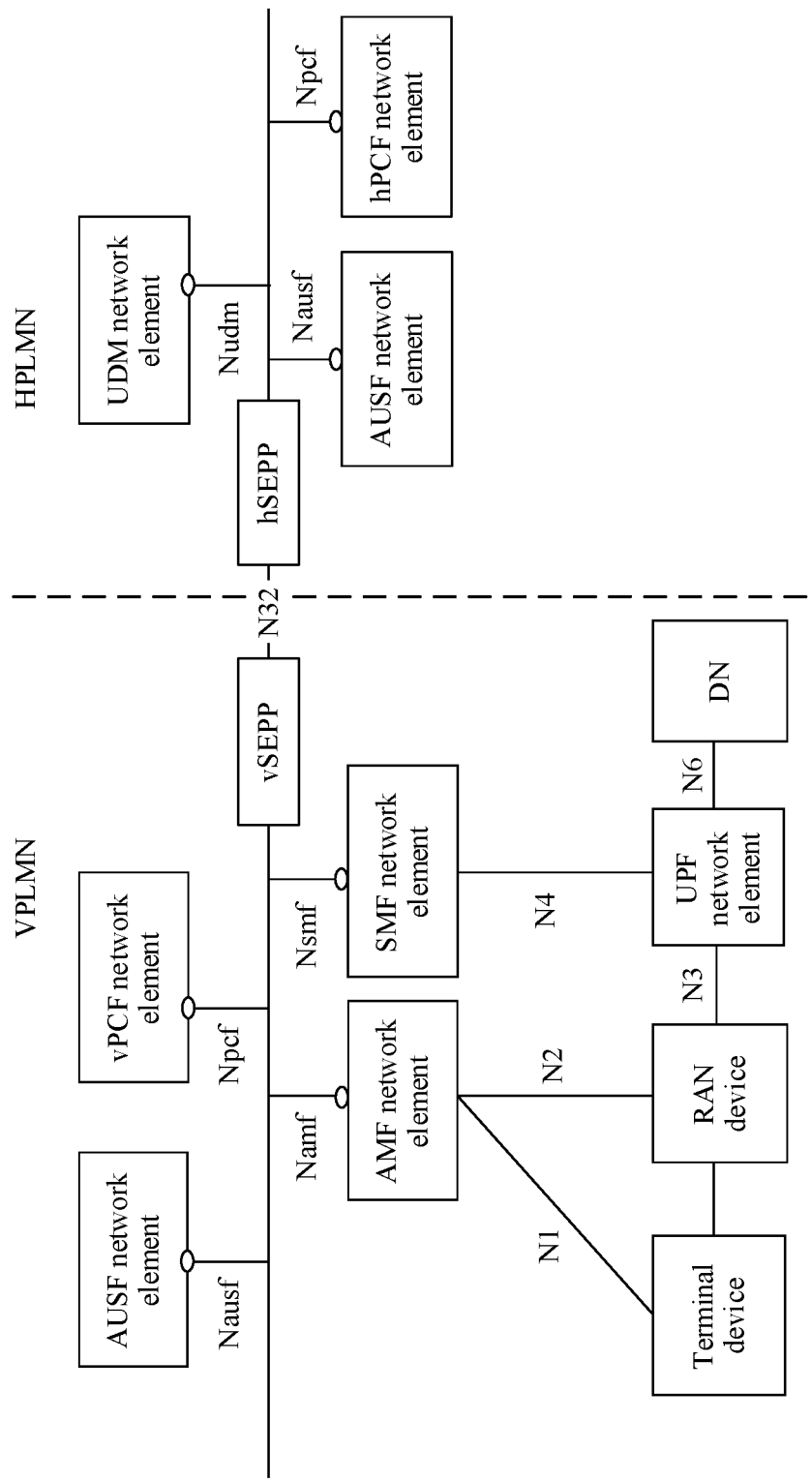
FIG. 5 shows a 5G network architecture 2 in a local breakout roaming scenario according to an embodiment of this application.

In addition, it should be noted that control plane network elements such as the AMF network element, the SMF network element, the UDM network element, the AUSF network element, the vPCF network element, or the hPCF network element in the local breakout roaming 5G network architecture shown in FIG. 4 may alternatively interact with each other through a service-oriented interface. For example, as shown in FIG. 5, a service-oriented interface externally provided by the AMF network element may be Namf, a service-oriented interface externally provided by the SMF network element may be Nsmf, a service-oriented interface externally provided by the UDM network element may be Nudm, a service-oriented interface externally provided by the vPCF network element may be Npcf, a service-oriented interface externally provided by the hPCF network element may be Npcf, and a service-oriented interface externally provided by the AUSF network element may be Nausf. In addition, a visited security edge protection proxy (vSEPP) in FIG. 5 is configured to perform information filtering, policy control, topology hiding, and the like on an internal control plane interface of the VPLMN, and a home security edge protection proxy (hSEPP) in FIG. 5 is configured to perform information filtering, policy control, topology hiding, and the like on an internal control plane interface of the HPLMN. The vSEPP is connected to the hSEPP through an N32 interface ("N32" for short). For all related descriptions, refer to a 5G system architecture in the standard 23.501. Details are not described herein.

Figure 6:
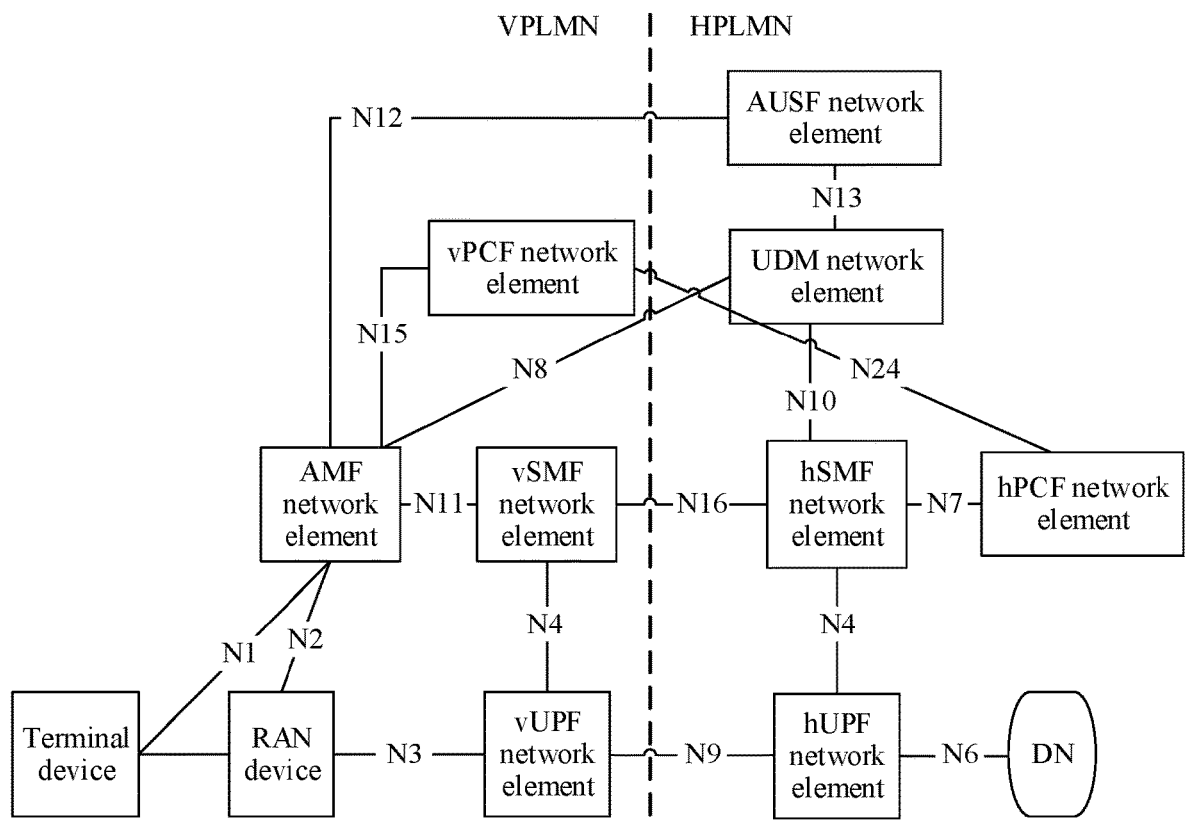
FIG. 6 shows a 5G network architecture 1 in a home routed roaming scenario according to an embodiment of this application.

Alternatively, for example, assuming that the communication system 10 shown in FIG. 1 is applied to a 5G network architecture in a home routed (HR) roaming scenario, as shown in FIG. 6, the network element or the entity corresponding to the mobility management network element may be an AMF network element in the non-roaming 5G network architecture, and the network element or the entity corresponding to the access network device may be a RAN device in the non-roaming 5G network architecture.

In addition, as shown in FIG. 6, the local breakout roaming 5G network architecture may further include a visited UPF (vUPF) network element, a visited SMF (vSMF) network element, a vPCF network element, an AUSF network element, a home SMF (hSMF) network element, a home UPF (hUPF) network element, an hPCF network element, a UDM network element, or an AUSF network element. The UDM network element, the AUSF network element, the hSMF network element, the hPCF network element, or the hUPF network element belongs to an HPLMN. The RAN device, the AMF network element, the vSMF network element, the vUPF network element, or the vPCF network element belongs to a VPLMN.

The terminal device communicates with the AMF network element through an N1 interface ("N1" for short). The RAN device communicates with the AMF network element through an N2 interface ("N2" for short), and the RAN device communicates with the vUPF network element through an N3 interface ("N3" for short). The vUPF network element communicates with the hUPF network element through an N9 interface ("N9" for short). The hUPF network element communicates with a DN through an N6 interface ("N6" for short). The AMF network element communicates with the vSMF network element through an N11 interface ("N11" for short). The vSMF network element communicates with the hSMF network element through an N16 interface ("N16" for short). The AMF network element communicates with the UDM network element through an N8 interface ("N8" for short), the AMF network element communicates with the AUSF network element through an N12 interface ("N12" for short), and the AMF network element communicates with the vPCF network element through an N15 interface ("N15" for short). The vPCF network element communicates with the hPCF network element through an N24 interface ("N24" for short). The vSMF network element communicates with the vUPF network element through an N4 interface ("N4" for short). The hSMF network element communicates with the hUPF network element through an N4 interface ("N4" for short), the hSMF network element communicates with the UDM network element through an N10 interface ("N10" for short), and the hSMF network element communicates with the hPCF network element through an N7 interface ("N7" for short). The UDM network element communicates with the AUSF network element through an N13 interface ("N13" for short).

Figure 7:
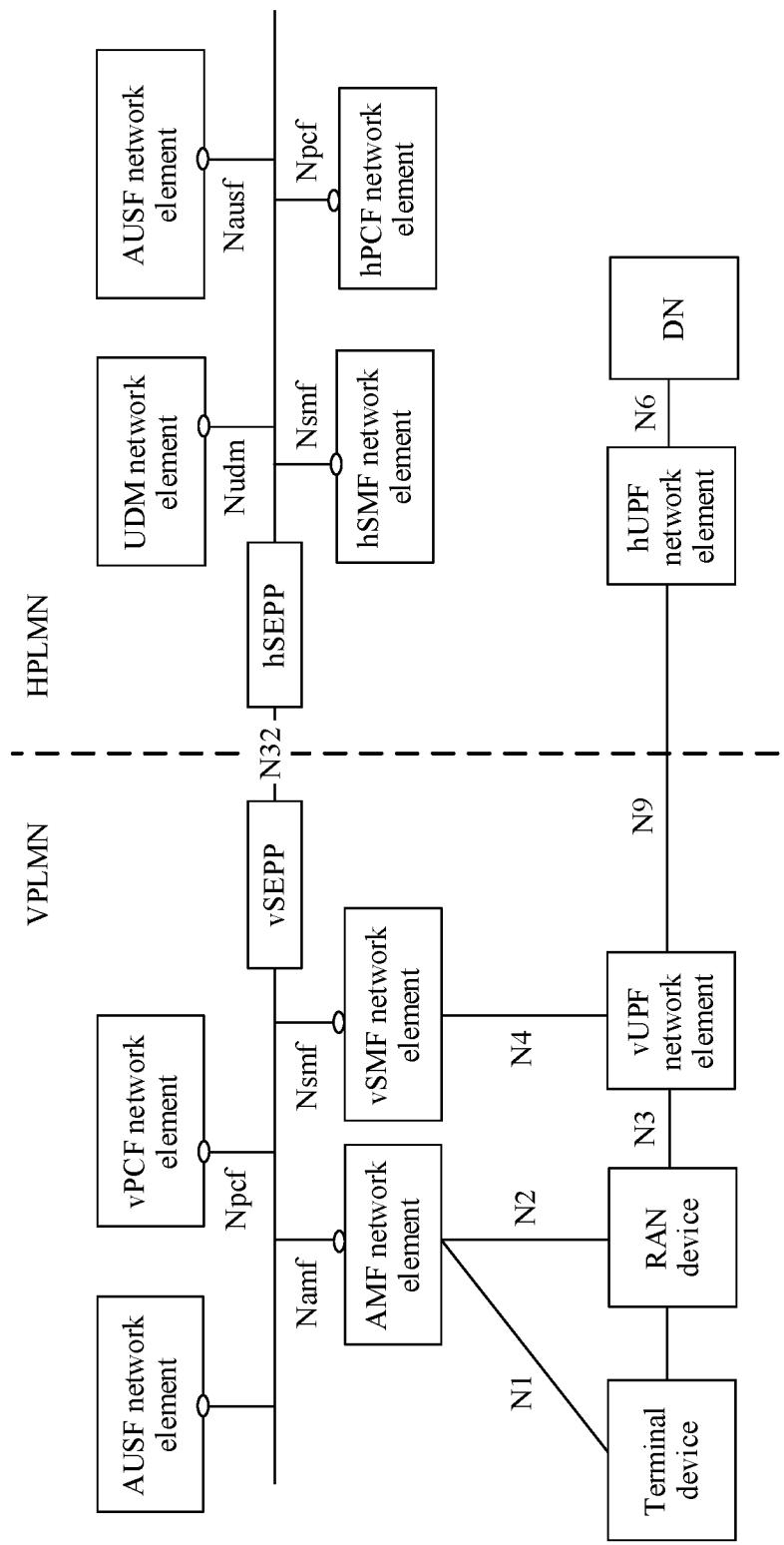
FIG. 7 shows a 5G network architecture 2 in a home routed roaming scenario according to an embodiment of this application.

In addition, it should be noted that control plane network elements such as the AMF network element, the vSMF network element, the hSMF network element, the UDM network element, the AUSF network element, the vPCF network element, or the hPCF network element in the home routed roaming 5G network architecture shown in FIG. 6 may alternatively interact with each other through a service-oriented interface. For example, as shown in FIG. 7, a service-oriented interface externally provided by the AMF network element may be Namf, a service-oriented interface externally provided by the vSMF network element may be Nsmf, a service-oriented interface externally provided by the hSMF network element may be Nsmf, a service-oriented interface externally provided by the UDM network element may be Nudm, a service-oriented interface externally provided by the vPCF network element may be Npcf, a service-oriented interface externally provided by the hPCF network element may be Npcf, and a service-oriented interface externally provided by the AUSF network element may be Nausf. In addition, a vSEPP in FIG. 7 is configured to perform information filtering, policy control, topology hiding, and the like on an internal control plane interface of the VPLMN. An hSEPP in FIG. 7 is configured to perform information filtering, policy control, topology hiding, and the like on an internal control plane interface of the HPLMN. The vSEPP is connected to the hSEPP through an N32 interface ("N32" for short). For all related descriptions, refer to a 5G system architecture in the standard 23.501. Details are not described herein.

Optionally, the terminal device in the embodiments of this application may be a device configured to implement a wireless communication function, for example, a terminal or a chip that may be used in the terminal. The terminal may be a user equipment (UE), an access terminal, a terminal unit, a terminal station, a mobile station, a mobile console, a remote station, a remote terminal, a mobile device, a wireless communication device, a terminal agent, a terminal apparatus, or the like in a 5G network or a future evolved PLMN. The access terminal may be a cellular phone, a cordless phone, a session initiation protocol (SIP) phone, a wireless local loop (WLL) station, a personal digital assistant (PDA), a handheld device or a computing device having a wireless communication function, another processing device connected to a wireless modem, a vehicle-mounted device, a wearable device, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. The terminal may be mobile or fixed.

Optionally, the RAN device in the embodiments of this application is a device that accesses a core network. For example, the RAN device may be a base station, a broadband network gateway (BNG), an aggregation switch, or a non-3rd generation partnership project (3GPP) access device. There may be various forms of base stations, for example, a macro base station, a micro base station (also referred to as a small cell), a relay station, and an access point.

Optionally, the session management network element, the user plane network element, the policy control network element, or the application network element in the embodiments of this application may also be referred to as a communication apparatus, and may be a general-purpose device or a special-purpose device. This is not specifically limited in the embodiments of this application.

Optionally, a related function of the mobility management network element or the access network device in this embodiment of this application may be implemented by one device, may be jointly implemented by a plurality of devices, or may be implemented by one or more function modules in one device. This is not specifically limited in this embodiment of this application. It may be understood that the foregoing function may be a network element in a hardware device, a software function running on dedicated hardware, a combination of hardware and software, or a virtualization function instantiated on a platform (for example, a cloud platform).

Figure 8:
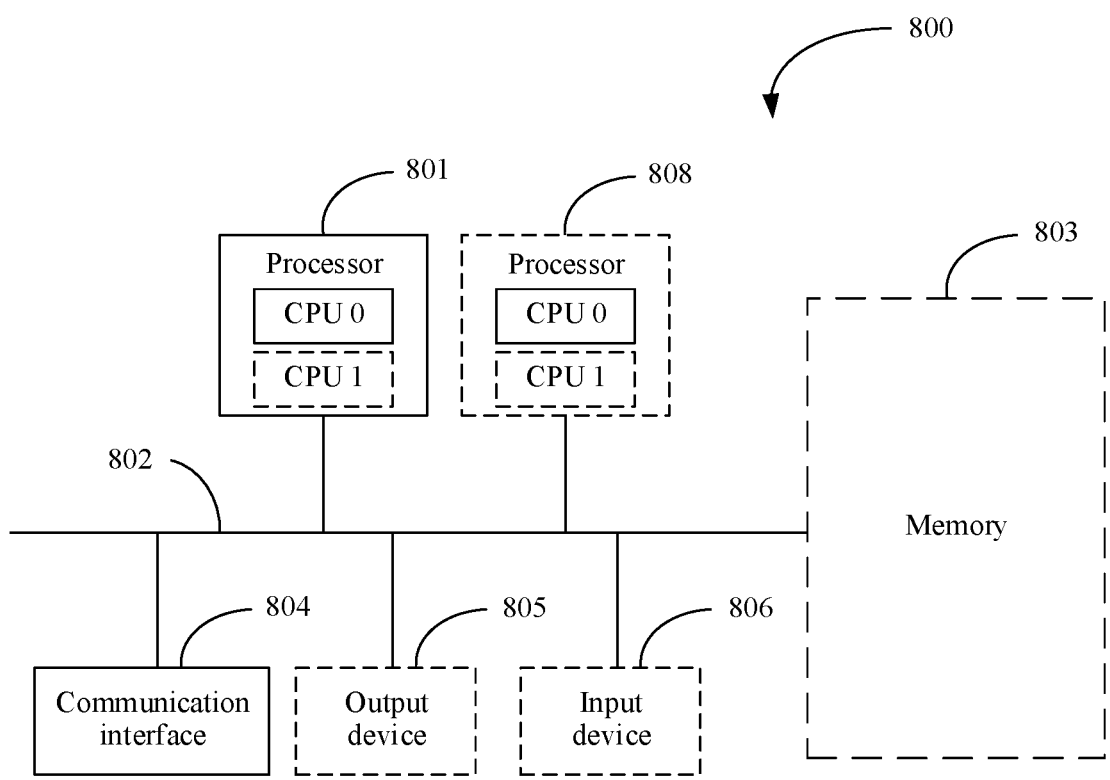
FIG. 8 is a schematic diagram of a structure of a communication device according to an embodiment of this application.

For example, the related function of the mobility management network element or the access network device in this embodiment of this application may be implemented by a communication device 800 in FIG. 8. FIG. 8 is a schematic diagram of a structure of the communication device 800 according to an embodiment of this application. The communication device 800 includes one or more processors 801, a communication line 802, and at least one communication interface (in FIG. 8, only an example in which a communication interface 804 and one processor 801 are included is used for description). Optionally, the communication device 800 may further include a memory 803.

The processor 801 may be a general-purpose central processing unit (CPU), a microprocessor, an application-specific integrated circuit (ASIC), or one or more integrated circuits configured to control program execution of the solutions in this application.

The communication line 802 may include a path for connecting different components.

The communication interface 804 may be a transceiver module configured to communicate with another device or a communication network, for example, the Ethernet, a RAN, or a wireless local area network (WLAN). For example, the transceiver module may be an apparatus such as a transceiver or a transceiver machine. Optionally, the communication interface 804 may alternatively be a transceiver circuit located in the processor 801, to implement signal input and signal output of the processor.

The memory 803 may be an apparatus having a storage function. For example, the memory may be a read-only memory (ROM), another type of static storage device that can store static information and instructions, a random access memory (RAM), or another type of dynamic storage device that can store information and instructions, or may be an electrically erasable programmable read-only memory (EEPROM), a compact disc read-only memory (CD-ROM), another optical disk storage, an optical disc storage (including a compact disc, a laser disc, an optical disc, a digital versatile disc, a Blu-ray disc, and the like), a disk storage medium, another magnetic storage device, or any other medium that can be used to carry or store expected program code in a form of instructions or a data structure and that can be accessed by a computer. However, this is not limited thereto. The memory may exist independently, and is connected to the processor by using the communication line 802. The memory may alternatively be integrated into the processor.

The memory 803 is configured to store computer-executable instructions for executing the solutions of this application, and the processor 801 controls the execution. The processor 801 is configured to execute the computer-executable instructions stored in the memory 803, to implement an AMBR control method provided in the embodiments of this application.

Optionally, in this embodiment of this application, the processor 801 may perform processing-related functions in the AMBR control method provided in the following embodiments of this application. The communication interface 804 is responsible for communicating with another device or another communication network. This is not specifically limited in this embodiment of this application.

Optionally, the computer-executable instructions in this embodiment of this application may also be referred to as application program code. This is not specifically limited in this embodiment of this application.

During specific implementation, in an embodiment, the processor 801 may include one or more CPUs, for example, a CPU 0 and a CPU 1 in FIG. 8.

During specific implementation, in an embodiment, the communication device 800 may include a plurality of processors, for example, the processor 801 and the processor 808 in FIG. 8. Each of these processors may be a single-core processor or a multi-core processor. The processor herein may include but is not limited to at least one of the following various computing devices that run software: a central processing unit (CPU), a microprocessor, a digital signal processor (DSP), a microcontroller unit (MCU), an artificial intelligence processor, or the like. Each computing device may include one or more cores configured to perform an operation or processing by executing software instructions.

During specific implementation, in an embodiment, the communication device 800 may further include an output device 805 and an input device 806. The output device 805 communicates with the processor 801, and may display information in a plurality of manners. For example, the output device 805 may be a liquid crystal display (LCD), a light emitting diode (LED) display device, a cathode ray tube (CRT) display device, or a projector. The input device 806 communicates with the processor 801, and may receive input of a user in a plurality of manners. For example, the input device 806 may be a mouse, a keyboard, a touchscreen device, or a sensing device.

The communication device 800 may also be referred to as a communication apparatus sometimes, and may be a general-purpose device or a dedicated device. For example, the communication device 800 may be a desktop computer, a portable computer, a network server, a personal digital assistant (PDA), a mobile phone, a tablet computer, a wireless terminal device, an embedded device, the foregoing terminal device, the foregoing network device, or a device having a structure similar to the structure shown in FIG. 8. A type of the communication device 800 is not limited in this embodiment of this application.

The following describes in detail the AMBR control method provided in the embodiments of this application with reference to FIG. 1 to FIG. 8.

It should be noted that names of messages between network elements, names of parameters in the messages, or the like in the following embodiments of this application are merely examples, and there may be other names in a specific implementation. This is not specifically limited in the embodiments of this application.

Figure 9:
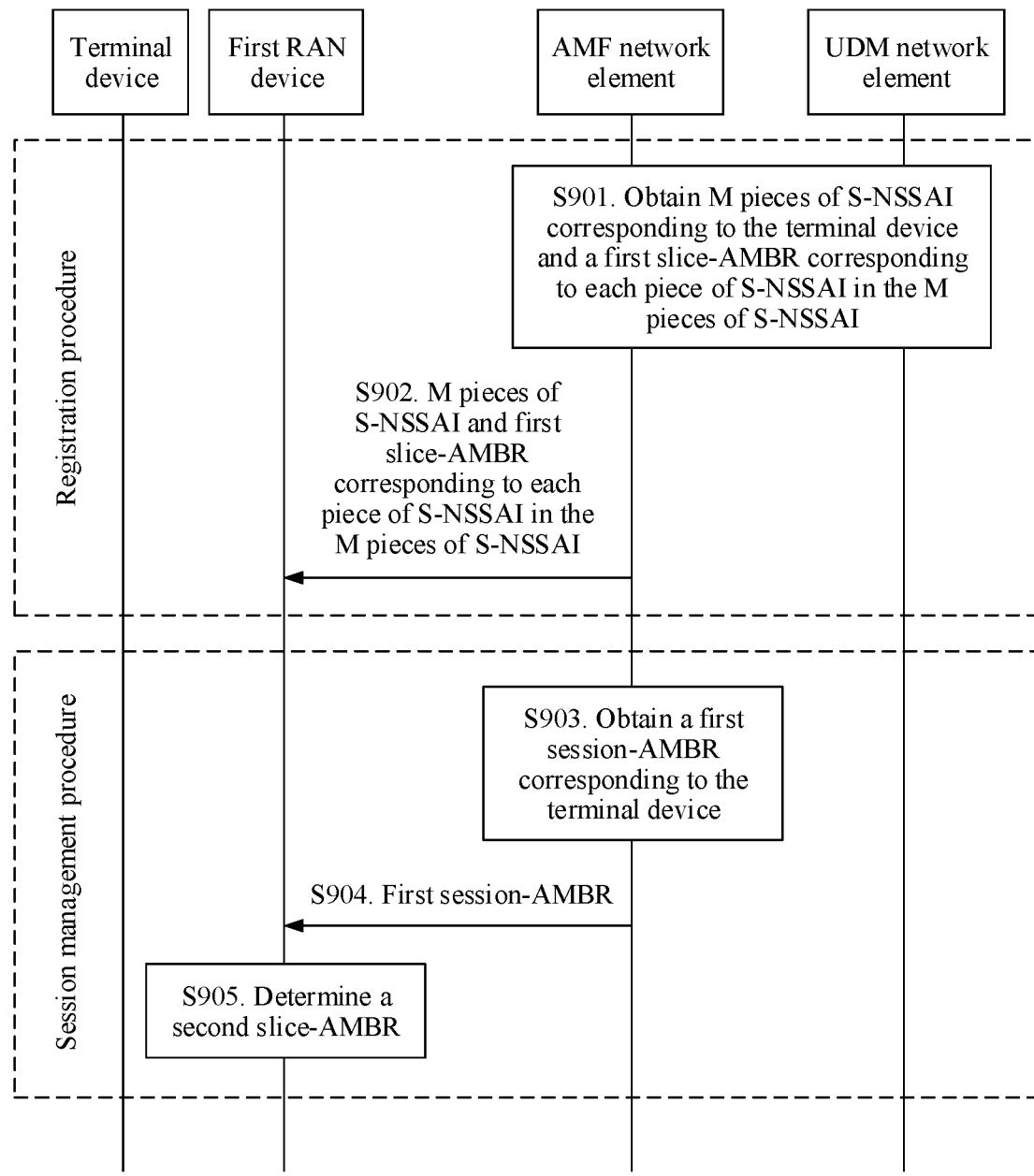
FIG. 9 is a schematic flowchart 1 of an AMBR control method according to an embodiment of this application.

First, an example in which the communication system shown in FIG. 1 is applied to the 5G network architecture shown in any one of FIG. 2 to FIG. 7 is used. FIG. 9 shows an AMBR control method according to an embodiment of this application. The AMBR control method includes the following steps.

S901. In a registration process of a terminal device, an AMF network element interacts with a UDM network element to obtain M pieces of S-NSSAI corresponding to the terminal device and a first slice-AMBR corresponding to each piece of S-NSSAI in the M pieces of S-NSSAI.

It may be understood that, in this embodiment of this application, because the first slice-AMBR corresponding to each piece of S-NSSAI in the M pieces of S-NSSAI is obtained from the UDM network element, the first slice-AMBR corresponding to each piece of S-NSSAI in the M pieces of S-NSSAI is a subscribed first slice-AMBR corresponding to the S-NSSAI. Unified descriptions are provided herein, and details are not described below again.

Descriptions are provided for several scenarios below.

Scenario 1: The communication system shown in FIG. 1 is applied to the 5G network architecture in the non-roaming scenario shown in FIG. 2 or FIG. 3. Each piece of S-NSSAI in the M pieces of S-NSSAI corresponding to the terminal device is S-NSSAI in a home network of the terminal device, and M is a positive integer.

In a possible implementation, that the AMF network element interacts with the UDM network element to obtain the M pieces of S-NSSAI corresponding to the terminal device and the first slice-AMBR corresponding to each piece of S-NSSAI in the M pieces of S-NSSAI includes: The AMF network element receives the M pieces of S-NSSAI corresponding to the terminal device and the first slice-AMBR corresponding to each piece of S-NSSAI in the M pieces of S-NSSAI from the UDM network element.

Optionally, in this implementation, before the AMF network element receives the M pieces of S-NSSAI corresponding to the terminal device and the first slice-AMBR corresponding to each piece of S-NSSAI in the M pieces of S-NSSAI from the UDM network element, the AMF network element may send default NSSAI of the terminal device or allowed NSSAI of the terminal device to the UDM network element, where the default NSSAI of the terminal device or the allowed NSSAI of the terminal device includes the M pieces of S-NSSAI corresponding to the terminal device. This is not specifically limited in this embodiment of this application.

In another possible implementation, that the AMF network element interacts with the UDM network element to obtain the M pieces of S-NSSAI corresponding to the terminal device and the first slice-AMBR corresponding to each piece of S-NSSAI in the M pieces of S-NSSAI includes: The AMF network element receives N pieces of S-NSSAI corresponding to the terminal device and a first slice-AMBR corresponding to each piece of S-NSSAI in the N pieces of S-NSSAI from the UDM network element, where each piece of S-NSSAI in the N pieces of S-NSSAI is S-NSSAI in the home network of the terminal device; and the AMF network element determines, based on default NSSAI of the terminal device or allowed NSSAI of the terminal device and the first slice-AMBR corresponding to each piece of S-NSSAI in the N pieces of S-NSSAI, the M pieces of S-NSSAI corresponding to the terminal device and the first slice-AMBR corresponding to each piece of S-NSSAI in the M pieces of S-NSSAI, where the default NSSAI of the terminal device or the allowed NSSAI of the terminal device includes the M pieces of S-NSSAI corresponding to the terminal device, each piece of S-NSSAI in the M pieces of S-NSSAI corresponding to the terminal device is S-NSSAI in the N pieces of S-NSSAI corresponding to the terminal device, and N is a positive integer greater than or equal to M.

For example, it is assumed that a mapping relationship between the N pieces of S-NSSAI corresponding to the terminal device and the first slice-AMBR corresponding to each piece of S-NSSAI in the N pieces of S-NSSAI is shown in Table 1, and the default NSSAI of the terminal device or the allowed NSSAI of the terminal device includes S-NSSAI 1 and S-NSSAI 2. In this case, a mapping relationship between the M pieces of S-NSSAI corresponding to the terminal device and the first slice-AMBR corresponding to each piece of S-NSSAI in the M pieces of S-NSSAI may be shown in Table 2.

TABLE 1

| S-NSSAI | First slice-AMBR |
| --- | --- |
| S-NSSAI 1 | Slice-AMBR 1 |
| S-NSSAI 2 | Slice-AMBR 2 |
| S-NSSAI 3 | Slice-AMBR 3 |
| S-NSSAI 4 | Slice-AMBR 4 |
| ... | ... |

TABLE 2

| S-NSSAI | First slice-AMBR |
| --- | --- |
| S-NSSAI 1 | Slice-AMBR 1 |
| S-NSSAI 2 | Slice-AMBR 2 |

It should be noted that Table 1 and Table 2 each merely show an example of the mapping relationship. Certainly, the mapping relationship may alternatively be represented in other manners. For example, the mapping relationship in Table 2 may be represented as {S-NSSAI 1, slice-AMBR 1} and {S-NSSAI 2, slice-AMBR 2}. A representation manner of the mapping relationship is not specifically limited in this embodiment of this application. Unified descriptions are provided herein, and details are not described below again.

Scenario 2: The communication system shown in FIG. 1 is applied to the 5G network architecture in the roaming scenario shown in any one of FIG. 4 to FIG. 7. Each piece of S-NSSAI in the M pieces of S-NSSAI corresponding to the terminal device is S-NSSAI in a home network of the terminal device, and M is a positive integer.

For a manner that corresponds to this scenario and in which the AMF network element interacts with the UDM network element to obtain the M pieces of S-NSSAI corresponding to the terminal device and the first slice-AMBR corresponding to each piece of S-NSSAI in the M pieces of S-NSSAI, refer to the descriptions in the foregoing scenario 1, and details are not described herein again.

Scenario 3: The communication system shown in FIG. 1 is applied to the 5G network architecture in the roaming scenario shown in any one of FIG. 4 to FIG. 7. Each piece of S-NSSAI in the M pieces of S-NSSAI corresponding to the terminal device is S-NSSAI in a visited network of the terminal device, and M is a positive integer.

In a possible implementation, that the AMF network element interacts with the UDM network element to obtain the M pieces of S-NSSAI corresponding to the terminal device and the first slice-AMBR corresponding to each piece of S-NSSAI in the M pieces of S-NSSAI includes: The AMF network element receives K pieces of S-NSSAI corresponding to the terminal device and a first slice-AMBR corresponding to each piece of S-NSSAI in the K pieces of S-NSSAI from the UDM network element, where each piece of S-NSSAI in the K pieces of S-NSSAI is S-NSSAI in a home network of the terminal device; and the AMF network element determines, based on S-NSSAI that is in the visited network and that corresponds to each piece of S-NSSAI in the K pieces of S-NSSAI, the M pieces of S-NSSAI corresponding to the terminal device and the first slice-AMBR corresponding to each piece of S-NSSAI in the M pieces of S-NSSAI, where K is a positive integer greater than or equal to M.

For example, a mapping relationship between the K pieces of S-NSSAI and the M pieces of S-NSSAI may be shown in Table 3:

TABLE 3

| S-NSSAI (H-S-NSSAI) | S-NSSAI (V-S-NSSAI) |
| --- | --- |
| S-NSSAI 1 | S-NSSAI A |
| S-NSSAI 2 | |
| S-NSSAI 3 | S-NSSAI B |
| S-NSSAI 4 | S-NSSAI C |
| | S-NSSAI D |
| ... | ... |

It can be learned from Table 3 that, in this embodiment of this application, S-NSSAI (denoted as H-S-NSSAI) in one HPLMN may correspond to S-NSSAI (denoted as V-S-NSSAI) in one or more VPLMNs, or S-NSSAI (that is, H-S-NSSAI) in a plurality of HPLMNs may correspond to S-NSSAI (that is, V-S-NSSAI) in one VPLMN. This is not specifically limited in this embodiment of this application. Unified descriptions are provided herein, and details are not described below again.

In another possible implementation, that the AMF network element interacts with the UDM network element to obtain the M pieces of S-NSSAI corresponding to the terminal device and the first slice-AMBR corresponding to each piece of S-NSSAI in the M pieces of S-NSSAI includes: The AMF network element receives N pieces of S-NSSAI corresponding to the terminal device and a first slice-AMBR corresponding to each piece of S-NSSAI in the N pieces of S-NSSAI from the UDM network element, where each piece of S-NSSAI in the N pieces of S-NSSAI is S-NSSAI in a home network of the terminal device; and the AMF network element determines, based on the first slice-AMBR corresponding to each piece of S-NSSAI in the N pieces of S-NSSAI, S-NSSAI that is in the visited network and that corresponds to each piece of S-NSSAI in the N pieces of S-NSSAI, and allowed NSSAI of the terminal device or default NSSAI of the terminal device, the M pieces of S-NSSAI corresponding to the terminal device and the first slice-AMBR corresponding to each piece of S-NSSAI in the M pieces of S-NSSAI, where the allowed NSSAI of the terminal device includes the M pieces of S-NSSAI corresponding to the terminal device, the default NSSAI of the terminal device includes X pieces of S-NSSAI, each piece of S-NSSAI in the X pieces of S-NSSAI is S-NSSAI in the home network of the terminal device, the M pieces of S-NSSAI corresponding to the terminal device are obtained by mapping based on the X pieces of S-NSSAI, X is a positive integer, and N is a positive integer greater than or equal to M.

For example, it is assumed that a mapping relationship between the N pieces of S-NSSAI and the first slice-AMBR corresponding to each piece of S-NSSAI in the N pieces of S-NSSAI is shown in the foregoing Table 1, a mapping relationship between the N pieces of S-NSSAI (denoted as H-S-NSSAI) and S-NSSAI (denoted as V-S-NSSAI) in the corresponding visited network is shown in Table 3, and the default NSSAI of the terminal device includes the S-NSSAI 1, the S-NSSAI 2, and the S-NSSAI 3. With reference to the mapping relationship in Table 3, it can be learned that the M pieces of S-NSSAI include the S-NSSAI A and the S-NSSAI B. Then, with reference to the mapping relationships shown in Table 1 and Table 3, it can be learned that a mapping relationship between the M pieces of S-NSSAI corresponding to the terminal device and the first slice-AMBR corresponding to each piece of S-NSSAI in the M pieces of S-NSSAI may be shown in Table 4.

TABLE 4

| S-NSSAI (V-S-NSSAI) | First slice-AMBR |
| --- | --- |
| S-NSSAI A | Slice-AMBR 1 |
|  | Slice-AMBR 2 |
| S-NSSAI B | Slice-AMBR 3 |

For example, a mapping relationship between the S-NSSAI A and the corresponding first slice-AMBR in Table 4 may alternatively be represented as S-NSSAI A: Slice-AMBR 1+Slice-AMBR 2. This is not specifically limited in this embodiment of this application.

Alternatively, for example, it is assumed that a mapping relationship between the N pieces of S-NSSAI and the first slice-AMBR corresponding to each piece of S-NSSAI in the N pieces of S-NSSAI is shown in the foregoing Table 1, a mapping relationship between the N pieces of S-NSSAI (denoted as H-S-NSSAI) and S-NSSAI (denoted as V-S-NSSAI) in the corresponding visited network is shown in Table 3, and the allowed NSSAI of the terminal device includes the S-NSSAI A and the S-NSSAI B. It can be learned that the M pieces of S-NSSAI include the S-NSSAI A and the S-NSSAI B. Then, with reference to the mapping relationships shown in Table 1 and Table 3, it can be learned that a mapping relationship between the M pieces of S-NSSAI corresponding to the terminal device and the first slice-AMBR corresponding to each piece of S-NSSAI in the M pieces of S-NSSAI may be shown in Table 4.

Further, the first slice-AMBR in this embodiment of this application may correspond to a first access network type, that is, the first slice-AMBR is information that needs to be used when a RAN device corresponding to the first access network type performs AMBR control.

In a possible implementation, the AMF network element obtains, from the UDM network element, slice-AMBRs corresponding to a plurality of access network types corresponding to S-NSSAI, where the slice-AMBRs corresponding to the plurality of access network types include the first slice-AMBR corresponding to the first access network type. For example, a mapping relationship between S-NSSAI, an access network type, and a corresponding slice-AMBR obtained by the AMF network element from the UDM network element may be shown in Table 5.

TABLE 5

| S-NSSAI | Access network type | Slice-AMBR |
| --- | --- | --- |
| S-NSSAI 1 | Access network type 1 | Slice-AMBR 1 |
|  | Access network type 2 | Slice-AMBR 2 |
| S-NSSAI 2 | Access network type 1 | Slice-AMBR 3 |
|  | Access network type 2 | Slice-AMBR 4 |
| ... | ... | ... |

Assuming that an access network type is the access network type 1, it can be learned from Table 5 that a first slice-AMBR corresponding to the S-NSSAI 1 is the slice-AMBR 1, and a first slice-AMBR corresponding to the S-NSSAI 2 is the slice-AMBR 3.

In another possible implementation, in the registration process of the terminal device, the AMF network element may send a first access network type of a first RAN device to the UDM network element. After determining a first slice-AMBR corresponding to the first access network type, the UDM network element sends the first slice-AMBR corresponding to the first access network type to the AMF network element. This is not specifically limited in this embodiment of this application.

Optionally, in this embodiment of this application, in the registration process of the terminal device, the AMF network element may further interact with the UDM network element, to obtain a first UE-AMBR corresponding to the terminal device. The first UE-AMBR is a subscribed first UE-AMBR.

Optionally, in this embodiment of this application, the first UE-AMBR may correspond to the first access network type, that is, the first UE-AMBR corresponding to the first access network type is information that needs to be used when the RAN device corresponding to the first access network type performs AMBR control.

In a possible implementation, the AMF network element obtains, from the UDM network element, UE-AMBRs corresponding to a plurality of access network types, where the UE-AMBRs corresponding to the plurality of access network types include the first UE-AMBR corresponding to the first access network type. For example, a mapping relationship between an access network type and a corresponding UE-AMBR obtained by the AMF network element from the UDM network element may be shown in Table 6.

TABLE 6

| Access network type | UE-AMBR |
|---|---|
| Access network type 1 | UE-AMBR 1 |
| Access network type 2 | UE-AMBR 2 |
| ... | ... |

Assuming that an access network type is the access network type 1, it can be learned from Table 6 that a first UE-AMBR corresponding to the access network type 1 is the UE-AMBR 1.

Optionally, in this embodiment of this application, in the registration procedure of the terminal device, the AMF network element may alternatively interact with a PCF network element in a serving network (for example, an HPLMN in a non-roaming scenario or a VPLMN in a roaming scenario) of the terminal device to obtain a first UE-AMBR corresponding to the terminal device, where the first UE-AMBR is a first UE-AMBR authorized by the PCF network element in the serving network of the terminal device. The PCF network element in the serving network of the terminal device may provide UE-AMBRs corresponding to a plurality of access network types, and the UE-AMBRs corresponding to the plurality of access network types include the first UE-AMBR corresponding to the first access network type. Alternatively, the PCF network element in the serving network of the terminal device may provide the first UE-AMBR corresponding to the first access network type. This is not specifically limited in this embodiment of this application.

S902. The AMF network element sends the M pieces of S-NSSAI and the first slice-AMBR corresponding to each piece of S-NSSAI in the M pieces of S-NSSAI to the first RAN device. Correspondingly, the first RAN device receives the M pieces of S-NSSAI and the first slice-AMBR corresponding to each piece of S-NSSAI in the M pieces of S-NSSAI from the AMF network element.

Optionally, in this embodiment of this application, if the first slice-AMBR corresponds to the first access network type, the first access network type is an access network type of the first RAN device. Unified descriptions are provided herein, and details are not described below again.

It should be noted that, in a scenario in which the terminal device is connected to a plurality of RAN devices, interaction between the AMF network element and the first RAN device is used as an example for description in this embodiment of this application. The first RAN device is any one of the plurality of RAN devices. Unified descriptions are provided herein, and details are not described below again.

Optionally, in this embodiment of this application, in the foregoing scenario 2, the AMF network element may further send, to the first RAN device, S-NSSAI that is in a visited network of the terminal device and that corresponds to each piece of S-NSSAI in the M pieces of S-NSSAI corresponding to the terminal device. Correspondingly, the first RAN device receives, from the AMF network element, the S-NSSAI that is in the visited network of the terminal device and that corresponds to each piece of S-NSSAI in the M pieces of S-NSSAI corresponding to the terminal device.

Optionally, in this embodiment of this application, in the foregoing scenario 3, the AMF network element may further send, to the first RAN device, S-NSSAI that is in a home network of the terminal device and that corresponds to each piece of S-NSSAI in the M pieces of S-NSSAI corresponding to the terminal device. Correspondingly, the first RAN device receives, from the AMF network element, the S-NSSAI that is in the home network of the terminal device and that corresponds to each piece of S-NSSAI in the M pieces of S-NSSAI corresponding to the terminal device.

For example, a mapping relationship between the M pieces of S-NSSAI, the first slice-AMBR corresponding to each piece of S-NSSAI in the M pieces of S-NSSAI, and the S-NSSAI that is in the home network or the visited network of the terminal device and that corresponds to each piece of S-NSSAI in the M pieces of S-NSSAI may be shown in Table 7.

TABLE 7

| S-NSSAI (H-S-NSSAI) | S-NSSAI (V-S-NSSAI) | First slice-AMBR |
|---|---|---|
| S-NSSAI 1 | S-NSSAI A | Slice-AMBR 1 |
| S-NSSAI 2 |  | Slice-AMBR 2 |
| S-NSSAI 3 | S-NSSAI B | Slice-AMBR 3 |
| S-NSSAI 4 | S-NSSAI C | Slice-AMBR 4 |
|  | S-NSSAI D |  |
| ... | ... | ... |

Optionally, in this embodiment of this application, if the AMF network element may obtain the first UE-AMBR corresponding to the terminal device in step S901, the AMF network element further sends the first UE-AMBR corresponding to the terminal device to the first RAN device. If the first UE-AMBR corresponds to the first access network type, the first access network type is the access network type of the first RAN device. Unified descriptions are provided herein, and details are not described below again.

S903. In a session management procedure of a first session of the terminal device, the AMF network element obtains a first session-AMBR of the first session. The first session-AMBR is an authorized session-AMBR.

Optionally, the first session-AMBR in this embodiment of this application may correspond to the first access network type, that is, the first session-AMBR obtained by the AMF network element is a first session-AMBR corresponding to a first access network type of the first session, and the first access network type is the access network type of the first RAN device.

Optionally, in this embodiment of this application, the AMF network element may interact with an SMF network element in the serving network (for example, an HPLMN in a non-roaming scenario or a VPLMN in a roaming scenario) of the terminal device to obtain the first session-AMBR of the first session. For an HR session in the roaming scenario, the SMF network element in the serving network further obtains the first session-AMBR of the first session from an hSMF network element. This is not specifically limited in this embodiment of this application.

In a possible implementation, for a session in the non-roaming scenario and an LBO session in the roaming scenario, the SMF network element in the serving network of the terminal device may obtain a session-AMBR of the first session from the UDM network element. When the first session includes a plurality of access types (multi-access), the SMF network element determines first session-AMBRs corresponding to a plurality of access network types of the first session, based on the session-AMBR of the first session and with reference to at least one of a local policy, information about (for example, a quantity of) non-GBR QoS flows established based on each access type, and service attributes (which may be provided by a big data analytics network element) of services transmitted on the non-GBR QoS flows established based on each access type, where the first session-AMBRs corresponding to the plurality of access network types include the first session-AMBR corresponding to the first access network type. For example, assuming that the session-AMBR of the first session is 100 M, and the first session includes an access network type 1 and an access network type 2, when the first session includes both of the two access network types, the SMF network element may determine, according to the local policy (for example, an allocation ratio of access corresponding to the access network type 1 to access corresponding to the access network type 2 is 2:3), that a first session-AMBR corresponding to the access network type 1 of the first session is 40 M, and that a first session-AMBR corresponding to the access network type 2 of the first session is 60 M. For the HR session in the roaming scenario, the foregoing behavior of the SMF network element in the serving network is performed by the hSMF network element in the home network of the terminal device. Details are not described herein again.

In another possible implementation, for a session in the non-roaming scenario and an LBO session in the roaming scenario, the SMF network element in the serving network of the terminal device may obtain a session-AMBR of the first session from the UDM network element, and then send the session-AMBR of the first session to the PCF network element in the serving network of the terminal device. When the first session includes a plurality of access types, the PCF network element determines first session-AMBRs corresponding to a plurality of access network types of the first session, based on the session-AMBR of the first session and with reference to at least one of a local policy, information about (for example, a quantity of) non-GBR QoS flows established based on each access type, and service attributes (which may be provided by a big data analytics network element) of services transmitted on the non-GBR QoS flows established based on each access type, and then sends the first session-AMBRs corresponding to the plurality of access network types of the first session to the SMF network element in the serving network of the terminal device. The first session-AMBRs corresponding to the plurality of access network types include the first session-AMBR corresponding to the first access network type. For an example in which the PCF network element in the serving network of the terminal device determines, based on the session-AMBR of the first session, the first session-AMBRs corresponding to the plurality of access network types of the first session, refer to the foregoing example in which the SMF network element in the serving network of the terminal device determines, based on the session-AMBR of the first session, the first session-AMBRs corresponding to the plurality of access network types of the first session. Details are not described herein again. For the HR session in the roaming scenario, the foregoing behavior of the SMF network element in the serving network is performed by the hSMF network element in the home network of the terminal device. Details are not described herein again.

In still another possible implementation, for a session in the non-roaming scenario and an LBO session in the roaming scenario, the SMF network element in the serving network of the terminal device may obtain, from the UDM network element, session-AMBRs corresponding to a plurality of access network types of the first session. When the first session includes one access type, the SMF network element determines a session-AMBR corresponding to the first access network type of the first session as the first session-AMBR corresponding to the first access network type of the first session. When the first session includes a plurality of access types, the SMF network element determines, based on the session-AMBRs corresponding to the plurality of access network types of the first session, the first session-AMBRs corresponding to the plurality of access network types of the first session. For example, the session-AMBRs that correspond to the plurality of access network types of the first session and that may be obtained by the SMF network element in the serving network of the terminal device from the UDM network element include a session-AMBR of 100 M corresponding to an access network type 1 and a session-AMBR of 80 M corresponding to an access network type 2. When the first session includes both of the two access network types, the SMF network element may determine that a first session-AMBR corresponding to the access network type 1 of the first session is (100+80)/2*100/(100+80)=50, and that a first session-AMBR corresponding to the access network type 2 of the first session is (100+80)/2*80/(100+80)=40. For the HR session in the roaming scenario, the foregoing behavior of the SMF network element in the serving network is performed by the hSMF network element in the home network of the terminal device. Details are not described herein again.

In yet another possible implementation, for a session in the non-roaming scenario and an LBO session in the roaming scenario, the SMF network element in the serving network of the terminal device may obtain session-AMBRs corresponding to a plurality of access network types of the first session from the UDM network element, and then send the session-AMBRs corresponding to the plurality of access network types of the first session to the PCF network element in the serving network of the terminal device. When the first session includes one access type, the PCF network element determines, based on a session-AMBR corresponding to the first access network type of the first session, the first session-AMBR corresponding to the first access network type of the first session, and then sends the first session-AMBR corresponding to the first access network type of the first session to the SMF network element in the serving network of the terminal device. When the first session includes a plurality of access types, the PCF network element determines, based on session-AMBRs corresponding to a plurality of access network types of the first session, first session-AMBRs corresponding to the plurality of access network types of the first session, and then sends the first session-AMBRs corresponding to the plurality of access network types of the first session to the SMF network element in the serving network of the terminal device. The first session-AMBRs corresponding to the plurality of access network types include the first session-AMBR corresponding to the first access network type. For an example in which the PCF network element determines, based on the session-AMBRs corresponding to the plurality of access network types of the first session, the first session-AMBRs corresponding to the plurality of access network types of the first session, refer to the foregoing example in which the SMF network element in the serving network of the terminal device determines, based on the session-AMBRs corresponding to the plurality of access network types of the first session, the first session-AMBRs corresponding to the plurality of access network types of the first session. Details are not described herein again. For the HR session in the roaming scenario, the foregoing behavior of the SMF network element in the serving network is performed by the hSMF network element in the home network of the terminal device. Details are not described herein again.

It should be noted that, in this embodiment of this application, a manner in which the SMF network element in the serving network of the terminal device determines the first session-AMBR of the first session is not only applicable to this embodiment of this application but also applicable to other scenarios in which the first session-AMBR of the first session corresponds to an access network type. Unified descriptions are provided herein, and details are not specifically limited in this embodiment of this application.

It should be noted that, in this embodiment of this application, the session management procedure of the first session may be a procedure of establishing, modifying, deactivating, activating, or releasing the first session. Unified descriptions are provided herein, and details are not described below again.

S904. The AMF network element sends the first session-AMBR of the first session to the first RAN device. Correspondingly, the first RAN device receives the first session-AMBR of the first session from the AMF network element.

S905. The first RAN device determines, based on the first slice-AMBR corresponding to the first S-NSSAI, a second slice-AMBR corresponding to the first S-NSSAI. The first S-NSSAI is S-NSSAI associated with the first session of the terminal device in the serving network of the terminal device. The second slice-AMBR is used to control an aggregate bit rate of non-GBR QoS flows in a network slice indicated by the first S-NSSAI.

In the foregoing scenario 1 and scenario 3, in the session management procedure of the first session of the terminal device, the first RAN device may learn of the S-NSSAI (that is, the first S-NSSAI) associated with the first session in the serving network (an HPLMN in the scenario 1 and a VPLMN in the scenario 3) of the terminal device, and further determine, based on the obtained M pieces of S-NSSAI and the obtained first slice-AMBR corresponding to each piece of S-NSSAI in the M pieces of S-NSSAI, the first slice-AMBR corresponding to the first S-NSSAI, where the M pieces of S-NSSAI include the first S-NSSAI.

In the foregoing scenario 2, in the session management procedure of the first session of the terminal device, the first RAN device may learn of the S-NSSAI (that is, the first S-NSSAI) associated with the first session in the serving network (a VPLMN in the scenario 2) of the terminal device, and further determine, based on the obtained M pieces of S-NSSAI, the obtained first slice-AMBR corresponding to each piece of S-NSSAI in the M pieces of S-NSSAI, and a mapping relationship between the first S-NSSAI and third S-NSSAI, the first slice-AMBR corresponding to the first S-NSSAI, where the M pieces of S-NSSAI include the third S-NSSAI, and the third S-NSSAI is S-NSSAI associated with the first session of the terminal device in the home network of the terminal device.

Optionally, the mapping relationship between the first S-NSSAI and the third S-NSSAI may be included in a mapping relationship between the M pieces of S-NSSAI and the S-NSSAI that is in the visited network of the terminal device and that corresponds to each piece of S-NSSAI in the M pieces of S-NSSAI in the foregoing scenario 2, or may be sent by the AMF network element to the first RAN device in a procedure of establishing, modifying, or releasing the first session. This is not specifically limited in this embodiment of this application.

Optionally, in this embodiment of this application, the first RAN device may determine that the second slice-AMBR is a smaller one of the first slice-AMBR corresponding to the first S-NSSAI and a sum of first session-AMBRs of all active sessions of the terminal device in the network slice indicated by the first S-NSSAI, that is, second slice-AMBR=min{sum of the first session-AMBRs of all the active sessions of the terminal device in the network slice indicated by the first S-NSSAI, first slice-AMBR corresponding to the first S-NSSAI}, where min indicates a MIN function.

Optionally, in this embodiment of this application, the first RAN device may further determine a second UE-AMBR based on the first UE-AMBR, where the second UE-AMBR is used to control an aggregate bit rate of non-GBR QoS flows of the terminal device.

Optionally, in this embodiment of this application, the first RAN device may determine that the second UE-AMBR is a smaller one of the first UE-AMBR and a sum of second slice-AMBRs corresponding to all the active sessions of the terminal device, that is, second UE-AMBR=min{sum of second slice-AMBRs corresponding to all the active sessions of the terminal device, first UE-AMBR}, where min indicates a MIN function.

Optionally, in this embodiment of this application, UE-AMBR-based control is not activated when a value of the second UE-AMBR is the sum of the second slice-AMBRs corresponding to all the active sessions of the terminal device, and UE-AMBR-based control is activated when the value of the second UE-AMBR is the first UE-AMBR.

It should be noted that, in this embodiment of this application, when the terminal device establishes, modifies, activates, deactivates, or releases a new session, the first RAN device needs to perform the foregoing calculation similar to that of the second slice-AMBR and the second UE-AMBR. Alternatively, if a first session-AMBR of a session of the terminal device changes, the first RAN device needs to perform the foregoing calculation similar to that of the second slice-AMBR and the second UE-AMBR. Unified descriptions are provided herein, and details are not described below again.

It should be noted that, in this embodiment of this application, when detecting that the M pieces of S-NSSAI and the first slice-AMBR corresponding to each piece of S-NSSAI in the M pieces of S-NSSAI that are sent to the first RAN device need to be updated, the AMF network element sends updated information to the first RAN device. Further, the first RAN device needs to perform the foregoing calculation similar to that of the second slice-AMBR and the second UE-AMBR based on the updated information. Unified descriptions are provided herein, and details are not described below again. For example, that the M pieces of S-NSSAI and the first slice-AMBR corresponding to each piece of S-NSSAI in the M pieces of S-NSSAI that are sent to the first RAN device need to be updated may be that a value of the first slice-AMBR changes, or S-NSSAI is added or removed and a corresponding AMBR is increased and decreased. Unified descriptions are provided herein, and details are not described below again.

Based on the AMBR control method provided in this embodiment of this application, a maximum data rate of data of the terminal device in a network slice can be controlled, to control use of resources in the network slice by the terminal device.

The actions performed by the first RAN device or the AMF network element in steps S901 to S905 may be performed by the processor 801 in the communication device 800 shown in FIG. 8 by invoking the application program code stored in the memory 803. This is not limited in this embodiment.

Figure 10:
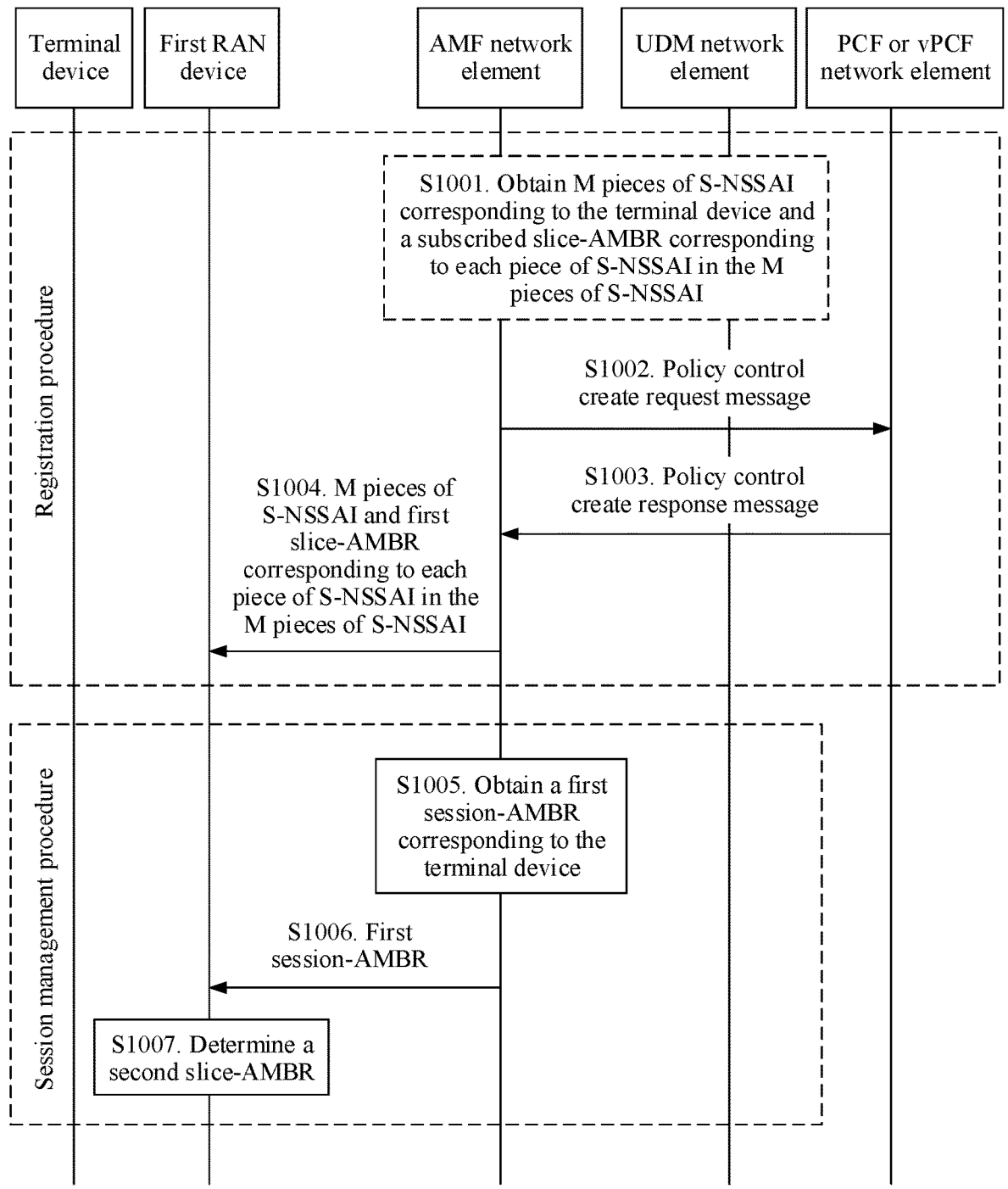
FIG. 10 is a schematic flowchart 2 of an AMBR control method according to an embodiment of this application.

Optionally, an example in which the communication system shown in FIG. 1 is applied to the 5G network architecture shown in any one of FIG. 2 to FIG. 7 is used. FIG. 10 shows an AMBR control method according to an embodiment of this application. The AMBR control method includes the following steps.

S1001. Optionally, in a registration process of a terminal device, an AMF network element interacts with a UDM network element to obtain M pieces of S-NSSAI corresponding to the terminal device and a subscribed slice-AMBR corresponding to each piece of S-NSSAI in the M pieces of S-NSSAI. Each piece of S-NSSAI in the M pieces of S-NSSAI is S-NSSAI in a home network of the terminal device.

Optionally, in this embodiment of this application, for a manner in which the AMF network element interacts with the UDM network element to obtain the M pieces of S-NSSAI corresponding to the terminal device and the subscribed slice-AMBR corresponding to each piece of S-NSSAI in the M pieces of S-NSSAI, refer to the manner in which the AMF network element interacts with the UDM network element to obtain the M pieces of S-NSSAI corresponding to the terminal device and the first slice-AMBR corresponding to each piece of S-NSSAI in the M pieces of S-NSSAI in the scenario 1 of step S901 in the embodiment shown in FIG. 9. Details are not described herein again.

Optionally, the subscribed slice-AMBR in this embodiment of this application may correspond to a first access network type. For related descriptions, refer to the embodiment shown in FIG. 9. Details are not described herein again.

Optionally, in this embodiment of this application, in the registration process of the terminal device, the AMF network element may further interact with the UDM network element or a PCF network element in a serving network of the terminal device to obtain a first UE-AMBR corresponding to the terminal device. For related descriptions, refer to the embodiment shown in FIG. 9. Details are not described herein again.

S1002. The AMF network element sends a policy control create request message to the PCF network element (in a non-roaming scenario) or a vPCF network element (in a roaming scenario). Correspondingly, the PCF network element or the vPCF network element receives the policy control create request message from the AMF network element.

S1003. The PCF network element or the vPCF network element sends a policy control create response message to the AMF network element. Correspondingly, the AMF network element receives the policy control create response message from the PCF network element or the vPCF network element.

The foregoing step S1002 and step S1003 are described for several scenarios below.

Scenario 1: The communication system shown in FIG. 1 is applied to the 5G network architecture in the non-roaming scenario shown in FIG. 2 or FIG. 3. Each piece of S-NSSAI in the M pieces of S-NSSAI corresponding to the terminal device is S-NSSAI in a home network of the terminal device, and M is a positive integer.

In a possible implementation, if step S1001 is performed, in this scenario, the policy control create request message may carry the M pieces of S-NSSAI corresponding to the terminal device and the subscribed slice-AMBR corresponding to each piece of S-NSSAI in the M pieces of S-NSSAI. Further, the PCF network element determines, based on the subscribed slice-AMBR corresponding to each piece of S-NSSAI in the M pieces of S-NSSAI and local policy information, a first slice-AMBR corresponding to each piece of S-NSSAI in the M pieces of S-NSSAI. Then, the policy control create response message sent by the PCF network element to the AMF network element may carry the M pieces of S-NSSAI corresponding to the terminal device and a first slice-AMBR corresponding to each piece of S-NSSAI in the M pieces of S-NSSAI. The first slice-AMBR is provided by the PCF network element, and may be considered as a slice-AMBR authorized by the PCF network element.

In another possible implementation, if step S1001 is not performed, after receiving the policy control create request message from the AMF network element, the PCF network element may determine, based on local policy information, the M pieces of S-NSSAI corresponding to the terminal device and a first slice-AMBR corresponding to each piece of S-NSSAI in the M pieces of S-NSSAI. Then, the policy control create response message sent by the PCF network element to the AMF network element may carry the M pieces of S-NSSAI corresponding to the terminal device and the first slice-AMBR corresponding to each piece of S-NSSAI in the M pieces of S-NSSAI. The first slice-AMBR is provided by the PCF network element, and may be considered as a slice-AMBR authorized by the PCF network element.

In still another possible implementation, the policy control create response message sent by the PCF network element to the AMF network element may carry N pieces of S-NSSAI corresponding to the terminal device and a first slice-AMBR corresponding to each piece of S-NSSAI in the N pieces of S-NSSAI. The first slice-AMBR is provided by the PCF network element, and may be considered as a slice-AMBR authorized by the PCF network element. Each piece of S-NSSAI in the N pieces of S-NSSAI is S-NSSAI in the home network of the terminal device. Further, the AMF network element may determine, based on allowed NSSAI of the terminal device or default NSSAI of the terminal device and the first slice-AMBR corresponding to each piece of S-NSSAI in the N pieces of S-NSSAI, the M pieces of S-NSSAI corresponding to the terminal device and a first slice-AMBR corresponding to each piece of S-NSSAI in the M pieces of S-NSSAI. The allowed NSSAI of the terminal device or the default NSSAI of the terminal device includes the M pieces of S-NSSAI corresponding to the terminal device. Each piece of S-NSSAI in the M pieces of S-NSSAI corresponding to the terminal device is S-NSSAI in the N pieces of S-NSSAI corresponding to the terminal device, and N is a positive integer greater than or equal to M.

For example, it is assumed that a mapping relationship between the N pieces of S-NSSAI corresponding to the terminal device and the first slice-AMBR corresponding to each piece of S-NSSAI in the N pieces of S-NSSAI is shown in the foregoing Table 1, and the default NSSAI of the terminal device or the allowed NSSAI of the terminal device includes the S-NSSAI 1 and the S-NSSAI 2. In this case, a mapping relationship between the M pieces of S-NSSAI corresponding to the terminal device and the first slice-AMBR corresponding to each piece of S-NSSAI in the M pieces of S-NSSAI may be shown in the foregoing Table 2.

Optionally, in this implementation, before the AMF network element sends the policy control create request message to the PCF network element, the AMF network element may interact with the UDM network element to obtain the N pieces of S-NSSAI corresponding to the terminal device and a subscribed slice-AMBR corresponding to each piece of S-NSSAI in the N pieces of S-NSSAI. Then, the policy control create request message may carry the N pieces of S-NSSAI corresponding to the terminal device and the subscribed slice-AMBR corresponding to each piece of S-NSSAI in the N pieces of S-NSSAI. The subscribed slice-AMBR corresponding to each piece of S-NSSAI in the N pieces of S-NSSAI is used to determine the first slice-AMBR corresponding to each piece of S-NSSAI in the N pieces of S-NSSAI. This is not specifically limited in this embodiment of this application.

Scenario 2: The communication system shown in FIG. 1 is applied to the 5G network architecture in the roaming scenario shown in any one of FIG. 4 to FIG. 7. Each piece of S-NSSAI in the M pieces of S-NSSAI corresponding to the terminal device is S-NSSAI in a home network of the terminal device, and M is a positive integer.

In a possible implementation, if step S1001 is performed, in this scenario, the policy control create request message may carry the M pieces of S-NSSAI corresponding to the terminal device and the subscribed slice-AMBR corresponding to each piece of S-NSSAI in the M pieces of S-NSSAI. Further, the vPCF network element determines, based on the subscribed slice-AMBR corresponding to each piece of S-NSSAI in the M pieces of S-NSSAI and local policy information, a first slice-AMBR corresponding to each piece of S-NSSAI in the M pieces of S-NSSAI. Then, the policy control create response message sent by the PCF network element to the AMF network element may carry the M pieces of S-NSSAI corresponding to the terminal device and the first slice-AMBR corresponding to each piece of S-NSSAI in the M pieces of S-NSSAI. The first slice-AMBR is provided by the PCF network element, and may be considered as a slice-AMBR authorized by the PCF network element.

In another possible implementation, the policy control create response message sent by the vPCF network element to the AMF network element carries N pieces of S-NSSAI corresponding to the terminal device and a first slice-AMBR corresponding to each piece of S-NSSAI in the N pieces of S-NSSAI. Each piece of S-NSSAI in the N pieces of S-NSSAI is S-NSSAI in a visited network of the terminal device. Further, the AMF network element determines, based on allowed NSSAI of the terminal device or default NSSAI of the terminal device and the first slice-AMBR corresponding to each piece of S-NSSAI in the N pieces of S-NSSAI, the M pieces of S-NSSAI corresponding to the terminal device and a first slice-AMBR corresponding to each piece of S-NSSAI in the M pieces of S-NSSAI. The default NSSAI of the terminal device includes the M pieces of S-NSSAI corresponding to the terminal device. The allowed NSSAI of the terminal device includes Y pieces of S-NSSAI in the N pieces of S-NSSAI. Y is a positive integer. N is a positive integer greater than or equal to M.

For example, it is assumed that a mapping relationship between the N pieces of S-NSSAI and the first slice-AMBR corresponding to each piece of S-NSSAI in the N pieces of S-NSSAI is shown in Table 8, a mapping relationship between the N pieces of S-NSSAI (denoted as V-S-NSSAI) and S-NSSAI (denoted as H-S-NSSAI) in the corresponding home network is shown in Table 3, and the default NSSAI of the terminal device includes the S-NSSAI 1, the S-NSSAI 2, and the S-NSSAI 3. With reference to the mapping relationships shown in Table 3 and Table 8, it can be learned that a mapping relationship between the M pieces of S-NSSAI corresponding to the terminal device and the first slice-AMBR corresponding to each piece of S-NSSAI in the M pieces of S-NSSAI may be shown in Table 9.

TABLE 8

| S-NSSAI (V-S-NSSAI) | First slice-AMBR |
| --- | --- |
| S-NSSAI A | Slice-AMBR 1 |
|  | Slice-AMBR 2 |
| S-NSSAI B | Slice-AMBR 3 |
| S-NSSAI C | Slice-AMBR 4 |
| ... | ... |

TABLE 9

| S-NSSAI (H-S-NSSAI) | First slice-AMBR |
| --- | --- |
| S-NSSAI 1 | Slice-AMBR 1 |
| S-NSSAI 2 | Slice-AMBR 2 |
| S-NSSAI 3 | Slice-AMBR 3 |

Alternatively, for example, it is assumed that a mapping relationship between the N pieces of S-NSSAI and the first slice-AMBR corresponding to each piece of S-NSSAI in the N pieces of S-NSSAI is shown in the foregoing Table 8, a mapping relationship between the N pieces of S-NSSAI (denoted as H-S-NSSAI) and S-NSSAI (denoted as V-S-NSSAI) in the corresponding visited network is shown in Table 3, and the allowed NSSAI of the terminal device includes the S-NSSAI A and the S-NSSAI B. With reference to the mapping relationship shown in Table 3, it can be learned that the M pieces of S-NSSAI include the S-NSSAI 1, the S-NSSAI 2, and the S-NSSAI 3. Then, with reference to the mapping relationships shown in Table 3 and Table 8, it can be learned that a mapping relationship between the M pieces of S-NSSAI corresponding to the terminal device and the first slice-AMBR corresponding to each piece of S-NSSAI in the M pieces of S-NSSAI may be shown in Table 9.

Scenario 3: The communication system shown in FIG. 1 is applied to the 5G network architecture in the roaming scenario shown in any one of FIG. 4 to FIG. 7. Each piece of S-NSSAI in the M pieces of S-NSSAI corresponding to the terminal device is S-NSSAI in a visited network of the terminal device, and M is a positive integer.

In a possible implementation, the policy control create request message sent by the AMF network element to the vPCF network element carries M pieces of S-NSSAI corresponding to the terminal device, where the M pieces of S-NSSAI corresponding to the terminal device include M pieces of S-NSSAI that are in the visited network of the terminal device and that are obtained by mapping allowed S-NSSAI of the terminal device or default NSSAI of the terminal device. Then, the policy control create response message sent by the vPCF network element to the AMF network element may carry the M pieces of S-NSSAI corresponding to the terminal device and a first slice-AMBR corresponding to each piece of S-NSSAI in the M pieces of S-NSSAI. The first slice-AMBR is provided by the vPCF network element, and may be considered as a slice-AMBR authorized by the vPCF network element.

In another possible implementation, the policy control create response message sent by the vPCF network element to the AMF network element carries N pieces of S-NSSAI corresponding to the terminal device and a first slice-AMBR corresponding to each piece of S-NSSAI in the N pieces of S-NSSAI. Each piece of S-NSSAI in the N pieces of S-NSSAI is S-NSSAI in the visited network of the terminal device. Further, the AMF network element determines, based on allowed NSSAI of the terminal device or default NSSAI of the terminal device and the first slice-AMBR corresponding to each piece of S-NSSAI in the N pieces of S-NSSAI, the M pieces of S-NSSAI corresponding to the terminal device and a first slice-AMBR corresponding to each piece of S-NSSAI in the M pieces of S-NSSAI, where each piece of S-NSSAI in the M pieces of S-NSSAI corresponding to the terminal device is S-NSSAI in the N pieces of S-NSSAI corresponding to the terminal device, the allowed NSSAI of the terminal device includes the M pieces of S-NSSAI corresponding to the terminal device, the default NSSAI of the terminal device includes X pieces of S-NSSAI, each piece of S-NSSAI in the X pieces of S-NSSAI is S-NSSAI in the home network of the terminal device, the M pieces of S-NSSAI corresponding to the terminal device are obtained by mapping based on the X pieces of S-NSSAI, X is a positive integer, and N is a positive integer greater than or equal to M.

For example, it is assumed that a mapping relationship between the N pieces of S-NSSAI and the first slice-AMBR corresponding to each piece of S-NSSAI in the N pieces of S-NSSAI is shown in Table 10, a mapping relationship between the N pieces of S-NSSAI (denoted as V-S-NSSAI) and S-NSSAI (denoted as H-S-NSSAI) in the corresponding home network is shown in Table 3, and the default NSSAI of the terminal device includes the S-NSSAI 3 and the S-NSSAI 4. With reference to the mapping relationship in Table 3, it can be learned that the M pieces of S-NSSAI include the S-NSSAI B, the S-NSSAI C, and the S-NSSAI D. Then, with reference to the mapping relationship shown in Table 10, it can be learned that a mapping relationship between the M pieces of S-NSSAI corresponding to the terminal device and the first slice-AMBR corresponding to each piece of S-NSSAI in the M pieces of S-NSSAI may be shown in Table 11.

TABLE 10

| S-NSSAI (V-S-NSSAI) | First slice-AMBR |
|---|---|
| S-NSSAI B | Slice-AMBR 3 |
| S-NSSAI C | Slice-AMBR 4 |
| S-NSSAI D | |
| S-NSSAI A | Slice-AMBR 1 |

TABLE 11

| S-NSSAI (V-S-NSSAI) | First slice-AMBR |
|---|---|
| S-NSSAI B | Slice-AMBR 3 |
| S-NSSAI C | Slice-AMBR 4 |
| S-NSSAI D | Slice-AMBR 4 |

Alternatively, for example, it is assumed that a mapping relationship between the N pieces of S-NSSAI and the first slice-AMBR corresponding to each piece of S-NSSAI in the N pieces of S-NSSAI is shown in Table 10, and the allowed NSSAI of the terminal device includes the S-NSSAI B, the S-NSSAI C, and the S-NSSAI D. It can be learned that the M pieces of S-NSSAI include the S-NSSAI B, the S-NSSAI C, and the S-NSSAI D. Further, with reference to the mapping relationship shown in Table 10, it can be learned that a mapping relationship between the M pieces of S-NSSAI corresponding to the terminal device and the first slice-AMBR corresponding to each piece of S-NSSAI in the M pieces of S-NSSAI may be shown in the foregoing Table 11.

S1004 to S1007 are the same as steps S902 to S905 in the embodiment shown in FIG. 9. For related descriptions, refer to the embodiment shown in FIG. 9. Details are not described herein again.

It should be noted that, it can be learned from steps S1001 to S1003 that the first slice-AMBR in this embodiment of this application is a first slice-AMBR provided by the PCF network element. Unified descriptions are provided herein, and details are not described below again.

Based on the AMBR control method provided in this embodiment of this application, a maximum data rate of data of the terminal device in a network slice may be controlled, to control use of resources in the network slice by the terminal device.

The actions performed by the first RAN device or the AMF network element in steps S1001 to S1007 may be performed by the processor 801 in the communication device 800 shown in FIG. 8 by invoking the application program code stored in the memory 803. This is not limited in this embodiment.

Figure 11:
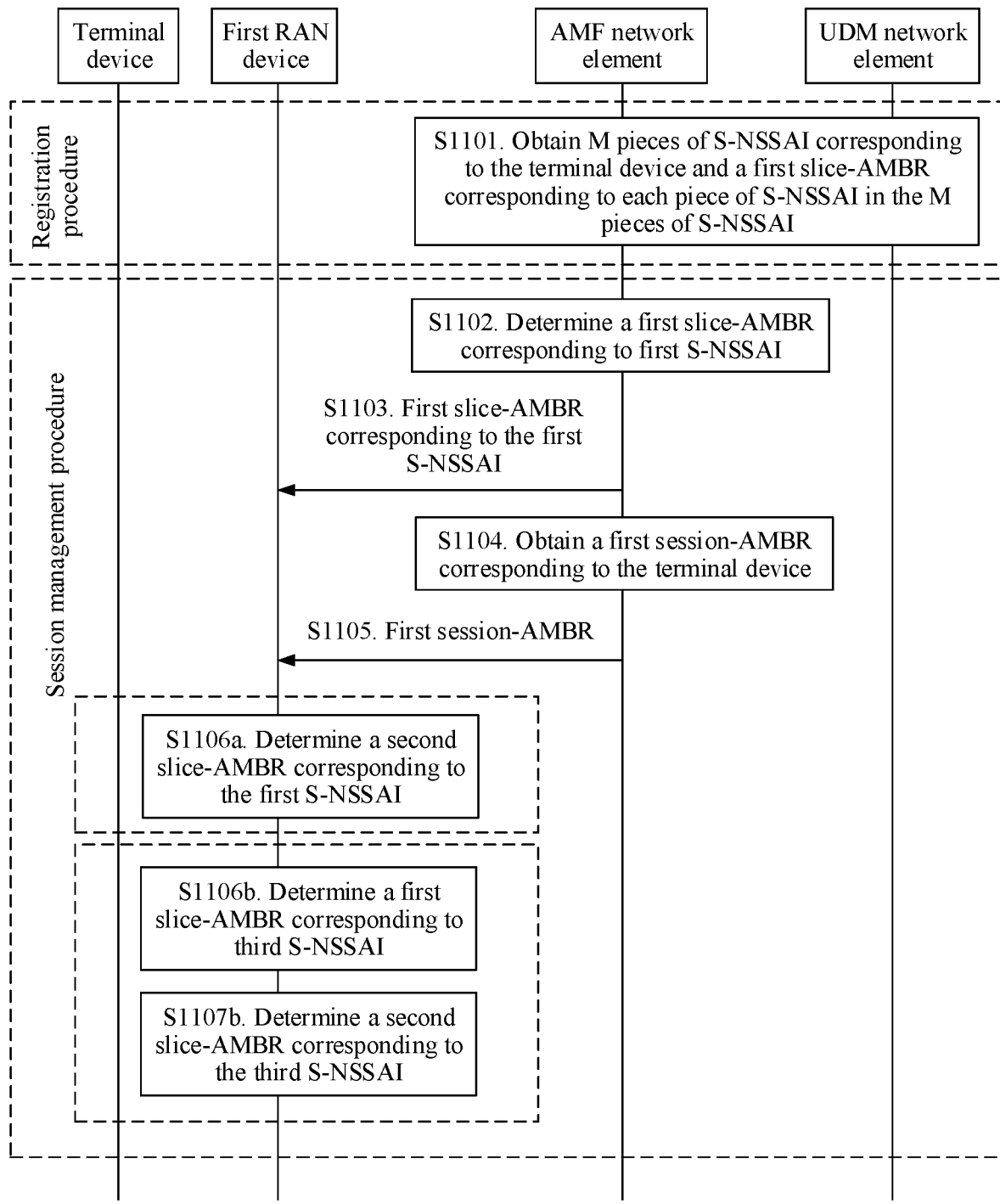
FIG. 11 is a schematic flowchart 3 of an AMBR control method according to an embodiment of this application.

Optionally, an example in which the communication system shown in FIG. 1 is applied to the 5G network architecture shown in any one of FIG. 2 to FIG. 7 is used. FIG. 11 shows an AMBR control method according to an embodiment of this application. The AMBR control method includes the following steps.

S1101 is the same as step S901 in the embodiment shown in FIG. 9. For related descriptions, refer to the embodiment shown in FIG. 9. Details are not described herein again.

In addition, it should be noted that in this embodiment of this application, if the AMF network element obtains a first UE-AMBR corresponding to the terminal device in the registration procedure, the AMF network element needs to send the first UE-AMBR corresponding to the terminal device to the first RAN device. For related descriptions, refer to the embodiment shown in FIG. 9. Details are not described herein again.

S1102. In a session management procedure of a first session of the terminal device, the AMF network element determines a first slice-AMBR corresponding to first S-NSSAI of the first session.

Optionally, in the non-roaming scenario in the scenario 1 or the roaming scenario in the scenario 3, the AMF network element may determine, based on the first S-NSSAI and a mapping relationship between the first S-NSSAI and the first slice-AMBR included in the mapping relationship between the M pieces of S-NSSAI corresponding to the terminal device and the first slice-AMBR corresponding to each piece of S-NSSAI in the M pieces of S-NSSAI, the first slice-AMBR corresponding to the first S-NSSAI, where the M pieces of S-NSSAI include the first S-NSSAI.

Optionally, in the roaming scenario in the scenario 2, the first S-NSSAI in this embodiment of this application may be S-NSSAI associated with the first session in a visited network of the terminal device, or may be S-NSSAI associated with the first session in the home network of the terminal device. This is not specifically limited in this embodiment of this application. In a possible implementation, if the first S-NSSAI is S-NSSAI associated with the first session in the home network of the terminal device, the AMF network element may determine, based on the first S-NSSAI and a mapping relationship between the first S-NSSAI and the first slice-AMBR included in the mapping relationship between the M pieces of S-NSSAI corresponding to the terminal device and the first slice-AMBR corresponding to each piece of S-NSSAI in the M pieces of S-NSSAI, the first slice-AMBR corresponding to the first S-NSSAI, where the M pieces of S-NSSAI include the first S-NSSAI. In another possible implementation, if the first S-NSSAI is S-NSSAI associated with the first session in the visited network of the terminal device, the AMF network element may determine, based on a mapping relationship between the first S-NSSAI and third S-NSSAI, a first slice-AMBR corresponding to the third S-NSSAI as the first slice-AMBR corresponding to the first S-NSSAI, where the third S-NSSAI is S-NSSAI associated with the first session in the home network of the terminal device.

Optionally, in this embodiment of this application, if the first slice-AMBR corresponds to a first access network type, the first access network type is an access network type of the first RAN device. For example, it is assumed that the mapping relationship between S-NSSAI, an access network type, and a corresponding slice-AMBR is shown in Table 5, the first S-NSSAI is the S-NSSAI 1, and the first access network type of the first RAN device is the access network type 1. In this case, the first slice-AMBR corresponding to the first S-NSSAI is the slice-AMBR 1. Unified descriptions are provided herein, and details are not described below again.

S1103. The AMF network element sends the first slice-AMBR corresponding to the first S-NSSAI to the first RAN device. Correspondingly, the first RAN device receives the first slice-AMBR corresponding to the first S-NSSAI from the AMF network element.

Optionally, in this embodiment of this application, in the roaming scenario in the scenario 2, if the first S-NSSAI is S-NSSAI associated with the first session in the home network of the terminal device, the AMF network element may further send the mapping relationship between the third S-NSSAI and the first S-NSSAI to the first RAN device, where the mapping relationship is used to determine the first slice-AMBR corresponding to the third S-NSSAI. The third S-NSSAI is S-NSSAI associated with the first session in the visited network of the terminal device.

Optionally, in this embodiment of this application, if the first S-NSSAI is S-NSSAI associated with the first session in the visited network of the terminal device in the roaming scenario in the scenario 2, or if the AMF network element determines that there is second S-NSSAI having a mapping relationship with the third S-NSSAI in the visited network of the terminal device in the scenario 3, the AMF network element may further send indication information 1 to the first RAN device. Correspondingly, the first RAN device receives the indication information 1 from the AMF network element. The indication information 1 indicates that aggregate bit rates of non-GBR QoS flows in the network slice indicated by the first S-NSSAI and a network slice indicated by the second S-NSSAI are both controlled by the first slice-AMBR. For example, as shown in Table 3, if S-NSSAI associated with the 1st PDU session corresponding to the S-NSSAI 4 in the visited network of the terminal device is the S-NSSAI C, the indication information 1 may be, for example, {S-NSSAI C and S-NSSAI D, S-NSSAI 4}.

Optionally, in this embodiment of this application, if the first S-NSSAI is S-NSSAI associated with the first session in the home network of the terminal device in the roaming scenario in the scenario 2, and the AMF network element determines that there are second S-NSSAI and third S-NSSAI that have a mapping relationship with the first S-NSSAI in the visited network of the terminal device, the AMF network element may further send indication information 2 to the first RAN device. Correspondingly, the first RAN device receives the indication information 2 from the AMF network element. The indication information 2 indicates that aggregate bit rates of non-GBR QoS flows in a network slice indicated by the third S-NSSAI and a network slice indicated by the second S-NSSAI are both controlled by the first slice-AMBR. For example, as shown in Table 3, if S-NSSAI associated with the 1st PDU session corresponding to the S-NSSAI 4 in the visited network of the terminal device is the S-NSSAI C, the indication information 2 may be, for example, {S-NSSAI C and S-NSSAI D, S-NSSAI 4}.

It should be noted that, in this embodiment of this application, if S-NSSAI (denoted as H-S-NSSAI) in an HPLMN may be mapped to a plurality of pieces of S-NSSAI in a VPLMN, the AMF network element sends the first slice-AMBR corresponding to the first S-NSSAI to the first RAN device only in a session management procedure (for example, an establishment or activation procedure) of the 1st PDU session corresponding to the H-S-NSSAI. For example, as shown in Table 3, if the S-NSSAI associated with the 1st PDU session corresponding to the S-NSSAI 4 in the visited network of the terminal device is the S-NSSAI C, the AMF network element sends the first slice-AMBR corresponding to the first S-NSSAI to the first RAN device only when the terminal device initiates a PDU session or performs session activation in a network slice indicated by the S-NSSAI C. When the terminal device initiates a PDU session or performs session activation in a network slice indicated by the S-NSSAI D, the AMF network element may indicate the first RAN device to perform related control over the S-NSSAI C and the S-NSSAI D by using a same slice-AMBR. For example, for the foregoing different cases, the message may include {S-NSSAI C and S-NSSAI D}, include same indication information, or include the S-NSSAI 4.

It should be noted that, in this embodiment of this application, if S-NSSAI in a VPLMN may be mapped to a plurality of pieces of S-NSSAI in an HPLMN, in a session management procedure of a PDU session, the AMF network element needs to determine a to-be-sent first slice-AMBR based on S-NSSAI of an HPLMN corresponding to the PDU session. In this case, the AMF network element needs to send a mapping relationship between the S-NSSAI of the HPLMN and the first slice-AMBR and a mapping relationship between the S-NSSAI of the HPLMN and S-NSSAI of a VPLMN to the first RAN device. For example, as shown in Table 3, if the S-NSSAI A in the VPLMN may be mapped to the S-NSSAI 1 or the S-NSSAI 2, in an establishment procedure or a user plane activation procedure of the first session, assuming that S-NSSAI associated with the first session in the home network of the terminal device is the S-NSSAI 1, the AMF network element needs to send {S-NSSAI 1, first slice-AMBR} and {S-NSSAI 1, S-NSSAI A} to the first RAN device. Unified descriptions are provided herein, and details are not described below again.

S1104 and S1105 are the same as steps S903 and S904 in the embodiment shown in FIG. 9. For related descriptions, refer to the embodiment shown in FIG. 9. Details are not described herein again.

Further, if the first S-NSSAI is S-NSSAI associated with the first session in the visited network of the terminal device in the roaming scenario in the scenario 2, or if the first S-NSSAI is S-NSSAI associated with the first session in the serving network of the terminal device in the scenario 1 or the scenario 3, the AMBR control method provided in this embodiment of this application further includes the following step S1106a.

S1106a. The first RAN device determines, based on the first slice-AMBR corresponding to the first S-NSSAI, a second slice-AMBR corresponding to the first S-NSSAI, and the first RAN device determines a second UE-AMBR based on the first UE-AMBR. The second slice-AMBR is used to control the aggregate bit rate of the non-GBR QoS flows in the network slice indicated by the first S-NSSAI, and the second UE-AMBR is used to control an aggregate bit rate of non-GBR QoS flows of the terminal device.

For related implementation of step S1106a, refer to step S905 in the embodiment shown in FIG. 9. Details are not described herein again.

Optionally, in the roaming scenario in the scenario 2, if the first S-NSSAI is S-NSSAI associated with the first session in the home network of the terminal device, because the third S-NSSAI is S-NSSAI associated with the first session in the serving network of the terminal device, the AMBR control method provided in this embodiment of this application further includes the following steps S1106b and S1107b.

S1106b. The first RAN device determines, based on the mapping relationship between the first S-NSSAI and the third S-NSSAI, the first slice-AMBR corresponding to the first S-NSSAI as the first slice-AMBR corresponding to the third S-NSSAI.

S1107b. The first RAN device determines, based on the first slice-AMBR corresponding to the third S-NSSAI, a second slice-AMBR corresponding to the third S-NSSAI. The second slice-AMBR is used to control the aggregate bit rate of the non-GBR QoS flows in the network slice indicated by the third S-NSSAI.

Optionally, in this embodiment of this application, the first RAN device may further determine the second UE-AMBR based on the first UE-AMBR, where the second UE-AMBR is used to control the aggregate bit rate of the non-GBR QoS flows of the terminal device.

Related implementation of step S1107b is similar to the implementation of step S905 in the embodiment shown in FIG. 9. A difference lies in, for example, that the first S-NSSAI in step S905 shown in FIG. 9 is replaced with the third S-NSSAI in this embodiment of this application. For other related descriptions, refer to step S905 shown in FIG. 9. Details are not described herein again.

It should be noted that, in this embodiment of this application, when the terminal device establishes, modifies, activates, deactivates, or releases a new session, the first RAN device needs to perform the foregoing calculation similar to that of the second slice-AMBR and the second UE-AMBR. Alternatively, if a first session-AMBR of a session of the terminal device changes, the first RAN device needs to perform the foregoing calculation similar to that of the second slice-AMBR and the second UE-AMBR. Unified descriptions are provided herein, and details are not described below again.

It should be noted that, in this embodiment of this application, when detecting that the first S-NSSAI and the first slice-AMBR corresponding to the first S-NSSAI that are sent to the first RAN device need to be updated, the AMF network element sends updated information to the first RAN device. Further, the first RAN device needs to perform the foregoing calculation similar to that of the second slice-AMBR and the second UE-AMBR based on the updated information. Unified descriptions are provided herein, and details are not described below again. For example, that the first S-NSSAI and the first slice-AMBR corresponding to the first S-NSSAI that are sent to the first RAN device need to be updated may be that a value of the first slice-AMBR changes, or new S-NSSAI is added or removed and a corresponding AMBR is increased and decreased. Unified descriptions are provided herein, and details are not described below again.

Based on the AMBR control method provided in this embodiment of this application, a maximum data rate of data of the terminal device in a network slice may be controlled, to control use of resources in the network slice by the terminal device.

The actions performed by the first RAN device or the AMF network element in steps S1101 to S1106a or in steps S1101 to S1107b may be performed by the processor 801 in the communication device 800 shown in FIG. 8 by invoking the application program code stored in the memory 803. This is not limited in this embodiment.

Figure 12:
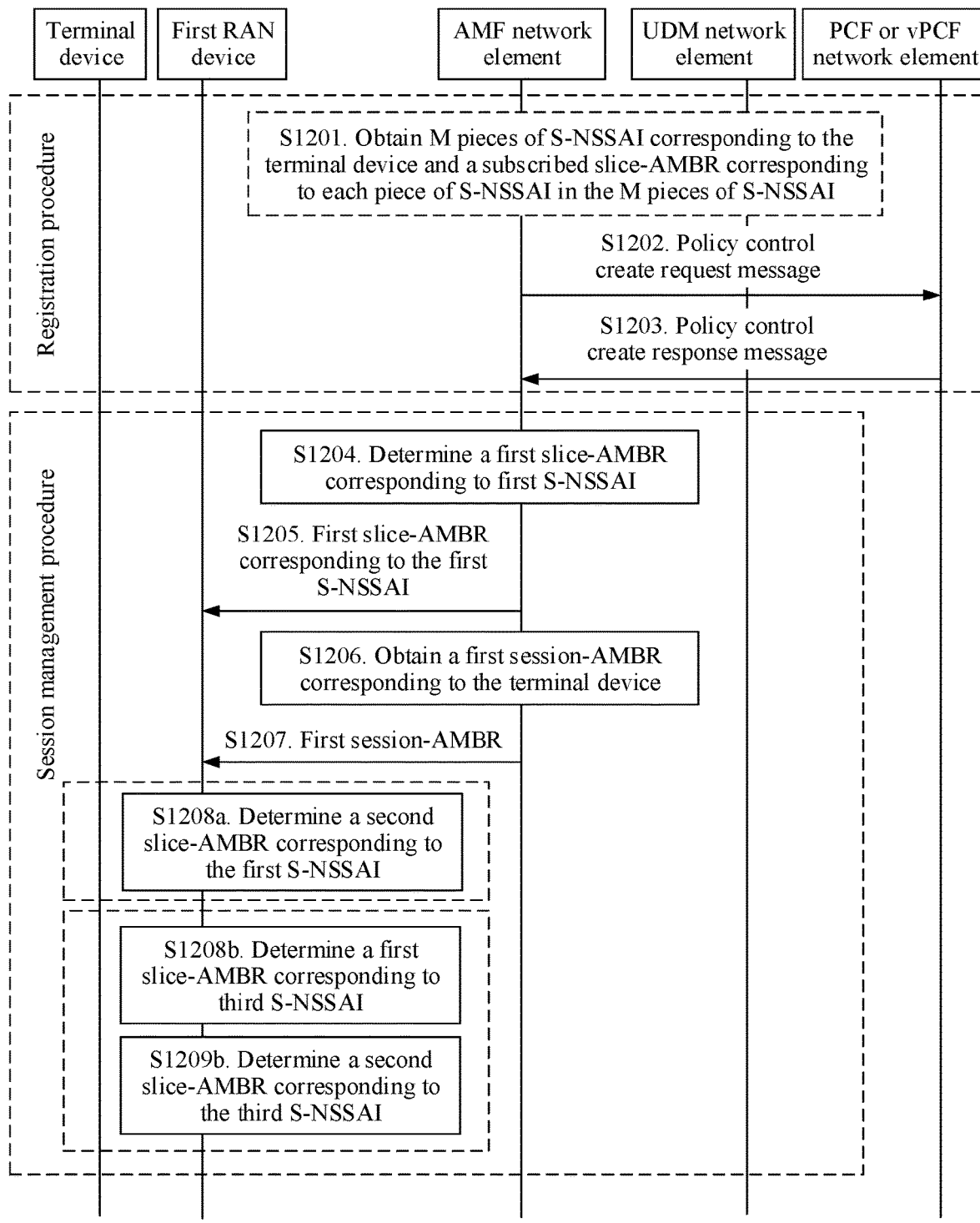
FIG. 12 is a schematic flowchart 4 of an AMBR control method according to an embodiment of this application.

Optionally, an example in which the communication system shown in FIG. 1 is applied to the 5G network architecture shown in any one of FIG. 2 to FIG. 7 is used. FIG. 12 shows an AMBR control method according to an embodiment of this application. The AMBR control method includes the following steps.

S1201 to S1203 are the same as steps S1001 to S1003 in the embodiment shown in FIG. 10. For related descriptions, refer to the embodiment shown in FIG. 10. Details are not described herein again.

S1204 to S1207 are the same as steps S1102 to S1105 in the embodiment shown in FIG. 11. For related descriptions, refer to the embodiment shown in FIG. 11. Details are not described herein again.

It should be noted that, it can be learned from steps S1201 to S1203 that the first slice-AMBR in this embodiment of this application is a first slice-AMBR provided by the PCF network element. Unified descriptions are provided herein, and details are not described below again.

Further, if the first S-NSSAI is S-NSSAI associated with the first session in the visited network of the terminal device in the roaming scenario in the scenario 2, or if the first S-NSSAI is S-NSSAI associated with the first session in the serving network of the terminal device in the scenario 1 or the scenario 3, the AMBR control method provided in this embodiment of this application further includes the following step S1208a.

S1208a is the same as step S1106a in the embodiment shown in FIG. 11. For related descriptions, refer to the embodiment shown in FIG. 11. Details are not described herein again.

Optionally, in the roaming scenario in the scenario 2, if the first S-NSSAI is S-NSSAI associated with the first session in the home network of the terminal device, because the third S-NSSAI is S-NSSAI associated with the first session in the serving network of the terminal device, the AMBR control method provided in this embodiment of this application further includes the following steps S1208b and S1209b.

S1208b and S1209b are the same as steps S1106b and S1107b in the embodiment shown in FIG. 11. For related descriptions, refer to the embodiment shown in FIG. 11. Details are not described herein again.

Based on the AMBR control method provided in this embodiment of this application, a maximum data rate of data of the terminal device in a network slice may be controlled, to control use of resources in the network slice by the terminal device.

The actions performed by the first RAN device or the AMF network element in steps S1201 to S1108a or in steps S1201 to S1209b may be performed by the processor 801 in the communication device 800 shown in FIG. 8 by invoking the application program code stored in the memory 803. This is not limited in this embodiment.

It may be understood that, in the foregoing embodiments, methods and/or steps implemented by the mobility management network element may also be implemented by a component (for example, a chip or a circuit) that can be used in the mobility management network element, and methods and/or steps implemented by the access network device may also be implemented by a component (for example, a chip or a circuit) that can be used in the access network device.

The foregoing mainly describes the solutions provided in the embodiments of this application from a perspective of interaction between network elements. Correspondingly, an embodiment of this application further provides a communication apparatus. The communication apparatus may be the mobility management network element in the foregoing method embodiments, an apparatus including the mobility management network element, or a component that can be used in the mobility management network element. Alternatively, the communication apparatus may be the access network device in the foregoing method embodiments, an apparatus including the access network device, or a component that may be used in the access network device. It may be understood that, to implement the foregoing functions, the communication apparatus includes corresponding hardware structures and/or software modules for performing the functions. A person skilled in the art should easily be aware that units and algorithm steps in the examples described with reference to the embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 13:
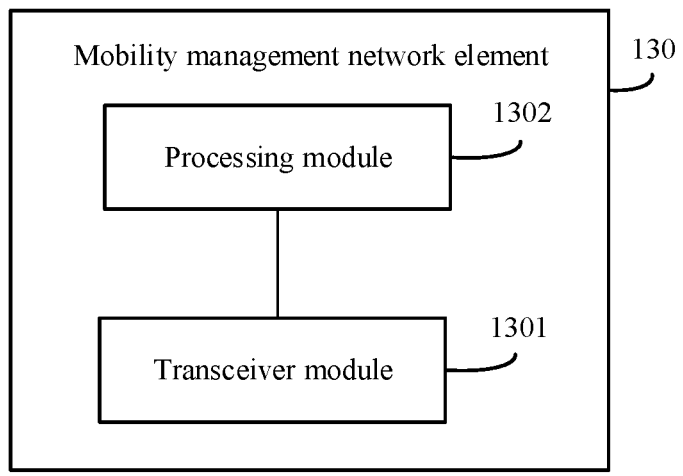
FIG. 13 is a schematic diagram of a structure of a mobility management network element according to an embodiment of this application.

For example, the communication apparatus is the mobility management network element in the foregoing method embodiments. FIG. 13 is a schematic diagram of a structure of a mobility management network element 130. The mobility management network element 130 includes a transceiver module 1301 and a processing module 1302. The transceiver module 1301 may also be referred to as a transceiver unit, and is configured to implement sending and receiving functions. For example, the transceiver module 1301 may be a transceiver circuit, a transceiver machine, a transceiver, or a communication interface. The following provides descriptions by using several embodiments.

In an embodiment:

The processing module 1302 is configured to obtain M pieces of S-NSSAI corresponding to a terminal device and a first slice-AMBR corresponding to each piece of S-NSSAI in the M pieces of S-NSSAI, where M is a positive integer. The transceiver module 1301 is configured to send the M pieces of S-NSSAI and the first slice-AMBR corresponding to each piece of S-NSSAI to an access network device, where the first slice-AMBR corresponding to each piece of S-NSSAI is used to determine a second slice-AMBR corresponding to the S-NSSAI, and the second slice-AMBR corresponding to each piece of S-NSSAI is used to control an aggregate bit rate of non-GBR QoS flows in a network slice indicated by the S-NSSAI.

Optionally, the first slice-AMBR corresponding to each piece of S-NSSAI is a subscribed first slice-AMBR corresponding to the S-NSSAI.

In a possible implementation, each piece of S-NSSAI in the M pieces of S-NSSAI corresponding to the terminal device is S-NSSAI in a home network of the terminal device. The processing module 1302 is specifically configured to: receive, via the transceiver module 1301, the M pieces of S-NSSAI corresponding to the terminal device and the first slice-AMBR corresponding to each piece of S-NSSAI in the M pieces of S-NSSAI from a unified data management network element; or receive, via the transceiver module 1301, N pieces of S-NSSAI corresponding to the terminal device and a first slice-AMBR corresponding to each piece of S-NSSAI in the N pieces of S-NSSAI from a unified data management network element, where each piece of S-NSSAI in the N pieces of S-NSSAI is S-NSSAI in the home network of the terminal device; and determine, based on default NSSAI of the terminal device or allowed NSSAI of the terminal device and the first slice-AMBR corresponding to each piece of S-NSSAI in the N pieces of S-NSSAI, the M pieces of S-NSSAI corresponding to the terminal device and the first slice-AMBR corresponding to each piece of S-NSSAI in the M pieces of S-NSSAI, where the default NSSAI of the terminal device or the allowed NSSAI of the terminal device includes the M pieces of S-NSSAI corresponding to the terminal device, each piece of S-NSSAI in the M pieces of S-NSSAI corresponding to the terminal device is S-NSSAI in the N pieces of S-NSSAI corresponding to the terminal device, and N is a positive integer greater than or equal to M.

Optionally, the transceiver module 1301 is further configured to send, to the access network device, S-NSSAI that is in a visited network of the terminal device and that corresponds to each piece of S-NSSAI in the M pieces of S-NSSAI corresponding to the terminal device.

Optionally, the transceiver module 1301 is further configured to send a mapping relationship between third S-NSSAI and first S-NSSAI to the access network device, where the mapping relationship is used to determine a first slice-AMBR corresponding to the first S-NSSAI, the third S-NSSAI is S-NSSAI associated with a first session of the terminal device in the home network of the terminal device, the first S-NSSAI is S-NSSAI associated with the first session in a visited network of the terminal device, and the third S-NSSAI is S-NSSAI in the M pieces of S-NSSAI corresponding to the terminal device.

In another possible implementation, each piece of S-NSSAI in the M pieces of S-NSSAI corresponding to the terminal device is S-NSSAI in a visited network of the terminal device. The processing module 1302 is specifically configured to: receive, via the transceiver module 1301, K pieces of S-NSSAI corresponding to the terminal device and a first slice-AMBR corresponding to each piece of S-NSSAI in the K pieces of S-NSSAI from a unified data management network element, where each piece of S-NSSAI in the K pieces of S-NSSAI is S-NSSAI in a home network of the terminal device; and determine, based on the first slice-AMBR corresponding to each piece of S-NSSAI in the K pieces of S-NSSAI and S-NSSAI that is in the visited network and that corresponds to each piece of S-NSSAI in the K pieces of S-NSSAI, the M pieces of S-NSSAI corresponding to the terminal device and the first slice-AMBR corresponding to each piece of S-NSSAI in the M pieces of S-NSSAI, where K is a positive integer greater than or equal to M; or receive, via the transceiver module 1301, N pieces of S-NSSAI corresponding to the terminal device and a first slice-AMBR corresponding to each piece of S-NSSAI in the N pieces of S-NSSAI from a unified data management network element, where each piece of S-NSSAI in the N pieces of S-NSSAI is S-NSSAI in the home network of the terminal device; and determine, based on the first slice-AMBR corresponding to each piece of S-NSSAI in the N pieces of S-NSSAI, S-NSSAI that is in the visited network and that corresponds to each piece of S-NSSAI in the N pieces of S-NSSAI, and allowed NSSAI of the terminal device or default NSSAI of the terminal device, the M pieces of S-NSSAI corresponding to the terminal device and the first slice-AMBR corresponding to each piece of S-NSSAI in the M pieces of S-NSSAI, where the allowed NSSAI of the terminal device includes the M pieces of S-NSSAI corresponding to the terminal device, the default NSSAI of the terminal device includes X pieces of S-NSSAI, each piece of S-NSSAI in the X pieces of S-NSSAI is S-NSSAI in the home network of the terminal device, the M pieces of S-NSSAI corresponding to the terminal device are obtained by mapping based on the X pieces of S-NSSAI, X is a positive integer, and N is a positive integer greater than or equal to M.

Optionally, the first slice-AMBR corresponding to each piece of S-NSSAI is from a policy control network element.

In a possible implementation, each piece of S-NSSAI in the M pieces of S-NSSAI corresponding to the terminal device is S-NSSAI in a home network of the terminal device. The processing module 1302 is specifically configured to: receive, via the transceiver module 1301, the M pieces of S-NSSAI corresponding to the terminal device and the first slice-AMBR corresponding to each piece of S-NSSAI in the M pieces of S-NSSAI from the policy control network element.

Optionally, the transceiver module 1301 is further configured to receive the M pieces of S-NSSAI corresponding to the terminal device and a subscribed slice-AMBR corresponding to each piece of S-NSSAI in the M pieces of S-NSSAI from a unified data management network element. The transceiver module 1301 is further configured to send a first message to the policy control network element, where the first message carries the M pieces of S-NSSAI corresponding to the terminal device and the subscribed slice-AMBR corresponding to each piece of S-NSSAI in the M pieces of S-NSSAI.

Optionally, the transceiver module 1301 is further configured to receive N pieces of S-NSSAI corresponding to the terminal device and a subscribed slice-AMBR corresponding to each piece of S-NSSAI in the N pieces of S-NSSAI from a unified data management network element, where each piece of S-NSSAI in the N pieces of S-NSSAI is S-NSSAI in the home network of the terminal device. The processing module 1302 is further configured to determine, based on allowed NSSAI of the terminal device or default NSSAI of the terminal device and the subscribed slice-AMBR corresponding to each piece of S-NSSAI in the N pieces of S-NSSAI, the M pieces of S-NSSAI corresponding to the terminal device and a subscribed slice-AMBR corresponding to each piece of S-NSSAI in the M pieces of S-NSSAI, where the default NSSAI of the terminal device or the allowed NSSAI of the terminal device includes the M pieces of S-NSSAI corresponding to the terminal device, each piece of S-NSSAI in the M pieces of S-NSSAI corresponding to the terminal device is S-NSSAI in the N pieces of S-NSSAI corresponding to the terminal device, and N is a positive integer greater than or equal to M. The transceiver module 1301 is further configured to send a first message to the policy control network element, where the first message carries the M pieces of S-NSSAI corresponding to the terminal device and the subscribed slice-AMBR corresponding to each piece of S-NSSAI in the M pieces of S-NSSAI.

In another possible implementation, each piece of S-NSSAI in the M pieces of S-NSSAI corresponding to the terminal device is S-NSSAI in a home network of the terminal device. The processing module 1302 is specifically configured to: receive, via the transceiver module 1301, N pieces of S-NSSAI corresponding to the terminal device and a first slice-AMBR corresponding to each piece of S-NSSAI in the N pieces of S-NSSAI from the policy control network element, where each piece of S-NSSAI in the N pieces of S-NSSAI is S-NSSAI in the home network of the terminal device; and determine, based on allowed NSSAI of the terminal device or default NSSAI of the terminal device and the first slice-AMBR corresponding to each piece of S-NSSAI in the N pieces of S-NSSAI, the M pieces of S-NSSAI corresponding to the terminal device and the first slice-AMBR corresponding to each piece of S-NSSAI in the M pieces of S-NSSAI, where the allowed NSSAI of the terminal device or the default NSSAI of the terminal device includes the M pieces of S-NSSAI corresponding to the terminal device, each piece of S-NSSAI in the M pieces of S-NSSAI corresponding to the terminal device is S-NSSAI in the N pieces of S-NSSAI corresponding to the terminal device, and N is a positive integer greater than or equal to M.

In still another possible implementation, each piece of S-NSSAI in the M pieces of S-NSSAI corresponding to the terminal device is S-NSSAI in a visited network of the terminal device. The processing module 1302 is specifically configured to: send a third message to the policy control network element via the transceiver module 1301, where the third message carries the M pieces of S-NSSAI corresponding to the terminal device, and the M pieces of S-NSSAI corresponding to the terminal device include M pieces of S-NSSAI that are in the visited network of the terminal device and that are obtained by mapping allowed S-NSSAI of the terminal device or default NSSAI of the terminal device; and receive, via the transceiver module 1301, the M pieces of S-NSSAI corresponding to the terminal device and the first slice-AMBR corresponding to each piece of S-NSSAI in the M pieces of S-NSSAI from the policy control network element.

In still another possible implementation, each piece of S-NSSAI in the M pieces of S-NSSAI corresponding to the terminal device is S-NSSAI in a visited network of the terminal device. The processing module 1302 is specifically configured to: receive, via the transceiver module 1301, N pieces of S-NSSAI corresponding to the terminal device and a first slice-AMBR corresponding to each piece of S-NSSAI in the N pieces of S-NSSAI from the policy control network element; and determine, based on allowed NSSAI of the terminal device or default NSSAI of the terminal device and the first slice-AMBR corresponding to each piece of S-NSSAI in the N pieces of S-NSSAI, the M pieces of S-NSSAI corresponding to the terminal device and the first slice-AMBR corresponding to each piece of S-NSSAI in the M pieces of S-NSSAI, where each piece of S-NSSAI in the M pieces of S-NSSAI corresponding to the terminal device is S-NSSAI in the N pieces of S-NSSAI corresponding to the terminal device, the allowed NSSAI of the terminal device includes the M pieces of S-NSSAI corresponding to the terminal device, the default NSSAI of the terminal device includes X pieces of S-NSSAI, each piece of S-NSSAI in the X pieces of S-NSSAI is S-NSSAI in a home network of the terminal device, the M pieces of S-NSSAI corresponding to the terminal device are obtained by mapping based on the X pieces of S-NSSAI, and N is a positive integer greater than or equal to M.

Optionally, the transceiver module 1301 is further configured to send a first session-AMBR corresponding to a first access network type to the access network device, where the first session-AMBR is used to determine the second slice-AMBR, and the access network device is an access network device of the first access network type.

In another embodiment:

The processing module 1302 is configured to determine a first slice-AMBR corresponding to first S-NSSAI of a first session of a terminal device. The transceiver module 1301 is configured to send the first slice-AMBR corresponding to the first S-NSSAI to an access network device, where the first slice-AMBR is used to determine a second slice-AMBR corresponding to the first S-NSSAI, and the second slice-AMBR is used to control an aggregate bit rate of non-GBR QoS flows in a network slice indicated by the first S-NSSAI.

Optionally, the first slice-AMBR is a subscribed first slice-AMBR.

In a possible implementation, the first S-NSSAI is S-NSSAI associated with the first session in a home network of the terminal device. The processing module 1302 is specifically configured to receive, via the transceiver module 1301, M pieces of S-NSSAI corresponding to the terminal device and a first slice-AMBR corresponding to each piece of S-NSSAI in the M pieces of S-NSSAI from a unified data management network element, where each piece of S-NSSAI in the M pieces of S-NSSAI is S-NSSAI in the home network of the terminal device, the M pieces of S-NSSAI include the first S-NSSAI, and M is a positive integer.

Optionally, the transceiver module 1301 is further configured to send a mapping relationship between third S-NSSAI and the first S-NSSAI to the access network device, where the mapping relationship is used to determine a first slice-AMBR corresponding to the third S-NSSAI, and the third S-NSSAI is S-NSSAI associated with the first session in a visited network of the terminal device.

In another possible implementation, the first S-NSSAI is S-NSSAI associated with the first session in a visited network of the terminal device. The processing module 1302 is specifically configured to: receive, via the transceiver module 1301, M pieces of S-NSSAI corresponding to the terminal device and a first slice-AMBR corresponding to each piece of S-NSSAI in the M pieces of S-NSSAI from a unified data management network element, where each piece of S-NSSAI in the M pieces of S-NSSAI is S-NSSAI in a home network of the terminal device, the M pieces of S-NSSAI include third S-NSSAI, the third S-NSSAI is S-NSSAI associated with the first session in the home network of the terminal device, and M is a positive integer; and determine, based on a mapping relationship between the first S-NSSAI and the third S-NSSAI, a first slice-AMBR corresponding to the third S-NSSAI as the first slice-AMBR corresponding to the first S-NSSAI.

Optionally, the first slice-AMBR is from a policy control network element.

In a possible implementation, the first S-NSSAI is S-NSSAI associated with the first session in a home network of the terminal device. The processing module 1302 is specifically configured to receive, via the transceiver module 1301, M pieces of S-NSSAI corresponding to the terminal device and a first slice-AMBR corresponding to each piece of S-NSSAI in the M pieces of S-NSSAI from the policy control network element, where each piece of S-NSSAI in the M pieces of S-NSSAI is S-NSSAI in the home network of the terminal device, the M pieces of S-NSSAI include the first S-NSSAI, and M is a positive integer.

Optionally, the transceiver module 1301 is further configured to receive the M pieces of S-NSSAI corresponding to the terminal device and a subscribed slice-AMBR corresponding to each piece of S-NSSAI in the M pieces of S-NSSAI from a unified data management network element. The transceiver module 1301 is further configured to send a first message to the policy control network element, where the first message includes the M pieces of S-NSSAI corresponding to the terminal device and the subscribed slice-AMBR corresponding to each piece of S-NSSAI in the M pieces of S-NSSAI.

Optionally, the transceiver module 1301 is further configured to receive N pieces of S-NSSAI corresponding to the terminal device and a subscribed slice-AMBR corresponding to each piece of S-NSSAI in the N pieces of S-NSSAI from a unified data management network element, where each piece of S-NSSAI in the N pieces of S-NSSAI is S-NSSAI in the home network of the terminal device. The processing module 1302 is further configured to determine, based on allowed NSSAI of the terminal device or default NSSAI of the terminal device and the subscribed slice-AMBR corresponding to each piece of S-NSSAI in the N pieces of S-NSSAI, the M pieces of S-NSSAI corresponding to the terminal device and a subscribed slice-AMBR corresponding to each piece of S-NSSAI in the M pieces of S-NSSAI, where the default NSSAI of the terminal device or the allowed NSSAI of the terminal device includes the M pieces of S-NSSAI corresponding to the terminal device, each piece of S-NSSAI in the M pieces of S-NSSAI corresponding to the terminal device is S-NSSAI in the N pieces of S-NSSAI corresponding to the terminal device, and N is a positive integer greater than or equal to M. The transceiver module 1301 is further configured to send a first message to the policy control network element, where the first message carrying the first message corresponding to the terminal device includes the M pieces of S-NSSAI corresponding to the terminal device and the subscribed slice-AMBR corresponding to each piece of S-NSSAI in the N pieces of S-NSSAI.

In another possible implementation, the first S-NSSAI is S-NSSAI associated with the first session in a home network of the terminal device. The processing module 1302 is specifically configured to: receive, via the transceiver module 1301, N pieces of S-NSSAI corresponding to the terminal device and a first slice-AMBR corresponding to each piece of S-NSSAI in the N pieces of S-NSSAI from the policy control network element, where each piece of S-NSSAI in the N pieces of S-NSSAI is S-NSSAI in the home network of the terminal device; and determine, based on allowed NSSAI of the terminal device or default NSSAI of the terminal device and the first slice-AMBR corresponding to each piece of S-NSSAI in the N pieces of S-NSSAI, M pieces of S-NSSAI corresponding to the terminal device and a first slice-AMBR corresponding to each piece of S-NSSAI in the M pieces of S-NSSAI, where the allowed NSSAI of the terminal device or the default NSSAI of the terminal device includes the M pieces of S-NSSAI corresponding to the terminal device, each piece of S-NSSAI in the M pieces of S-NSSAI corresponding to the terminal device is S-NSSAI in the N pieces of S-NSSAI corresponding to the terminal device, the M pieces of S-NSSAI include the first S-NSSAI, M is a positive integer, and N is a positive integer greater than or equal to M.

In still another possible implementation, the first S-NSSAI is S-NSSAI associated with the first session in a visited network of the terminal device. The processing module 1302 is specifically configured to: send a third message to the policy control network element via the transceiver module 1301, where the third message carries M pieces of S-NSSAI corresponding to the terminal device, the M pieces of S-NSSAI corresponding to the terminal device include M pieces of S-NSSAI that are in the visited network of the terminal device and that are obtained by mapping allowed S-NSSAI of the terminal device or default NSSAI of the terminal device, and M is a positive integer; and receive, via the transceiver module 1301, the M pieces of S-NSSAI corresponding to the terminal device and a first slice-AMBR corresponding to each piece of S-NSSAI in the M pieces of S-NSSAI from the policy control network element, where the M pieces of S-NSSAI include the first S-NSSAI.

In still another possible implementation, the first S-NSSAI is S-NSSAI associated with the first session in a visited network of the terminal device. The processing module 1302 is specifically configured to: receive, via the transceiver module 1301, N pieces of S-NSSAI corresponding to the terminal device and a first slice-AMBR corresponding to each piece of S-NSSAI in the N pieces of S-NSSAI from the policy control network element, where each piece of S-NSSAI in the N pieces of S-NSSAI corresponding to the terminal device is S-NSSAI in the visited network of the terminal device; and determine, based on allowed NSSAI of the terminal device or default NSSAI of the terminal device and the first slice-AMBR corresponding to each piece of S-NSSAI in the N pieces of S-NSSAI, M pieces of S-NSSAI corresponding to the terminal device and a first slice-AMBR corresponding to each piece of S-NSSAI in the M pieces of S-NSSAI, where each piece of S-NSSAI in the M pieces of S-NSSAI corresponding to the terminal device is S-NSSAI in the visited network of the terminal device, each piece of S-NSSAI in the M pieces of S-NSSAI corresponding to the terminal device is S-NSSAI in the N pieces of S-NSSAI corresponding to the terminal device, the allowed NSSAI of the terminal device includes the M pieces of S-NSSAI corresponding to the terminal device, the default NSSAI of the terminal device includes X pieces of S-NSSAI, each piece of S-NSSAI in the X pieces of S-NSSAI is S-NSSAI in a home network of the terminal device, the M pieces of S-NSSAI corresponding to the terminal device are obtained by mapping based on the X pieces of S-NSSAI, the M pieces of S-NSSAI include the first S-NSSAI, X is a positive integer, M is a positive integer, and N is a positive integer greater than or equal to M.

Optionally, the first S-NSSAI is the S-NSSAI associated with the first session in the home network of the terminal device; and the transceiver module 1301 is further configured to send the first S-NSSAI to the access network device.

Optionally, the first S-NSSAI is the S-NSSAI associated with the first session in the visited network of the terminal device; and the processing module 1302 is further configured to determine that there is second S-NSSAI having a mapping relationship with the third S-NSSAI in the visited network of the terminal device, where the third S-NSSAI is S-NSSAI that is of a network slice and that is associated with the first session in the home network of the terminal device. The transceiver module 1301 is further configured to send indication information to the access network device, where the indication information indicates that the aggregate bit rate of the non-GBR QoS flows in the network slice indicated by the first S-NSSAI and an aggregate bit rate of non-GBR QoS flows in a network slice indicated by the second S-NSSAI are both controlled by the first slice-AMBR.

Optionally, the first S-NSSAI is the S-NSSAI associated with the first session in the visited network of the terminal device; and The transceiver module 1301 is further configured to send the third S-NSSAI corresponding to the first slice-AMBR to the access network device, where the third S-NSSAI is the S-NSSAI that is of the network slice and that is associated with the first session in the home network of the terminal device.

Optionally, the transceiver module 1301 is further configured to send a first session-AMBR corresponding to a first access network type to the access network device, where the first session-AMBR is used to determine the second slice-AMBR, and the access network device is an access network device of the first access network type.

In still another embodiment:

The processing module 1302 is configured to obtain a first UE-AMBR corresponding to a first access network type of a terminal device. The transceiver module 1301 is configured to send the first UE-AMBR corresponding to the first access network type to an access network device, where the first UE-AMBR is used to determine a second UE-AMBR, the second UE-AMBR is used to control an aggregate bit rate of non-GBR QoS flows of the terminal device, and the access network device is an access network device of the first access network type.

Optionally, the transceiver module 1301 is further configured to send a first session-AMBR corresponding to the first access network type to the access network device, where the first session-AMBR is used to determine the second UE-AMBR.

All related content of the steps in the foregoing method embodiments may be cited in function descriptions of corresponding function modules. Details are not described herein again.

In this embodiment, the mobility management network element 130 is presented in a form of function modules obtained through division in an integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the mobility management network element 130 may be in a form of the communication device 800 shown in FIG. 8.

For example, the processor 801 of the communication device 800 shown in FIG. 8 may invoke the computer-executable instructions stored in the memory 803, to enable the communication device 800 to perform the AMBR control methods in the foregoing method embodiments.

Specifically, functions/implementation processes of the transceiver module 1301 and the processing module 1302 in FIG. 13 may be implemented by the processor 801 in the communication device 800 shown in FIG. 8 by invoking the computer-executable instructions stored in the memory 803. Alternatively, a function/an implementation process of the processing module 1302 in FIG. 13 may be implemented by the processor 801 in the communication device 800 shown in FIG. 8 by invoking the computer-executable instructions stored in the memory 803. A function/an implementation process of the transceiver module 1301 in FIG. 13 may be implemented by the communication interface 804 in the communication device 800 shown in FIG. 8.

The mobility management network element 130 provided in this embodiment may perform the foregoing AMBR control method. Therefore, for technical effects that can be achieved by the mobility management network element 130, refer to the foregoing method embodiments. Details are not described herein again.

Figure 14:
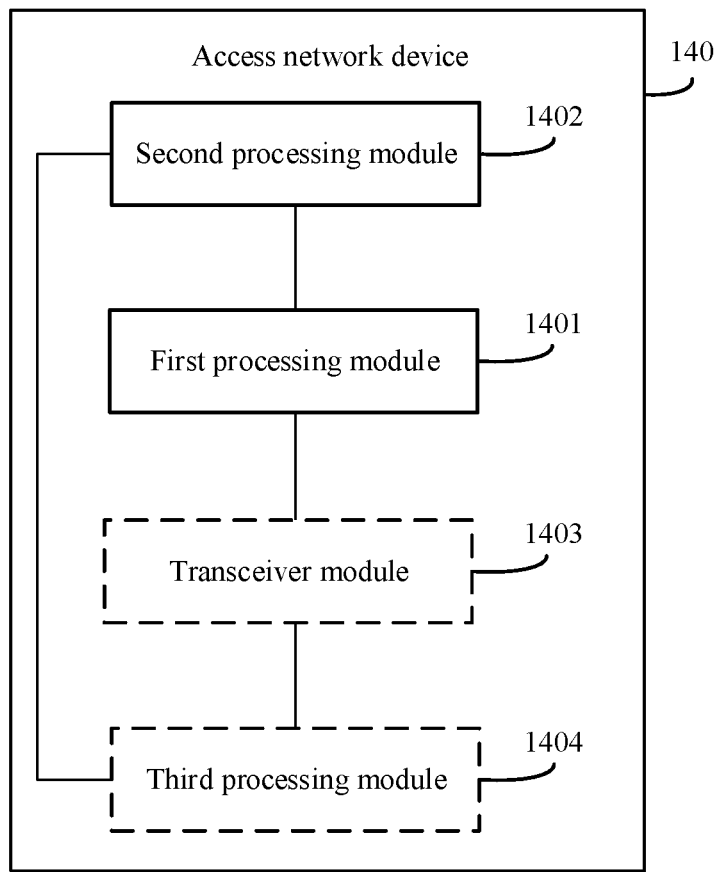
FIG. 14 is a schematic diagram 1 of a structure of an access network device according to an embodiment of this application.

For example, the communication apparatus is the access network device in the foregoing method embodiments. FIG. 14 is a schematic diagram of a structure of an access network device 140. The access network device 140 includes a first processing module 1401 and a second processing module 1402, and optionally, includes a transceiver module 1403. The transceiver module 1403 may also be referred to as a transceiver unit, and is configured to implement sending and receiving functions. For example, the transceiver module 1403 may be a transceiver circuit, a transceiver machine, a transceiver, or a communication interface.

In an embodiment:

The first processing module 1401 is configured to determine a first slice-AMBR corresponding to first S-NSSAI, where the first S-NSSAI is S-NSSAI associated with a first session of a terminal device in a serving network of the terminal device. The second processing module 1402 is configured to determine, based on the first slice-AMBR corresponding to the first S-NSSAI, a second slice-AMBR corresponding to the first S-NSSAI, where the second slice-AMBR is used to control an aggregate bit rate of non-GBR QoS flows in a network slice indicated by the first S-NSSAI.

In a possible implementation, the first processing module 1401 is specifically configured to receive, via the transceiver module 1403, M pieces of S-NSSAI corresponding to the terminal device and a first slice-AMBR corresponding to each piece of S-NSSAI in the M pieces of S-NSSAI from a mobility management network element, where the M pieces of S-NSSAI include the first S-NSSAI.

In another possible implementation, the serving network is a visited network of the terminal device. The first processing module 1401 is specifically configured to receive, via the transceiver module 1403, M pieces of S-NSSAI corresponding to the terminal device and a first slice-AMBR corresponding to each piece of S-NSSAI in the M pieces of S-NSSAI from a mobility management network element, where each piece of S-NSSAI in the M pieces of S-NSSAI corresponding to the terminal device is S-NSSAI in a home network of the terminal device, and M is a positive integer; and determine, based on the first slice-AMBR corresponding to each piece of S-NSSAI in the M pieces of S-NSSAI, a first slice-AMBR corresponding to third S-NSSAI corresponding to the first S-NSSAI as the first slice-AMBR corresponding to the first S-NSSAI, where the third S-NSSAI is S-NSSAI that is of a network slice and that is associated with the first session in the home network of the terminal device, and the third S-NSSAI is S-NSSAI in the M pieces of S-NSSAI.

Optionally, the first processing module 1401 is further configured to: receive, from the mobility management network element via the transceiver module 1403, S-NSSAI that is in the visited network of the terminal device and that corresponds to each piece of S-NSSAI in the M pieces of S-NSSAI; and determine, based on the S-NSSAI that is in the visited network of the terminal device and that corresponds to each piece of S-NSSAI in the M pieces of S-NSSAI, the third S-NSSAI corresponding to the first S-NSSAI.

Optionally, the first processing module 1401 is further configured to receive, via the transceiver module 1403, a mapping relationship between the first S-NSSAI and the third S-NSSAI from the mobility management network element.

In still another possible implementation, the first processing module 1401 is specifically configured to receive, via the transceiver module 1403, the first slice-AMBR corresponding to the first S-NSSAI from a mobility management network element.

In still another possible implementation, the serving network is a visited network of the terminal device. The first processing module 1401 is specifically configured to: receive, via the transceiver module 1403, a first slice-AMBR corresponding to third S-NSSAI and a mapping relationship between the third S-NSSAI and the first S-NSSAI from a mobility management network element, where the third S-NSSAI is S-NSSAI that is of a network slice and that is associated with the first session in a home network of the terminal device; and determine, based on the mapping relationship between the third S-NSSAI and the first S-NSSAI, the first slice-AMBR corresponding to the third S-NSSAI as the first slice-AMBR corresponding to the first S-NSSAI.

Optionally, as shown in FIG. 14, the access network device 140 in this embodiment of this application may further include a third processing module 1404. The transceiver module 1403 is configured to receive a first UE-AMBR from the mobility management network element. The third processing module 1404 is further configured to determine a second UE-AMBR based on the first UE-AMBR and the second slice-AMBR, where the second UE-AMBR is used to control an aggregate bit rate of non-GBR QoS flows of the terminal device.

All related content of the steps in the foregoing method embodiments may be cited in function descriptions of corresponding function modules. Details are not described herein again.

In this embodiment, the access network device 140 is presented in a form of function modules obtained through division in an integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the access network device 140 may be in a form of the communication device 800 shown in FIG. 8.

For example, the processor 801 of the communication device 800 shown in FIG. 8 may invoke the computer-executable instructions stored in the memory 803, to enable the communication device 800 to perform the AMBR control methods in the foregoing method embodiments.

Specifically, functions/implementation processes of the first processing module 1401, the second processing module 1402, the transceiver module 1403, and the third processing module 1404 in FIG. 14 may be implemented by the processor 801 in the communication device 800 shown in FIG. 8 by invoking the computer executable instructions stored in the memory 803. Alternatively, functions/implementation processes of the first processing module 1401, the second processing module 1402, and the third processing module 1404 in FIG. 14 may be implemented by the processor 801 in the communication device 800 shown in FIG. 8 by invoking the computer-executable instructions stored in the memory 803. A function/an implementation process of the transceiver module 1403 in FIG. 14 may be implemented by the communication interface 804 in the communication device 800 shown in FIG. 8.

Because the access network device 140 provided in this embodiment may perform the foregoing AMBR control method. Therefore, for technical effects that can be achieved by the access network device 140, refer to the foregoing method embodiments. Details are not described herein again.

Figure 15:
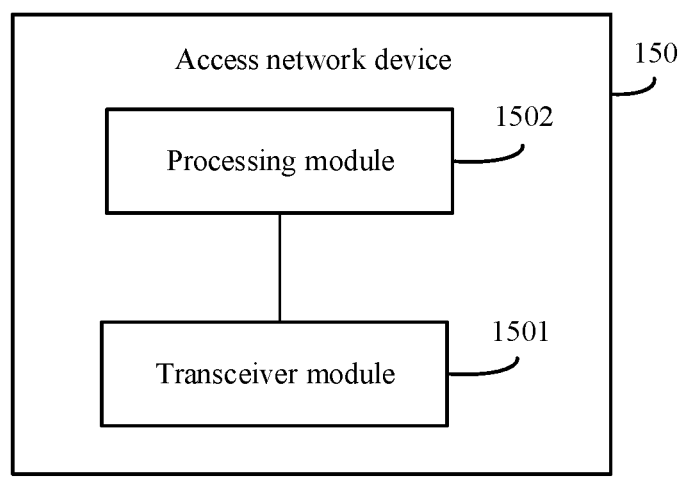
FIG. 15 is a schematic diagram 2 of a structure of an access network device according to an embodiment of this application.

For example, the communication apparatus is the access network device in the foregoing method embodiments. FIG. 15 is a schematic diagram of a structure of an access network device 150. The access network device 150 includes a transceiver module 1501 and a processing module 1502. The transceiver module 1501 may also be referred to as a transceiver unit, and is configured to implement sending and receiving functions. For example, the transceiver module 1501 may be a transceiver circuit, a transceiver machine, a transceiver, or a communication interface.

The transceiver module 1501 is configured to receive the first UE-AMBR corresponding to the first access network type of the terminal device from a mobility management network element, where the access network device is an access network device of the first access network type. The processing module 1502 is configured to determine a second UE-AMBR based on the first UE-AMBR, where the second UE-AMBR is used to control an aggregate bit rate of non-GBR QoS flows of a terminal device.

Optionally, the transceiver module 1501 is further configured to receive a first session-AMBR corresponding to the first access network type and sent by the mobility management network element, where the first session-AMBR is used to determine the second UE-AMBR.

All related content of the steps in the foregoing method embodiments may be cited in function descriptions of corresponding function modules. Details are not described herein again.

In this embodiment, the access network device 150 is presented in a form of function modules obtained through division in an integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the access network device 150 may be in a form of the communication device 800 shown in FIG. 8.

For example, the processor 801 of the communication device 800 shown in FIG. 8 may invoke the computer-executable instructions stored in the memory 803, to enable the communication device 800 to perform the AMBR control methods in the foregoing method embodiments.

Specifically, functions/implementation processes of the transceiver module 1501 and the processing module 1502 in FIG. 15 may be implemented by the processor 801 in the communication device 800 shown in FIG. 8 by invoking the computer-executable instructions stored in the memory 803. Alternatively, a function/an implementation process of the processing module 1502 in FIG. 15 may be implemented by the processor 801 in the communication device 800 shown in FIG. 8 by invoking the computer-executable instructions stored in the memory 803. A function/an implementation process of the transceiver module 1501 in FIG. 15 may be implemented by the communication interface 804 in the communication device 800 shown in FIG. 8.

Because the access network device 150 provided in this embodiment may perform the foregoing AMBR control method. Therefore, for technical effects that can be achieved by the access network device 150, refer to the foregoing method embodiments. Details are not described herein again.

It should be noted that one or more of the foregoing modules or units may be implemented by using software, hardware, or a combination thereof. When any one of the foregoing modules or units is implemented by using software, the software exists in a form of computer program instructions, and is stored in a memory. A processor may be configured to execute the program instructions to implement the foregoing method procedures. The processor may be built into a SoC (system-on-a-chip) or an ASIC, or may be an independent semiconductor chip. In addition to a core configured to execute software instructions to perform an operation or processing, the processor may further include a necessary hardware accelerator, such as a field programmable gate array (FPGA), a programmable logic device (PLD), or a logic circuit that implements a dedicated logic operation.

When the foregoing modules or units are implemented by using hardware, the hardware may be any one or any combination of a CPU, a microprocessor, a digital signal processing (DSP) chip, a microcontroller unit (MCU), an artificial intelligence processor, an ASIC, a SoC, an FPGA, a PLD, a dedicated digital circuit, a hardware accelerator, or a non-integrated discrete device, and the hardware may run necessary software or does not depend on software to perform the foregoing method procedure.

Optionally, an embodiment of this application further provides a communication apparatus (for example, the communication apparatus may be a chip or a chip system). The communication apparatus includes a processor, configured to implement the method in any one of the foregoing method embodiments. In a possible design, the communication apparatus further includes a memory. The memory is configured to store necessary program instructions and data. The processor may invoke program code stored in the memory, to instruct the communication apparatus to perform the method in any one of the foregoing method embodiments. Certainly, the memory may not be located in the communication apparatus. When the communication apparatus is a chip system, the communication apparatus may include a chip, or may include a chip and another discrete component. This is not specifically limited in this embodiment of this application.

All or some of the foregoing embodiments may be implemented by using software, hardware, firmware, or any combination thereof. When a software program is used to implement the embodiments, all or a part of the embodiments may be implemented in a form of a computer program product. The computer program product includes one or more computer instructions. When the computer program instructions are loaded and executed on a computer, the procedure or functions according to the embodiments of this application are all or partially generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments herein, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that the measures cannot be combined to produce a good effect.

Although this application is described with reference to specific features and the embodiments thereof, it is clear that various modifications and combinations may be made to them without departing from the spirit and scope of this application. Correspondingly, the specification and accompanying drawings are merely example descriptions of this application defined by the appended claims, and are considered as any of or all modifications, variations, combinations or equivalents that cover the scope of this application. It is clear that a person skilled in the art can make various modifications and variations to this application without departing from the spirit and scope of this application. This application is intended to cover the modifications and variations of this application provided that they fall within the scope of the claims of this application and their equivalent technologies.

What is claimed is:

1. An aggregate maximum bit rate (AMBR) control method, the method comprising:
   obtaining, by a mobility management network element, M pieces of single network slice selection assistance information (S-NSSAI) corresponding to a terminal device and a first slice aggregate maximum bit rate (slice-AMBR) corresponding to each piece of S-NSSAI in the M pieces of S-NSSAI, wherein M is a positive integer, and wherein the first slice-AMBR corresponding to each piece of S-NSSAI is a subscribed first slice-AMBR corresponding to the S-NSSAI; and
   sending, by the mobility management network element, the M pieces of S-NSSAI and the first slice-AMBR corresponding to each piece of S-NSSAI to an access network device, wherein the first slice-AMBR corresponding to each piece of S-NSSAI is used to determine at the access network device a second slice-AMBR corresponding to the S-NSSAI, and the second slice-AMBR corresponding to each piece of S-NSSAI is used to control an aggregate bit rate of non-guaranteed bit rate (non-GBR) quality of service (QOS) flows in a network slice indicated by the S-NSSAI.

2. The method according to claim 1, wherein each piece of S-NSSAI in the M pieces of S-NSSAI corresponding to the terminal device is S-NSSAI in a home network of the terminal device, and the obtaining, by the mobility management network element, the M pieces of S-NSSAI corresponding to the terminal device and the first slice-AMBR corresponding to each piece of S-NSSAI in the M pieces of S-NSSAI comprises:
   receiving, by the mobility management network element, the M pieces of S-NSSAI corresponding to the terminal device and the first slice-AMBR corresponding to each piece of S-NSSAI in the M pieces of S-NSSAI from a unified data management network element.

3. The method according to claim 1, wherein the first slice-AMBR corresponding to each piece of S-NSSAI is from a policy control network element.

4. The method according to claim 3, wherein each piece of S-NSSAI in the M pieces of S-NSSAI corresponding to the terminal device is S-NSSAI in a home network of the terminal device, and the obtaining, by the mobility management network element, the M pieces of S-NSSAI corresponding to the terminal device and the first slice-AMBR corresponding to each piece of S-NSSAI in the M pieces of S-NSSAI comprises:
   receiving, by the mobility management network element, the M pieces of S-NSSAI corresponding to the terminal device and the first slice-AMBR corresponding to each piece of S-NSSAI in the M pieces of S-NSSAI from the policy control network element.

5. The method according to claim 3, wherein each piece of S-NSSAI in the M pieces of S-NSSAI corresponding to the terminal device is S-NSSAI in a visited network of the terminal device, and the obtaining, by the mobility management network element, the M pieces of S-NSSAI corresponding to the terminal device and the first slice-AMBR corresponding to each piece of S-NSSAI in the M pieces of S-NSSAI comprises:
   sending, by the mobility management network element, a third message to the policy control network element, wherein the third message carries the M pieces of S-NSSAI corresponding to the terminal device, and the M pieces of S-NSSAI corresponding to the terminal device comprise M pieces of S-NSSAI that are in the visited network of the terminal device and that are obtained by mapping allowed S-NSSAI of the terminal device or default NSSAI of the terminal device; and
   receiving, by the mobility management network element, the M pieces of S-NSSAI corresponding to the terminal device and the first slice-AMBR corresponding to each piece of S-NSSAI in the M pieces of S-NSSAI from the policy control network element.

6. The method according to claim 1, wherein the first slice-AMBR corresponding to each piece of S-NSSAI is a slice-AMBR corresponding to a first access network type, and the access network device is an access network device of the first access network type.

7. A mobility management network element, the mobility management network element comprising:
   a processor configured to obtain M pieces of single network slice selection assistance information (S-NSSAI) corresponding to a terminal device and to obtain a first slice aggregate maximum bit rate (slice-AMBR) corresponding to each piece of S-NSSAI in the M pieces of S-NSSAI, wherein M is a positive integer, and wherein the first slice-AMBR corresponding to each piece of S-NSSAI is a subscribed first slice-AMBR corresponding to the S-NSSAI; and
   a transceiver configured to send the M pieces of S-NSSAI and the first slice-AMBR corresponding to each piece of S-NSSAI to an access network device, wherein the first slice-AMBR corresponding to each piece of S-NSSAI is used to determine at the access network device a second slice-AMBR corresponding to the S-NSSAI, and the second slice-AMBR corresponding to each piece of S-NSSAI is used to control an aggregate bit rate of non-guaranteed bit rate (non-GBR) quality of service (QOS) flows in a network slice indicated by the S-NSSAI.

8. The mobility management network element according to claim 7,
wherein each piece of S-NSSAI in the M pieces of S-NSSAI corresponding to the terminal device is S-NSSAI in a home network of the terminal device; and
wherein the processor is further configured to:
receive, via the transceiver, the M pieces of S-NSSAI corresponding to the terminal device and the first slice-AMBR corresponding to each piece of S-NSSAI in the M pieces of S-NSSAI from a unified data management network element.

9. The mobility management network element according to claim 8, wherein the transceiver is further configured to:
send, to the access network device, S-NSSAI that is in a visited network of the terminal device and that corresponds to each piece of S-NSSAI in the M pieces of S-NSSAI corresponding to the terminal device.

10. The mobility management network element according to claim 7, wherein the first slice-AMBR corresponding to each piece of S-NSSAI is from a policy control network element.

11. The mobility management network element according to claim 10, wherein each piece of S-NSSAI in the M pieces of S-NSSAI corresponding to the terminal device is S-NSSAI in a home network of the terminal device; and the processor is further configured to:
receive, via the transceiver, the M pieces of S-NSSAI corresponding to the terminal device and the first slice-AMBR corresponding to each piece of S-NSSAI in the M pieces of S-NSSAI from the policy control network element.

12. The mobility management network element according to claim 10,
wherein each piece of S-NSSAI in the M pieces of S-NSSAI corresponding to the terminal device is S-NSSAI in a visited network of the terminal device; and
wherein the processor is further configured to:
send a third message to the policy control network element via the transceiver, wherein the third message carries the M pieces of S-NSSAI corresponding to the terminal device, and the M pieces of S-NSSAI corresponding to the terminal device comprise M pieces of S-NSSAI that are in the visited network of the terminal device and that are obtained by mapping allowed S-NSSAI of the terminal device or default NSSAI of the terminal device; and
receive, via the transceiver, the M pieces of S-NSSAI corresponding to the terminal device and the first slice-AMBR corresponding to each piece of S-NSSAI in the M pieces of S-NSSAI from the policy control network element.

13. The mobility management network element according to claim 7, wherein the transceiver is further configured to send a first session-AMBR corresponding to the first access network type to the access network device, wherein the first session-AMBR is used to determine the second slice-AMBR, and the access network device is an access network device of the first access network type.

14. An access network device, comprising:
a transceiver;
a first processor configured to:
determine a first slice aggregate maximum bit rate (slice-AMBR) corresponding to first single network slice selection assistance information (S-NSSAI), wherein the first S-NSSAI is S-NSSAI associated with a first session of a terminal device in a serving network of the terminal device; and
receive, via the transceiver, M pieces of S-NSSAI corresponding to the terminal device and a slice-AMBR corresponding to each piece of S-NSSAI in the M pieces of S-NSSAI from a mobility management network element, wherein the M pieces of S-NSSAI comprise the first S-NSSAI; and
a second processor configured to determine, at the access network device, based on the first slice-AMBR corresponding to the first S-NSSAI, a second slice-AMBR corresponding to the first S-NSSAI, wherein the second slice-AMBR is used to control an aggregate bit rate of non-guaranteed bit rate (non-GBR) quality of service (QOS) flows in a network slice indicated by the first S-NSSAI.

15. The access network device according to claim 14,
wherein the first processor is further configured to receive, via the transceiver, the first slice-AMBR corresponding to the first S-NSSAI from the mobility management network element.

16. The access network device according to claim 14,
wherein the serving network is a visited network of the terminal device; and
wherein the first processor is further configured to:
receive, via the transceiver, a third slice-AMBR corresponding to a third S-NSSAI and a mapping relationship between the third S-NSSAI and the first S-NSSAI from the mobility management network element, wherein the third S-NSSAI is of a network slice and is associated with the first session in a home network of the terminal device; and
determine, based on the mapping relationship between the third S-NSSAI and the first S-NSSAI, the third slice-AMBR corresponding to the third S-NSSAI as the first slice-AMBR corresponding to the first S-NSSAI.

* * * * *

UNITED STATES PATENT AND TRADEMARK OFFICE
CERTIFICATE OF CORRECTION

PATENT NO. : 12,256,261 B2
APPLICATION NO. : 17/695556
DATED : March 18, 2025
INVENTOR(S) : Wu et al.

Page 1 of 1

It is certified that error appears in the above-identified patent and that said Letters Patent is hereby corrected as shown below:

In the Claims

Claim 1: Column 59, Line 58: "teed bit rate (non-GBR) quality of service (QOS) flows" should read as -- teed bit rate (non-GBR) quality of service (QoS) flows --.

Claim 7: Column 61, Line 2: "service (QOS) flows in a network slice indicated by the" should read as -- service (QoS) flows in a network slice indicated by the --.

Claim 14: Column 62, Line 30: "(QOS) flows in a network slice indicated by the first" should read as -- (QoS) flows in a network slice indicated by the first --.

Signed and Sealed this
Thirtieth Day of September, 2025

John A. Squires
*Director of the United States Patent and Trademark Office*